(12) United States Patent
Zhang et al.

(10) Patent No.: US 12,437,489 B2
(45) Date of Patent: Oct. 7, 2025

(54) PRESENTING MESHED REPRESENTATIONS OF PHYSICAL OBJECTS WITHIN DEFINED BOUNDARIES FOR INTERACTING WITH ARTIFICIAL-REALITY CONTENT, AND SYSTEMS AND METHODS OF USE THEREOF

(71) Applicant: Meta Platforms Technologies, LLC, Menlo Park, CA (US)

(72) Inventors: Boyang Zhang, San Francisco, CA (US); Yifu Zhang, Foster City, CA (US); Yuichi Taguchi, Los Gatos, CA (US); Gaurav Chaurasia, Meilen (CH); Manuel Werlberger, Zurich (CH); Alexandru-Eugen Ichim, Rüschlikon (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 170 days.

(21) Appl. No.: 18/494,711

(22) Filed: Oct. 25, 2023

(65) Prior Publication Data

US 2024/0135662 A1 Apr. 25, 2024
US 2024/0233291 A9 Jul. 11, 2024

Related U.S. Application Data

(60) Provisional application No. 63/419,318, filed on Oct. 25, 2022.

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06T 7/593* (2017.01); *G06T 15/08* (2013.01); *G06T 17/20* (2013.01)

(58) Field of Classification Search
CPC ....... G06T 19/006; G06T 7/593; G06T 15/08; G06T 17/20; G02B 27/017
See application file for complete search history.

(56) References Cited

U.S. PATENT DOCUMENTS 10,559,276 B2 * 2/2020 Fruchter ............... G06T 19/006
10,928,892 B2 2/2021 Kruzel et al.
(Continued)

*Primary Examiner* — Xin Sheng
(74) *Attorney, Agent, or Firm* — Morgan, Lewis & Bockius LLP

(57) ABSTRACT

A method of interacting with an artificial-reality (AR) content at an AR headset that includes cameras and displays is described. The method includes, while the AR headset has a first position within a physical environment that includes an object, if a distance of the object is within a threshold collision distance from the AR headset, presenting a meshed representation of the object. The meshed representation is displayed at first respective locations on the displays such that the meshed representation is viewable within the artificial reality. After the AR headset moves to a second position with a different distance, and if the different distance is within the threshold collision distance from the AR headset, moving the meshed representation of the object to second respective locations within the artificial reality. The second respective locations correspond to the position of the object in the physical environment.

20 Claims, 42 Drawing Sheets
(23 of 42 Drawing Sheet(s) Filed in Color)

(51) Int. Cl.
*G06T 7/593* (2017.01)
*G06T 15/08* (2011.01)
*G06T 17/20* (2006.01)

(56) References Cited

U.S. PATENT DOCUMENTS

| | | | |
|---|---|---|---|
| 11,037,531 B2* | 6/2021 | Kaplanyan | G06N 3/045 |
| 2020/0027194 A1* | 1/2020 | Nourai | G06F 3/011 |
| 2021/0125583 A1* | 4/2021 | Kaplanyan | G06N 3/088 |
| 2021/0142581 A1* | 5/2021 | Molyneaux | G06T 19/00 |

* cited by examiner

New: 4 triangles per rectangle

Before: 2 triangles per rectangle

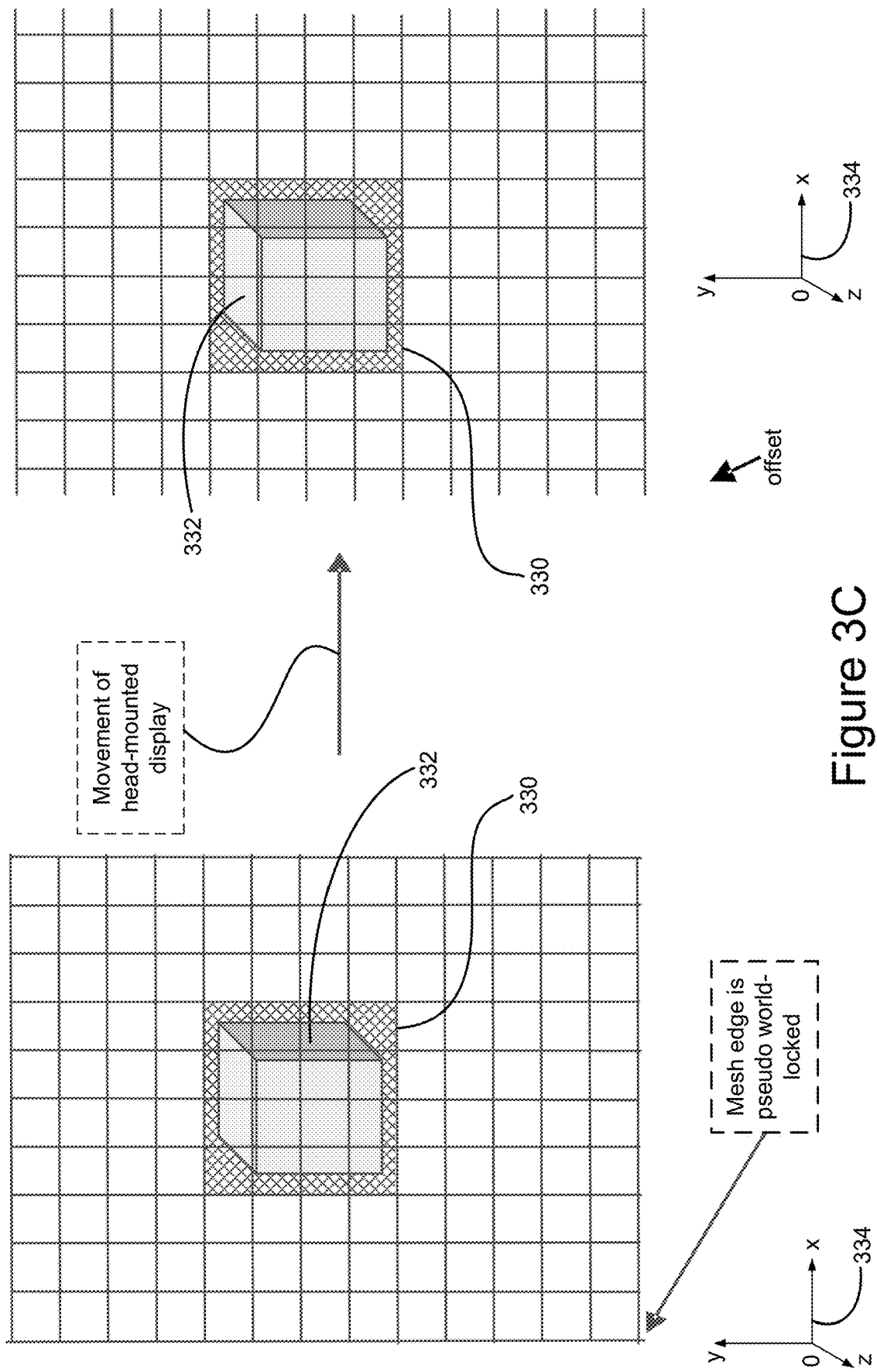

PRESENTING MESHED REPRESENTATIONS OF PHYSICAL OBJECTS WITHIN DEFINED BOUNDARIES FOR INTERACTING WITH ARTIFICIAL-REALITY CONTENT, AND SYSTEMS AND METHODS OF USE THEREOF

RELATED APPLICATIONS

This application claims priority to U.S. Prov. App. No. 63/419,318, filed on Oct. 25, 2022, and entitled "Adjusting Presentation of Full-Color Meshed Representations of Physical Objects Within an Artificial Reality to Properly Account for Movement of an Artificial-Reality Headset, and Systems and Methods of Use Thereof," which is incorporated herein by reference.

TECHNICAL FIELD

This disclosure relates generally to artificial-reality (AR) headsets, including but not limited to techniques for displaying dynamic representations of physical objects within boundaries (e.g., guardian contours) defined by users of the AR headsets.

BACKGROUND

Users of AR headsets can become substantially immersed in the artificial-reality environment, which can be conducive to a richer, more engaging user experience. However, one drawback to displaying an artificial-reality environment that encompasses a substantial portion of the user's field of view, is that the user could then be unaware of the presence of physical objects within proximity to the user while they are interacting with the artificial-reality environment. Being unaware of physical objects in one's physical environment can lead to property damage, injuries, degradation of the user experience, and/or other issues while immersed in the artificial-reality environment.

Techniques for providing indications to users of AR headsets about the presence of physical objects in their proximity exist but have drawbacks. In addition, these indications may substantially detract from the immersion within the artificial reality.

SUMMARY

Accordingly, there is a need for accurate representations of physical objects to be displayed in the artificial reality that are only displayed as absolutely necessary so as to not detract from the immersion within the artificial reality, and so that these physical objects are properly rendered within the artificial reality both before and after movement of the headset as the user's moves their head. A brief summary of solutions to the issues noted above are described below.

The methods, systems, and devices described herein allow users wearing AR headsets to engage with an artificial environment in an immersive and interactive manner, and/or minimizing negative consequences of collisions with physical objects in users' proximities. Using a three-dimensional voxel grid to map the world around the user and then producing a two-dimensional mesh based on the voxel grid allows for the AR headset to provide an accurate determination as to what physical objects are near the user while still being able to display meshed representations of those physical objects at a high refresh rate (e.g., the representation does not lag producing a mismatch between the physical objects location and the displayed meshed representations location). Combining a high refresh rate with the use of a voxel grid ensures that users always know where objects, which helps to avoid collisions and property damage.

One example of an AR headset is described herein. This example AR headset includes one or more cameras, one or more displays (e.g., placed behind one or more lenses), and one or more programs, where the one or more programs are stored in memory and configured to be executed by one or more processors. The one or more programs including instructions for performing operations. The operations include obtaining a predefined interaction boundary (e.g., a playable space, either determined automatically (e.g., using object detection) or defined by a user tracing an outline of the playable space). The operations also include, while displaying an AR content at the one or more displays and while the AR headset has a first position within a physical environment and the physical environment includes a physical object at a distance and angle from the AR headset, in accordance with a determination that the distance is within a threshold collision distance from the AR headset, presenting a meshed representation of the physical object within the artificial reality. The meshed representation is displayed at first respective locations on the one more displays such that the meshed representation is viewable within the artificial reality at the angle. The operations further include, after the AR headset moves to a second position, distinct from the first position, within the physical environment, the physical object being at a different distance and a different angle from the AR headset while it is at the second position, in accordance with a determination that the different distance is within the threshold collision distance from the AR headset, moving the meshed representation of the physical object to second respective locations within the artificial reality in accordance with movement of the AR headset from the first position to the second position. The second respective locations are selected to correspond to the position of the physical object in the physical environment and the meshed representation is viewable within the artificial reality at the different angle.

Thus, methods, systems, and computer-readable storage media are disclosed for adjusting presentation of full-color meshed representations of physical objects within an artificial reality. Such methods can complement or replace conventional methods for handling object detection in immersive artificial reality environments. Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures. The patent or application file contains at least one drawing executed in color. Copies of this patent or patent application publication with color drawing(s) will be provided by the Office upon request and payment of the necessary fee.

FIGS. 3A to 3C show aspects of mixed reality service module of an AR system, in accordance with some embodiments.

FIGS. 9A, 9B, 9C-1, 9C-2, 9D-1, and 9D-2 illustrate example AR systems, in accordance with some embodiments.

FIGS. 11A, 11B-1, 11B-2, and 11C illustrate example head-wearable devices, in accordance with some embodiments.

Figure 1:
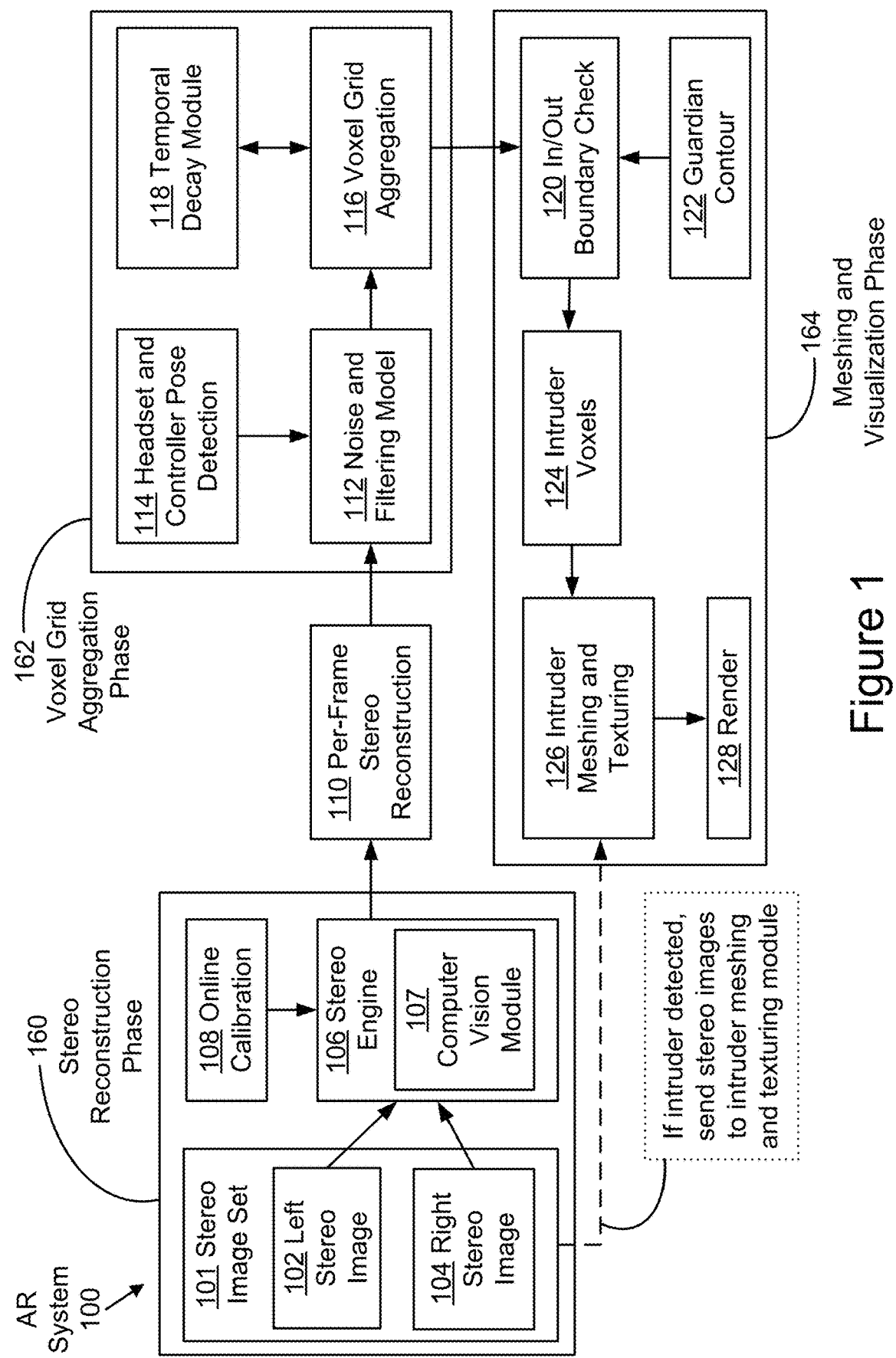
FIG. 1 shows an example block diagram of components within an AR system, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of AR systems. Artificial-reality (AR), as described herein, is any superimposed functionality and or sensory-detectable presentation provided by an AR system within a user's physical surroundings. Such artificial-reality can include and/or represent virtual reality (VR), augmented reality, mixed artificial-reality (MAR), augmented reality, or some combination and/or variation one of these. In some embodiments of an AR system, ambient light can be passed through a display element of a respective head-wearable device presenting aspects of the AR system. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

As described herein, a guardian boundary (e.g., a boundary contour, guardian contour, etc.) is a boundary, which may be automatically generated or explicitly defined by a user, that surrounds all or part of a play area of a user. The methods and devices described herein include methods and systems for detecting an intruder within a play area and/or guardian boundary (also referred to herein as a predefined interaction boundary) of a user while an artificial reality is being displayed by an AR headset of the user. As described herein, intruders are obstacles, such as people, pets, or furniture that are within a threshold distance/proximity (e.g., within 3 meters) of a user of a head-worn device.

FIG. 1 shows an example block diagram of particular components within an AR system 100, in accordance with some embodiments. In accordance with some embodiments, the AR system 100 can be used to detect and visualize physical objects (e.g., intruders) that are within a predefined boundary of a user (e.g., and/or within a collision distance of the user, such distance being based on a type of interaction that the user is performing with the AR headset). The AR system 100 can include some or all of the components of the AR systems described with respect to FIGS. 9A to 9D-2 (e.g., a first AR system 900a, a second AR system 900b, a third AR system 900c, and/or a fourth AR system 900d).

In some embodiments, the AR system 100 includes distinct subsets of software components for performing different operations and/or determinations of operations of the methods and processes described herein. For example, in accordance with some embodiments, the AR system 100 includes a first subset of software components that are part of a stereo reconstruction phase 160, a second subset of software components that are part of a voxel grid aggregation phase 162, and a third subset of software components that are part of a meshing and visualization phase 164.

Turning to the stereo reconstruction phase 160, the AR system 100 can include a means for obtaining a stereo image set 101 (e.g., two or more images of the same scene or object that are slightly offset (e.g., captured from a different angle or perspective). For example, an AR headset worn by a user (e.g., an AR device 1100 as described in more detail with respect to FIG. 11A, a VR device 1110 as described in more detail with respect to FIGS. 11B-1 and 11B-2) can include two or more peripheral image sensors (e.g., which can be examples of an imaging device 762 shown in FIG. 6). The stereo image set 101 can include a left stereo image 102 and a right stereo image 104. In some embodiments, each of the stereo images corresponds to a respective lens location of the head-worn device (e.g., left eye and right eye). In some embodiments, at least two of the stereo images from the stereo image set 101 can be provided to a stereo engine 106 for purposes of stereo reconstruction (e.g., supplying depth information of objects found in the stereo images). As described herein, a stereo engine is an API, build tool, and/or other middleware component for processing sets of stereo images (e.g., stereo images captured from one or more front-facing cameras of an AR headset). In accordance with some embodiments, the stereo engine 106 includes a computer vision module 107. In some embodiments, one or more machine learning modules can be used to generate a point cloud as part of the operations of the stereo engine 106 and/or a separate operation and/or component comprising the stereo reconstruction phase 160 (e.g., in addition or alternatively to the computer vision module). In accordance with some embodiments, a plane detection module can be used during one or more processes of the stereo reconstruction phase 160. For example, before, after, or in conjunction with generating a point cloud (e.g., via the stereo engine 106), one or more planes may be identified based on one or more images from the stereo image set 101 (e.g., a ground plane corresponding to a floor of the physical area that the user is in, a vertical plane representing a wall and/or other physical barrier within the user's physical area). In some embodiments, one or more planes identified during operations performed by the plane detection module can be used to determine an appropriate position for the guardian contour 122.

In some embodiments, a calibration module 108 is used to calibrate the stereo engine 106 before, or during all or part of the stereo reconstruction phase 160. In some embodiments, some of the processing of the stereo reconstruction phase 160 is performed remotely (e.g., via one or more remote servers or another local (e.g., physically nearby) electronic device of the user (e.g., a laptop) that is in electronic communication with the AR system 100). In some embodiments, cameras used to capture the stereo image set 101 can be compared to an online model (e.g., to determine a product model of the AR headset that captured the stereo image set 101) to perform one or more operations related to the stereo image set 101. In some embodiments, the stereo engine 106 generates at least one stereo reconstruction per frame of a set of frames provided to the user as part of the artificial-reality environment. That is, the stereo reconstruction performed by the stereo engine 106 can be performed at the same rate (or higher than) a frame rate of the presentation of the artificial-reality environment itself (e.g., thirty frames per second).

Turning to the voxel grid aggregation phase 162, a per-frame stereo reconstruction 110 based on the stereo image set 101 can be provided to the voxel grid aggregation phase 162. In some embodiments, the per-frame stereo reconstruction 110 can be provided to a noise and filtering model 112, which is configured to reduce flickering events caused by aberrations and/or ephemeral dynamic intruders. In some embodiments, the noise and filtering model 112 can exclude unwanted light wavelengths (e.g., IR light). In some embodiments, an AR headset pose and controller pose detection module 114 can provide information to the noise and filtering model 112 in order to enhance filtering functions of the noise and filtering model 112 (e.g., information about controllers for interacting with the AR system 100).

In some embodiments, one or more outputs of the noise and filtering model 112 is provided to a voxel grid aggregation module 116, which is configured to determine a voxel space representation based on the filtered stereo reconstruction provided by the voxel grid aggregation module 116. In some embodiments, the voxel grid aggregation module 116 is configured to provide a predefined volume of voxels within the artificial-reality environment (e.g., a volume allocated on-demand with voxels having a size of ten cubic centimeters). In some embodiments, the respective voxels of the voxel grid aggregation module 116 are caused to be resized based on a determination (e.g., by the AR system 100) location and/or size of a detected intruder within the voxel grid generated by the voxel grid aggregation module 116.

In some embodiments, the voxels in the voxel grid may decay (e.g., disappear) based on a determination by a temporal decay module 118. In some embodiments, the temporal decay module 118 causes voxels to be removed from the voxel grid aggregation module 116 based on a determination that real world positions corresponding to the respective voxels within the voxel grid have been unoccupied for a predefined decay period. Using the temporal decay module 118 can reduce an amount of flickering in a voxel grid that may occur (e.g., after 1 second or after a predefined number of frames have been rendered that so not show the physical object, cease to represent the physical object with a voxel), and can also provide for a more accurate and temporally dynamic determination of intruders detected in proximity to the user. For example, an intruder to a real-world space that is being represented by a particular voxel grid may be moving slightly such that it would be represented by different grid points within a particular voxel grid, despite being present in a substantially similar location within real-world space, and the temporal decay module 118 may cause the voxel grid to represent the real-world object at a single point in a voxel space, such that a practical representation of the object's presence within a boundary contour is accurately represented. That is, objects that may be occluded temporarily are not necessarily cause to be eliminated immediately (e.g., a form of object permanence). In some embodiments, the temporal decay module 118 can prevent false positive detections or other aberrations from remaining in the voxel grid generated by the voxel grid aggregation module 116.

Turning now to meshing and visualization phase 164, a grouping module can be used to determine how to represent the voxel grid (e.g., using presentation component of a user's AR headset, such as a display 1135A of the AR system 1120) based on (i) whether intruders are detected within the predefined boundary of the user and (ii) based on the stereo image set 101 that was obtained during the stereo reconstruction phase. In some embodiments, additional stereo images are added to the stereo image set 101 based on detecting an intruder.

Data from the voxel grid aggregation module 116 is provided to a boundary check module 120, which can be configured to detect objects (e.g., intruders) within a guardian contour 122. Data about the guardian contour 122 can be provided to the boundary check module 120 as part of the boundary check determination. Based on a determination by the boundary check module 120, one or more intruder voxels 124 can be determined. In some embodiments, a voxel occupation threshold must be met in order to determine that a voxel is occupied. In some embodiments, the voxel occupation threshold is based on a number of frames for which the respective voxel is occupied. The intruder voxels 124 can be supplied to an intruder meshing and texturing module 126, which can be configured to generate a meshed representation of a physical object corresponding to some or all of the intruder voxels 124. In some embodiments, information about the intruder voxels 124 can be used to automatically define the guardian contour 122 as part of the meshing and visualization phase. That is, in accordance with some embodiments, the guardian contour 122 may be generated based on the determined intruder voxels, such that the guardian contour is automatically configured to adapt based on respective locations of the intruder voxels. Based on the determination that one or more of the voxels of the voxel grid aggregation contain an intruder, one or more stereo images of the stereo image set 101 (e.g., the left stereo image 102 and the right stereo image 104) are further provided to a meshing and visualization module 164 to provide a more accurate representation via the intruder meshing and texturing module. In other words, the voxels act as a map so that the intruder meshing and texturing module 126 can determine what portions of the left stereo image 102 and the right stereo image 104 are to be displayed (e.g., displayed as a meshed representation). From the left stereo image 102 and the right stereo image 104 a meshed representation of the physical object can be created, which interferes less with the user's artificial reality experience than just passing through the left stereo image 102 and the right stereo image 104.

In some embodiments, a particular color can be applied to the meshed representation based on an aspect of the real-world object corresponding to the underlying intruder voxels 124 (e.g., a proximity with respect to the user, whether the intruder voxels are representing a living object (e.g., a child of the user)). In some embodiments a particular color can be applied to all, or part of the meshed representation based on information from the temporal decay module 118 (e.g., providing an indication as to a staleness of one or more of the voxel occupations). In some embodiments, the meshed representation can changes based on the type of physical object detected (e.g., a living being (e.g., a child of the user) can have one color, a different particular color can be applied that correspond to non-living objects within the guardian contour (e.g., furniture, pets, etc.)). In some embodiments, colors of the meshed object can be adjusted based on respective colors in the stereo images of the set of stereo images. In some embodiments, when an object with complex features is detected (e.g., a face of a person) the texture of the face can also be included in the mesh to create a more lifelike representation. In some embodiments, one or more intruder feature criteria can be applied to determine whether to texture additional and/or alternative features based on the intruder's features.

Figure 2:
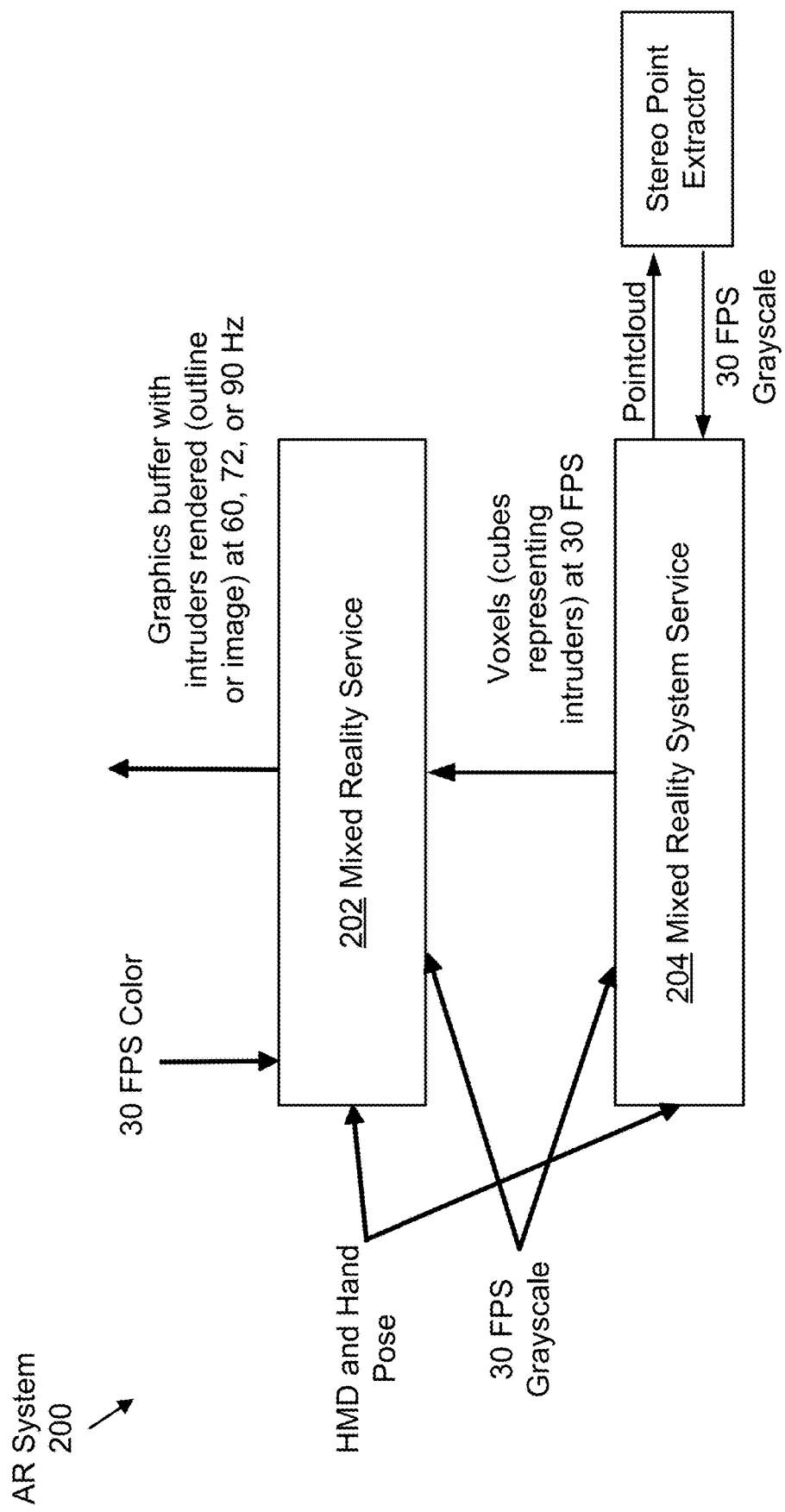
FIG. 2 shows an example block diagram of a mixed reality service module of an AR system, in accordance with some embodiments.

FIG. 2 shows an example block diagram of an AR system 200 that includes a mixed-reality (MR) service module 202 of an AR system 200 (e.g., which can include some or all of the components of the AR system 100), in accordance with some embodiments. In some embodiments, the AR system 200 includes an MR service 202, which is configured to operate at one or more particular frame rates (e.g., fifteen frames per second (FPS), thirty FPS, sixty FPS, 120 FPS, etc.). In some embodiments, the mixed-reality service 202 is configured to include or cause operations of a graphics buffer that renders intruders at a frequency between 50-100 hertz (e.g., outlines, images, and/or meshed representations of real-world objects representing intruders of a guardian contour). In some embodiments, the MR Service 202 is configured to operate at a frame rate of between ten and fifty frames per second. In some embodiments the MR Service 202 is configured with a predefined memory allocation (e.g., thirty mebibytes (MiB)), and the respective subdivisions are based on the allocation of memory. In some embodiments, the MR Service 202 is configured to use less than one hundred milliwatts of power. In accordance with some embodiments, particular logical components of the AR system 100 shown in FIG. 1 are used by either the MR service module 202 or the MR system service module 204, respectively. For example, in accordance with some embodiments, one or more components for performing determinative logic related to intrusion detection are performed by the MR service module 202, and one or more components for rendering visual representations of detected intruders are part of the MR system service module 204. For example, the stereo reconstruction phase 160 and/or the voxel grid aggregation phase 162 may be part of the MR service module 202, and one or more components of the meshing and visualization phase 164, such as the intruder voxel module 124, the intruder meshing and texturing module 126, and/or the rendering module 128 are part of the MR system service module 204.

In some embodiments, the AR system 200 includes one or more processors. In some embodiments, different processors in the AR system 200 have different processing power. For example, a first processor or sub-processor of the AR system 200 may have a set of gold cores and a second processor or sub-processor of the AR system 200 may have a set of silver cores. The gold cores are capable of operating with higher performance (e.g., higher operating frequency). In some embodiments, each of the set of gold cores is configured to operate at a maximum frequency between 2-3 gigahertz. In some embodiments, the silver cores are configured to operate a maximum frequency of between 1.5-2 gigahertz. In some embodiments, a particular graphical processing unit (GPU) of the AR system 200 is enabled by the MR Service 202 in accordance with a determination (e.g., by the AR system 200) that intruders are detected (e.g., within a guardian contour associated with the AR system 200). In some embodiments, the GPU is not used when no intruders are detected within the guardian contour associated with the AR system 200 (e.g., within the guardian contour 122 discussed with respect to FIG. 1).

In some embodiments, the MR Service 202 (e.g., via passthrough and product-service system (PSS)) is configured to run on one or more respective processors or sub-processors of the first set of processors or sub-processors having the gold cores. In some embodiments, the identity detection module (including one or more respective modules of the AR system 100 described with respect to FIG. 1, and one or more different modules of the AR system 200) can be run on one or more respective processors or sub-processors of the first set of processors or sub-processors having the silver cores. In some embodiments, the identity detection module is an always-on (e.g., persistently running) background feature. That is, in some embodiments, one or more respective modules of one of the respective AR systems 100 and/or 200 is continuously performed while the user is using the respective AR system, regardless of the particular AR application or experience the user is interacting with. In some embodiments, the compute time for the MR Service 202 is within a single frame time (e.g., thirty frames per second). That is, each respective performance cycle of the MR Service 202 may be performed between each respective frame of artificial-reality that is rendered by a respective user's AR headset.

Figure 3A:
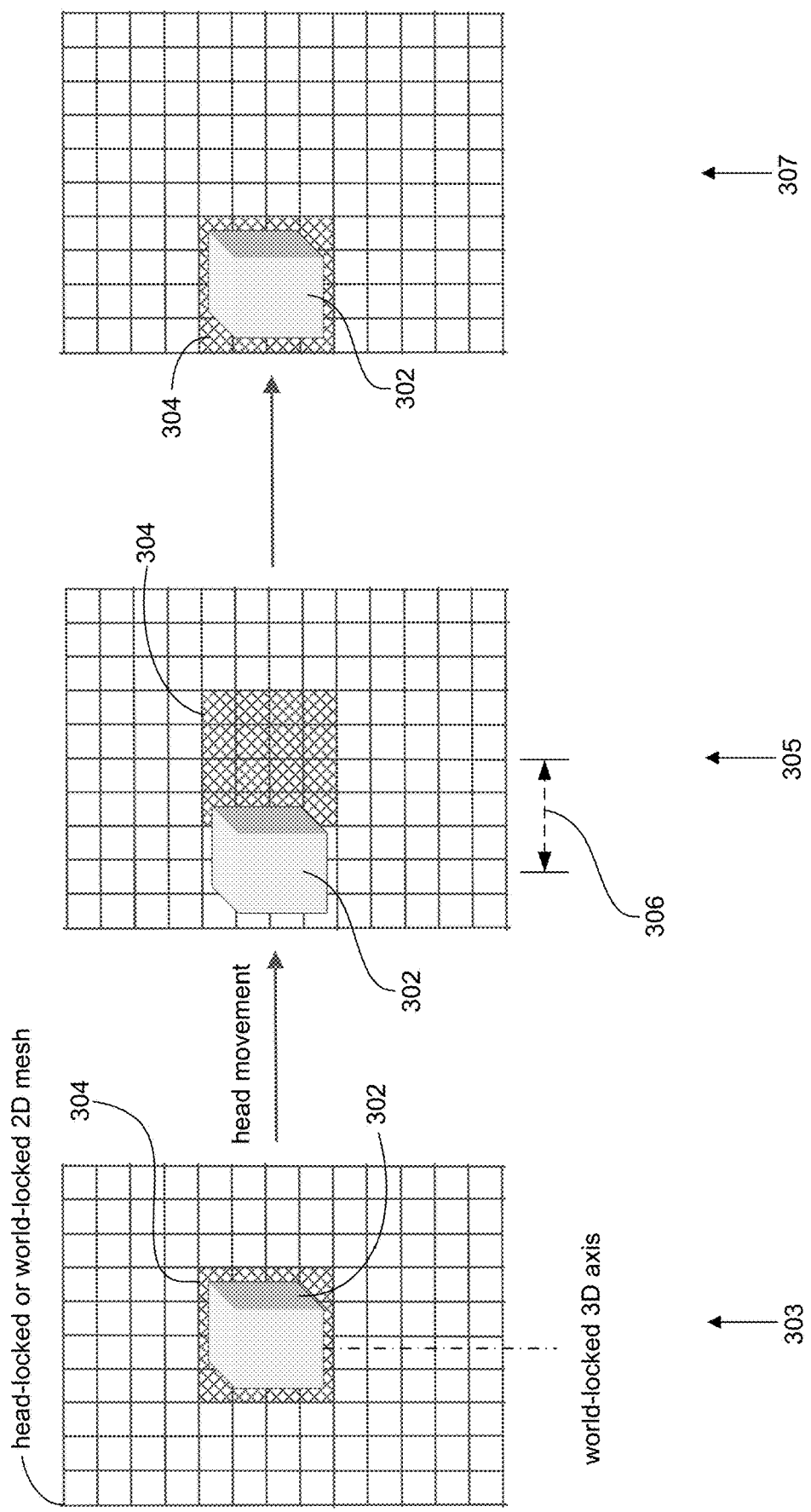
Figure 3B:
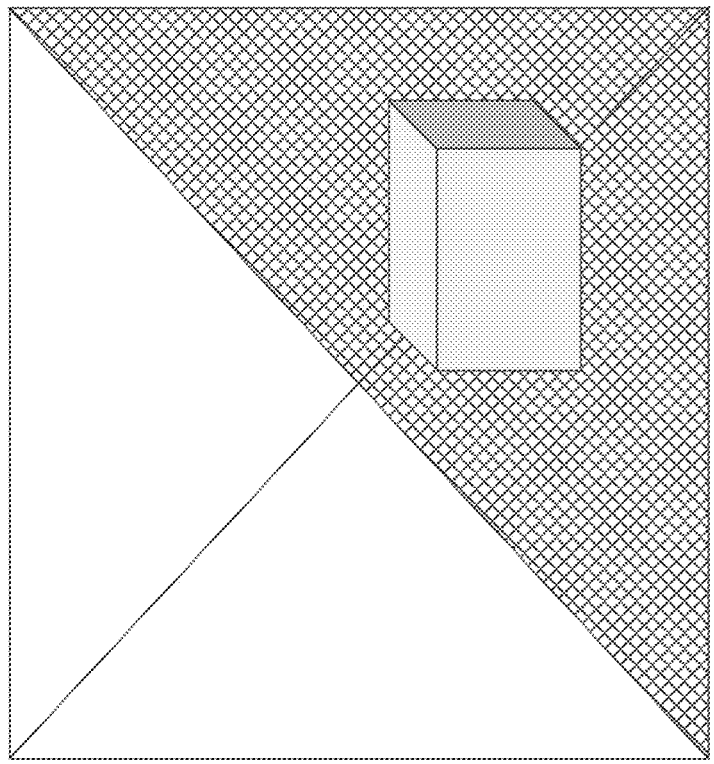
Figure 3B:
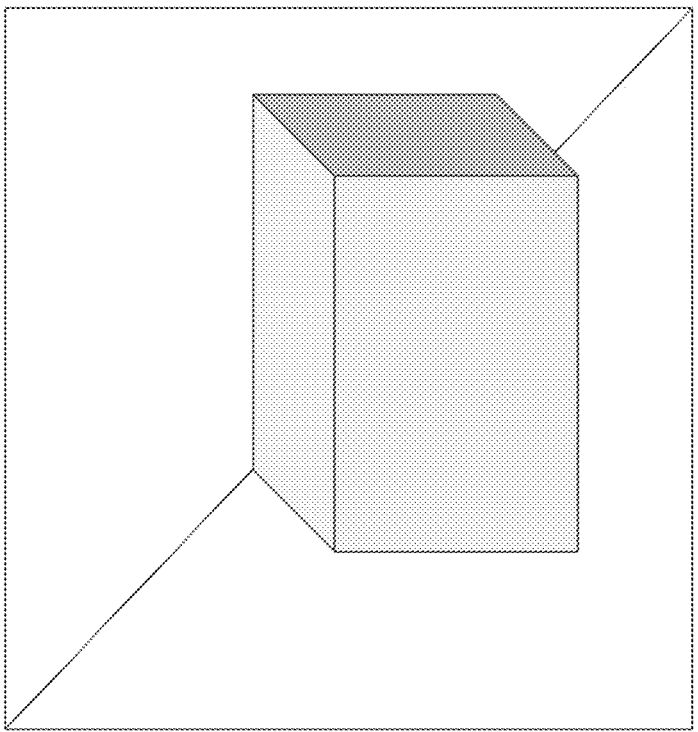

FIGS. 3A-3C show aspects of MR service module of an AR system (e.g., the MR service 202 of the AR system 200 described with respect to FIG. 2), in accordance with some embodiments. FIG. 3A illustrates a field of view of a user that is wearing a head-worn device (e.g., a VR headset) during the performance of a head movement from a first head orientation to a second head orientation while an artificial-reality environment is displayed at the head-wearable device.

The first pane 303 of FIG. 3A illustrates a first mesh representation of AR content generated for at least a portion of a field of view of a user of an AR headset (e.g., the AR device 1100 or the VR device 1110). A skilled artisan will appreciate that the illustrations of the field of view of the user (and/or the associated mesh representation of the AR content) that are depicted by the panes shown in FIG. 3A are simplified for ease of explanation, and are not necessarily indicative of any real-world designs or implementations of AR content. The field of view shown in the first pane 303 includes a physical object 302, which is being detected within a guardian contour of the user of the AR headset. A first mesh portion 304 corresponding to the physical object 302 is shown within the first two-dimensional mesh derived from the voxel grid (which can be generated by the meshing and visualization phase 164 of the process described with respect to the AR system 100 in FIG. 1). In some embodiments, the mesh containing the meshed representation is head-locked, meaning it is locked to the user's head movement. In some embodiments, the mesh is world-locked, meaning that it is tied to a stationary reference point. That is, as described herein, world-locked AR content is a type of AR content in which virtual objects are placed with reference to real objects within the physical surroundings of the user of the AR headset.

In some embodiments, when a user's movement is slow or otherwise slight (e.g., having a movement distance 306 that is not greater than three voxel grids, five voxel grids, seven voxel grids, etc.), meshed representations can be caused to be displaced without causing a new mesh to be rendered. For example, between the first time associated with the first pane 303 and a second time associated with the second pane 305, the user of the AR headset performs a head movement that causes the AR headset to be re-positioned from a first orientation to a second orientation, distinct from the first orientation (e.g., a slight rotation to the left). In some embodiments, based on detecting the head movement, the AR headset would cause another render to be initiated, with a new representation. Such a result can cause a flickering effect at an AR headset.

As shown in the third pane 307, in some embodiments as described herein, the meshed representation 300 would be caused to transform (e.g., a locational transform) based on the movement of the user's head without causing the AR system to fully re-render the scene being presented by the user's AR headset. In some embodiments, no other operations are performed to cause the meshed representation 300 to move from a first position to a second position within a head-locked mesh presented by the user's AR headset. By performing such a localized re-rendering of a particular portion of the AR content being presented within the field of the view of the user of the AR headset, flickering effects, which may cause dissociation or otherwise distract from the immersive AR content being presented to the user, may be minimized by the AR system represented by the respective panes 303, 305, and 307.

FIG. 3B shows a meshed representation of an object with a first number of triangles in the left mesh 322 (e.g., two triangles). The right mesh 324 in FIG. 3B shows the meshed representation 320 with a second number of triangles. In some embodiments, a triangular subdivision is generated in a mesh based on a determination that the object being represented is smaller than a threshold voxel size.

FIG. 3C shows a meshed representation 330 of a physical object 332. The meshed representation 330 is presented within a mesh that has a fixed locational coordinate center (e.g., a 0,0,0) point. That is, it has a fixed reference frame 334. In some embodiments, the locational coordinate center replaces a meshed representation that provides a field of view representation.

Example Interaction Sequence within an AR System

Figure 4A:
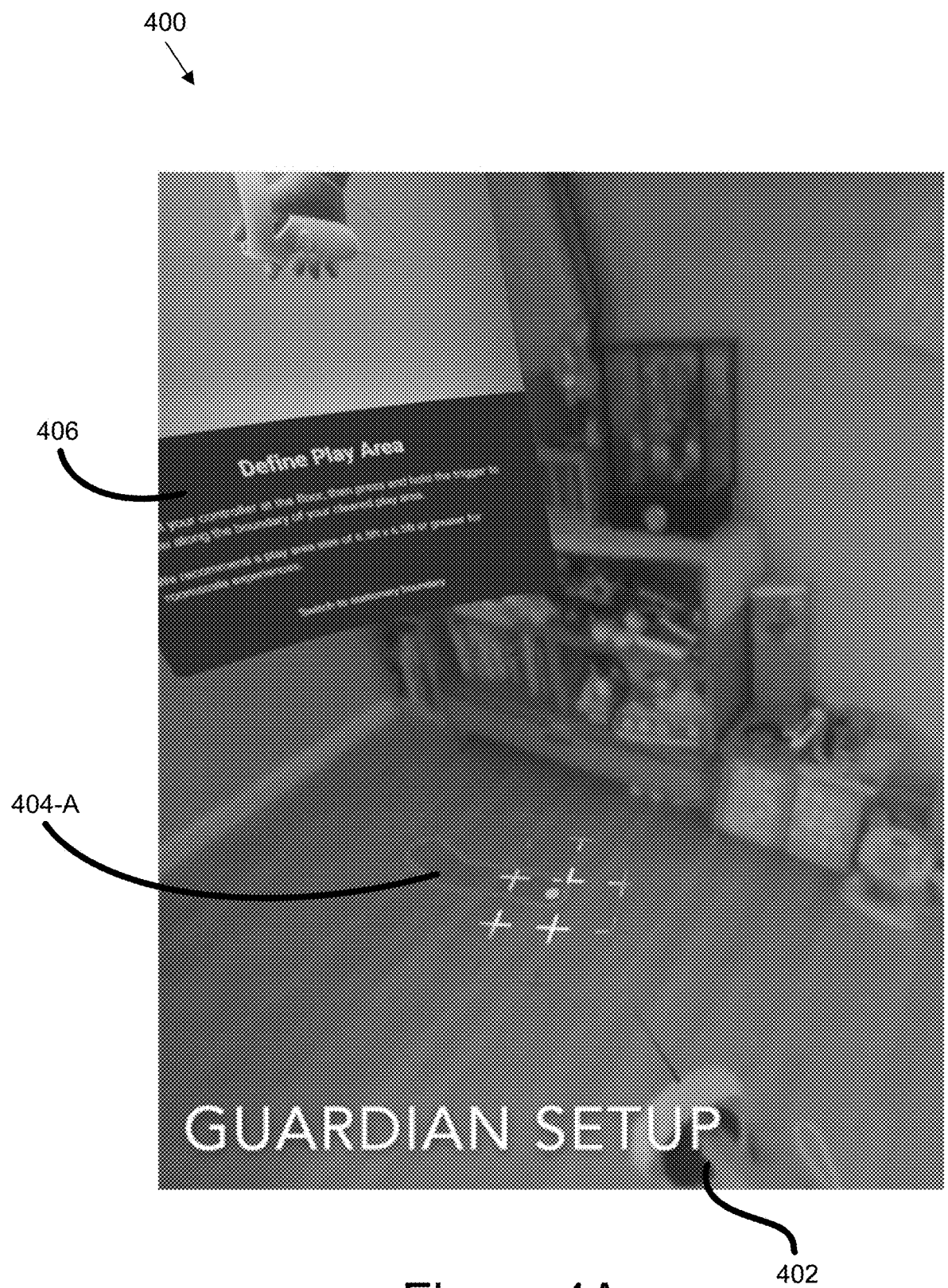
FIGS. 4A to 4N is a sequence illustrating an example user interaction with an artificial-reality environment, in accordance with some embodiments.
Figure 4B:
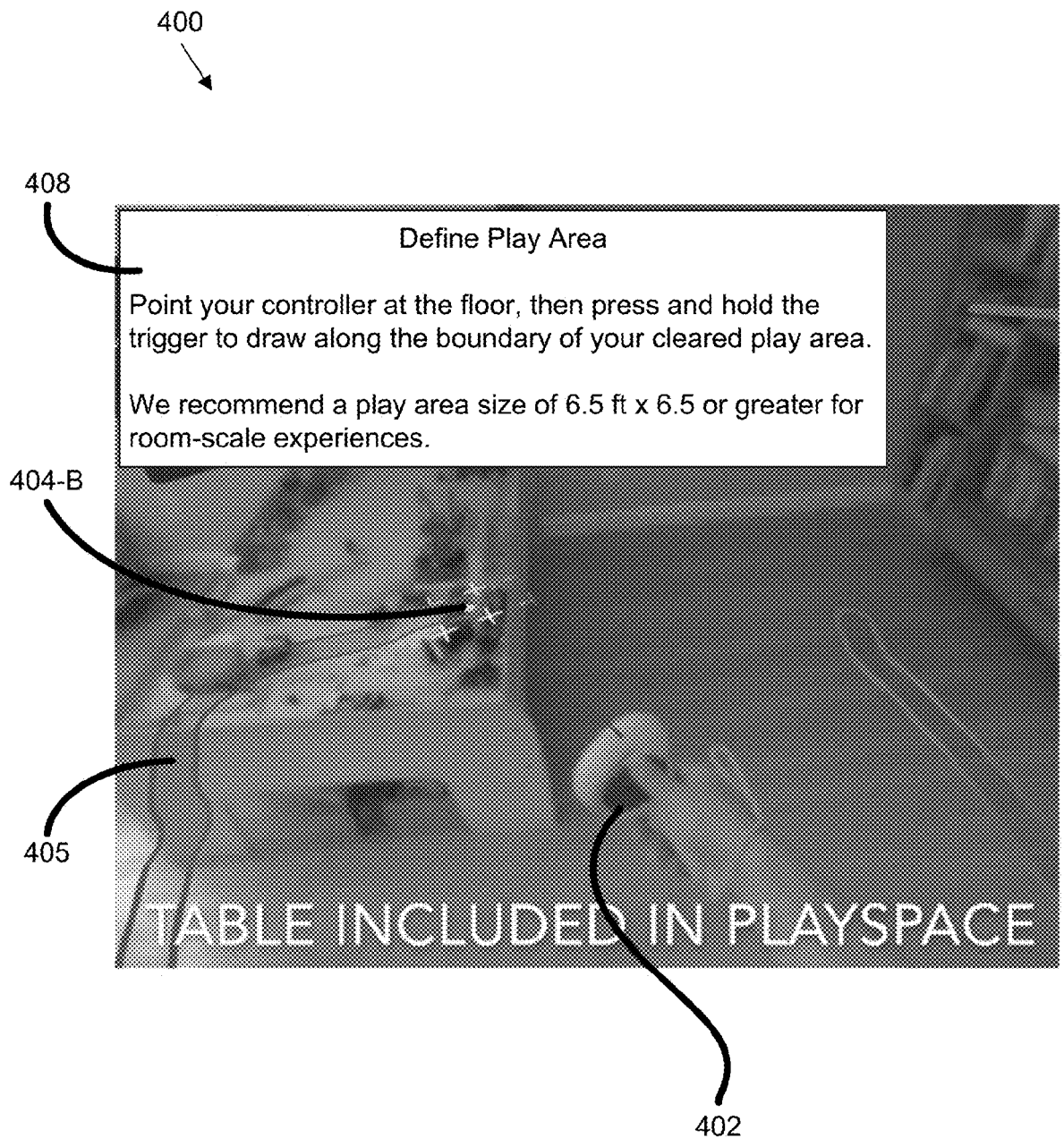
Figure 4C:
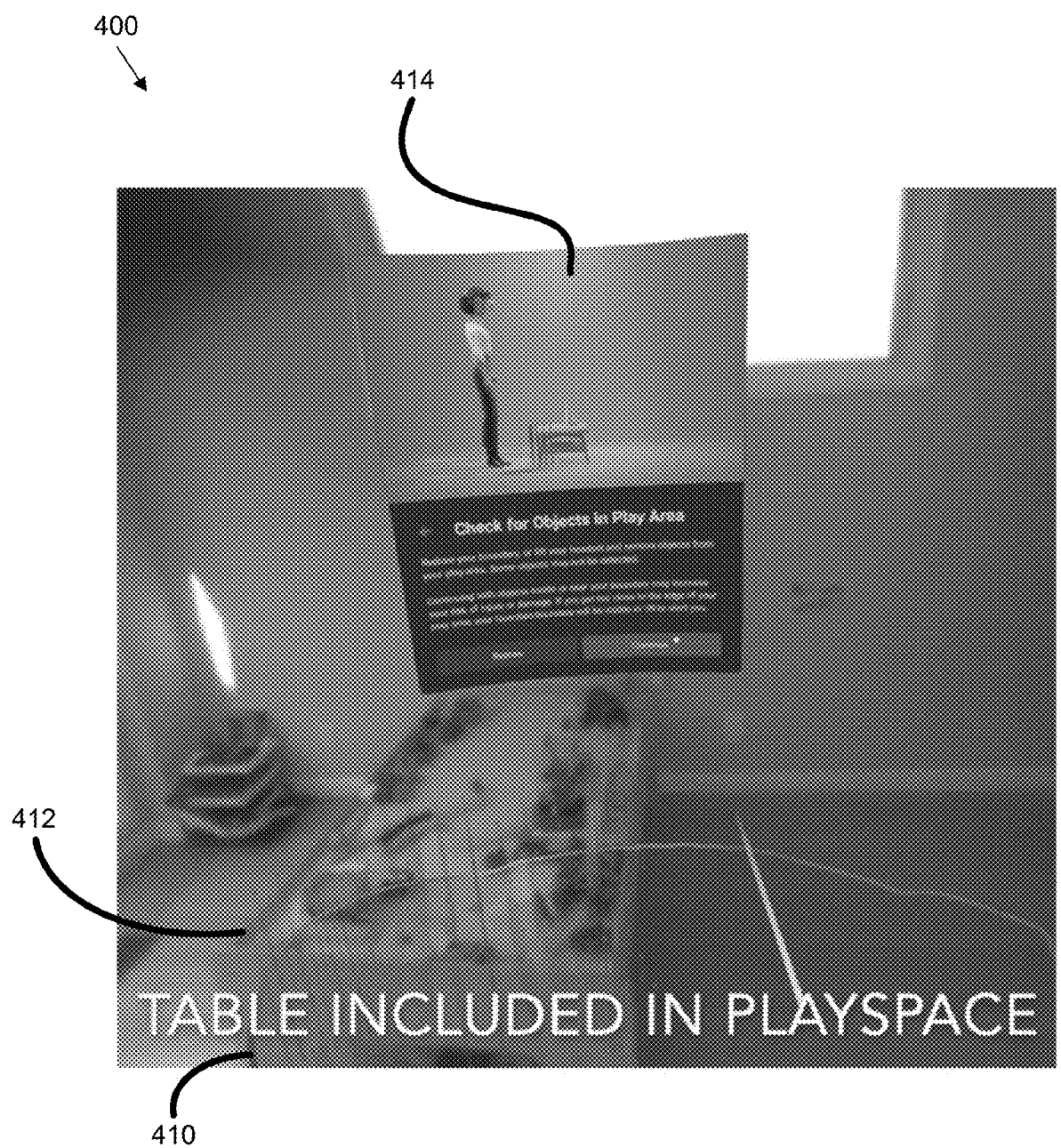
Figure 4D:
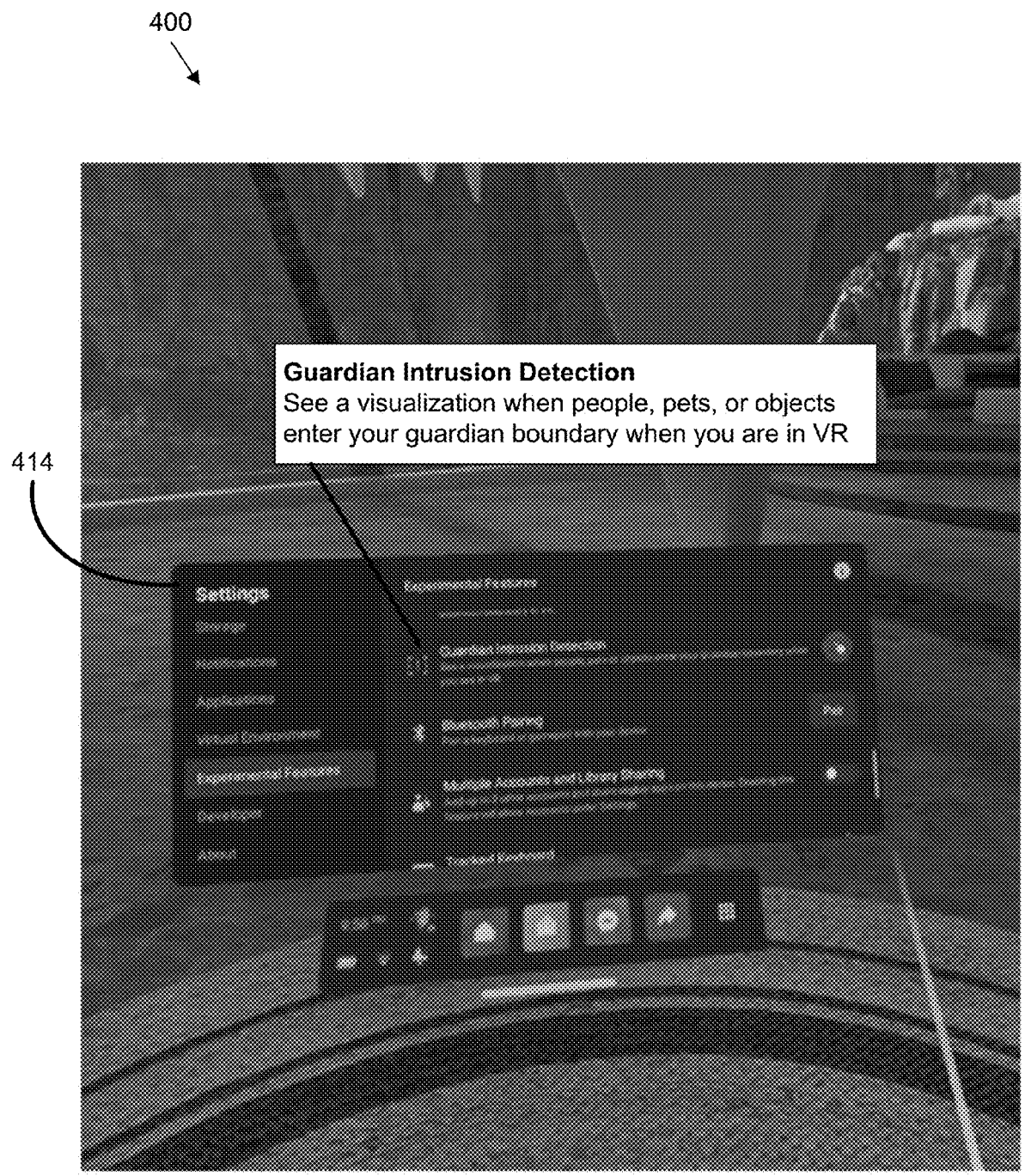
Figure 4E:
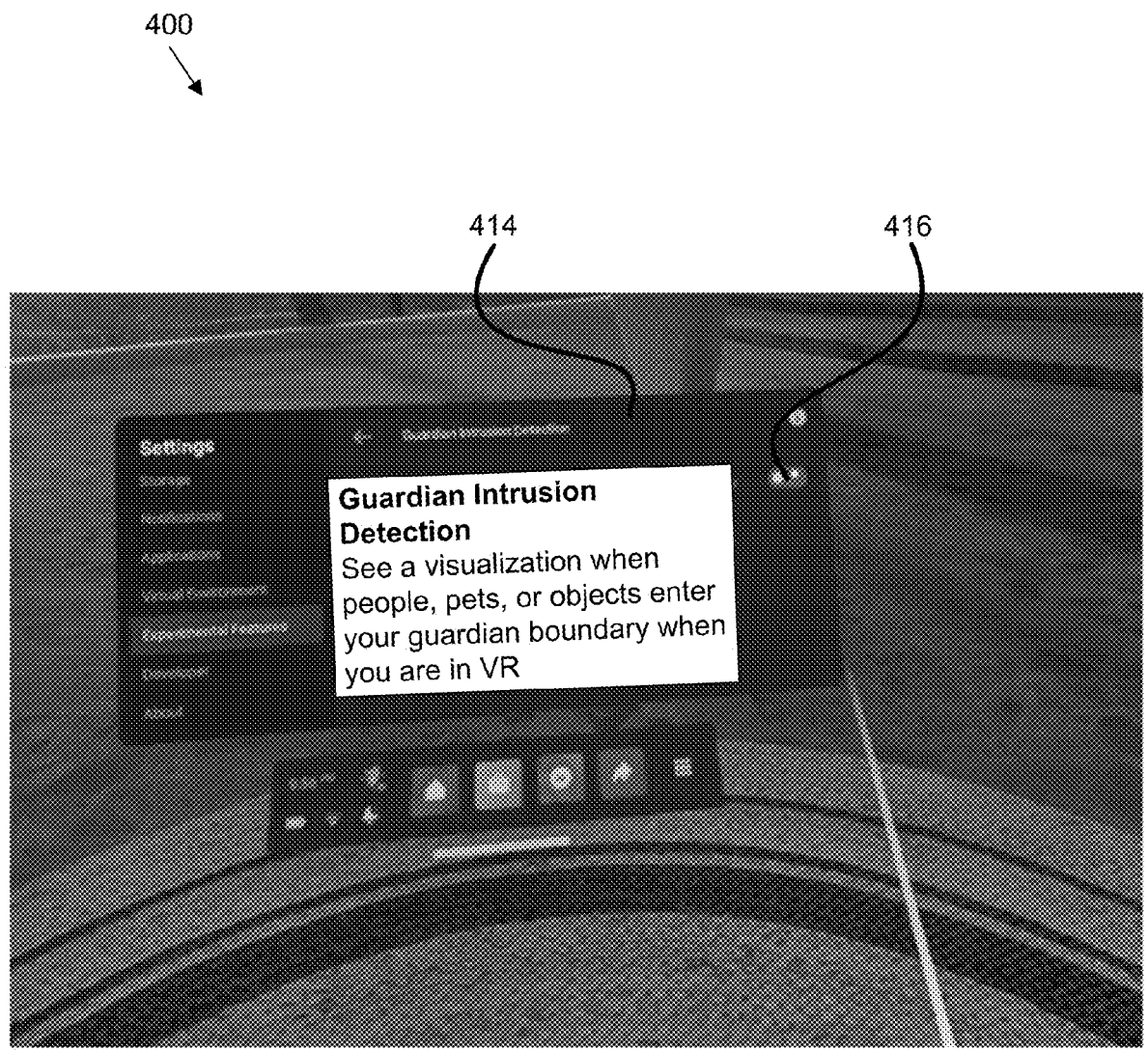
Figure 4F:
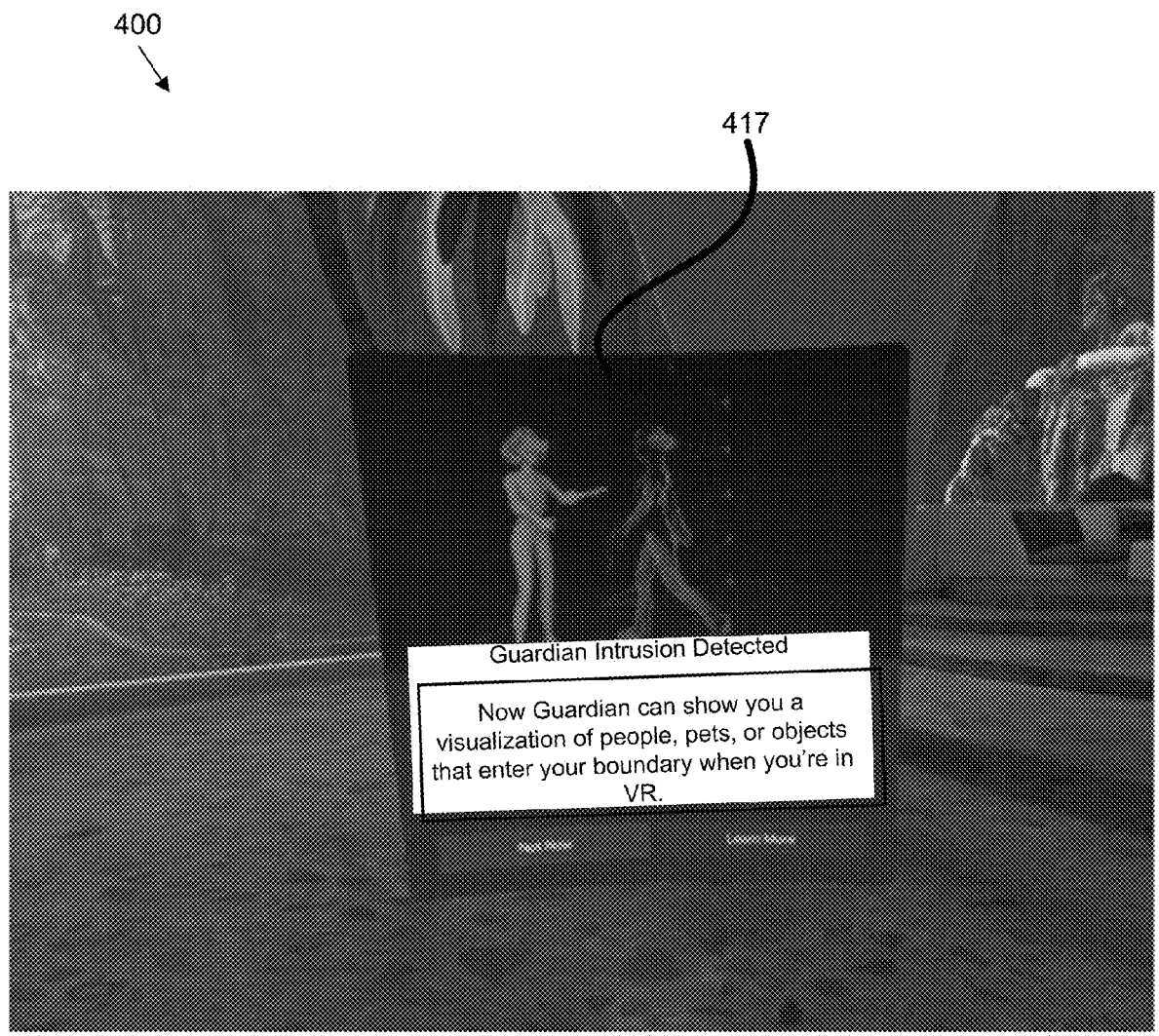
Figure 4G:
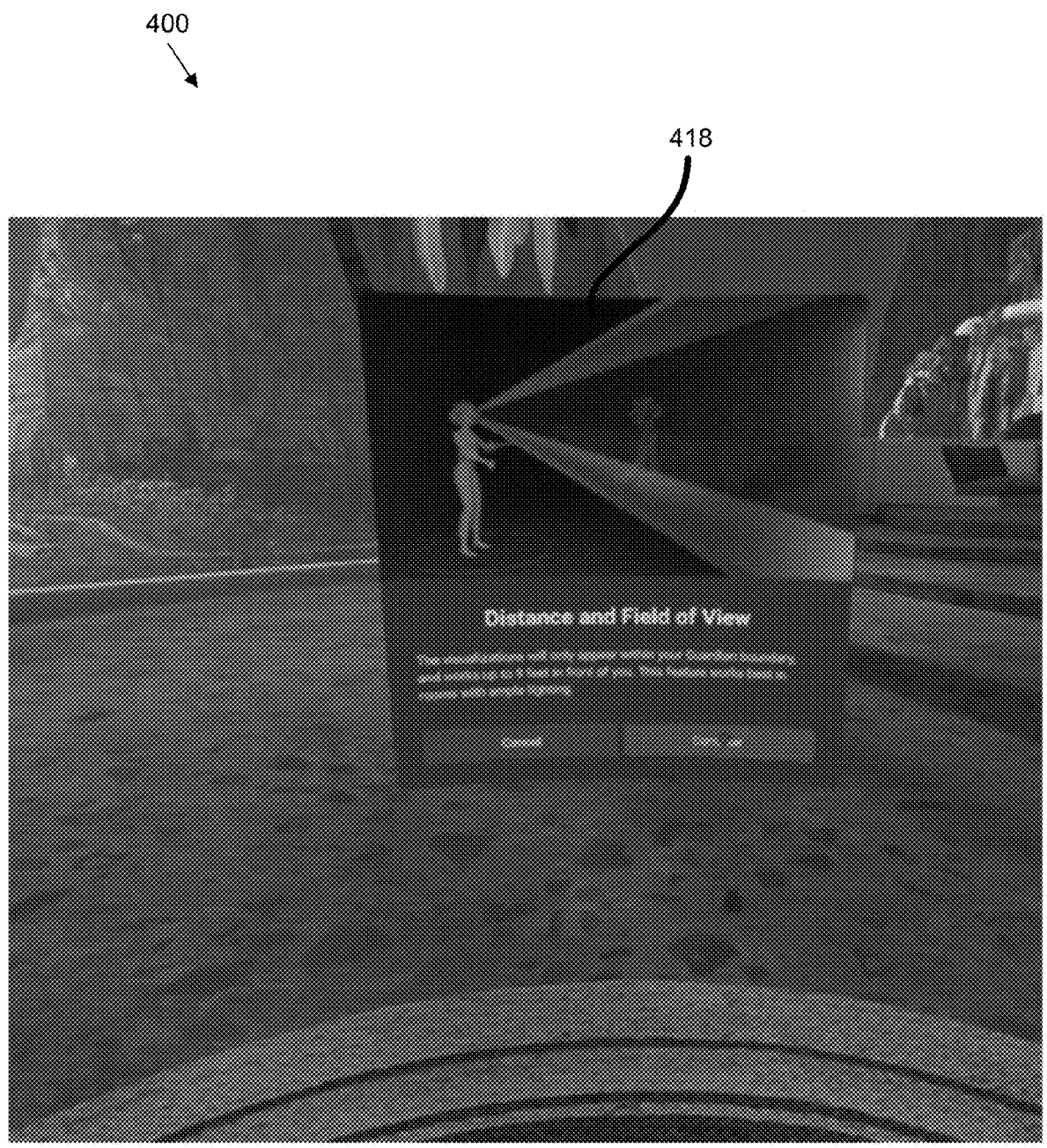
Figure 4H:
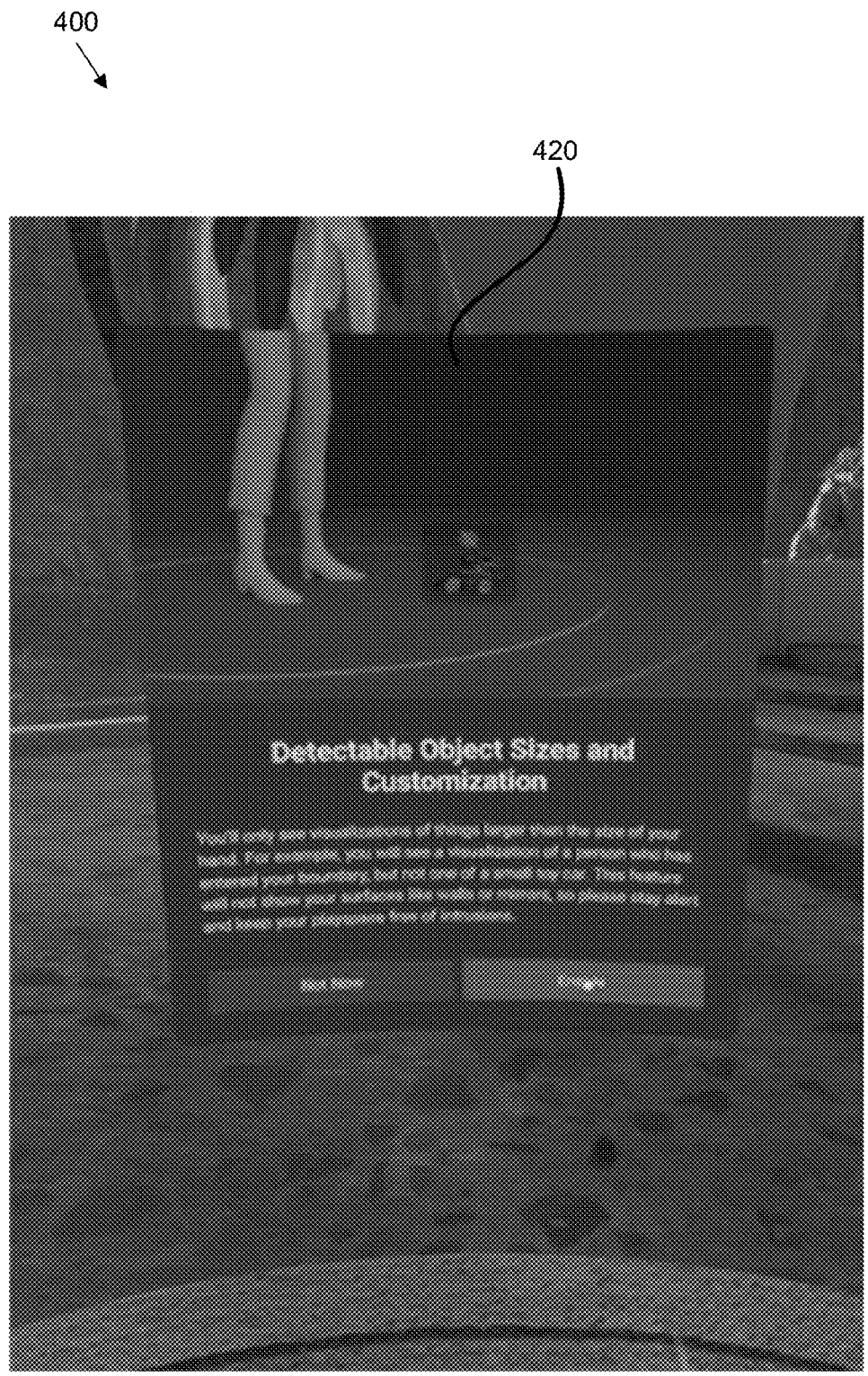
Figure 4I:
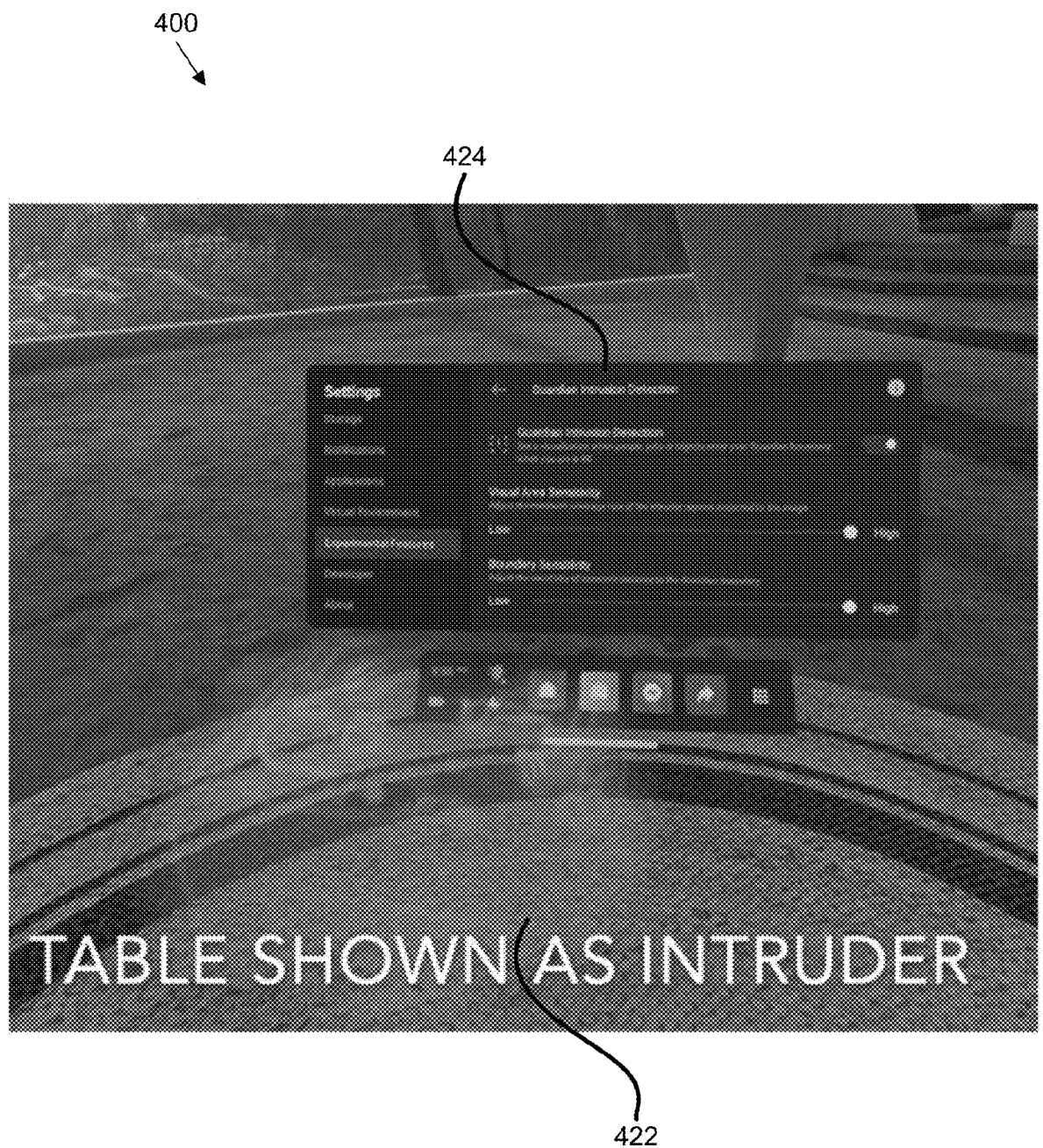
Figure 4J:
Figure 4K:
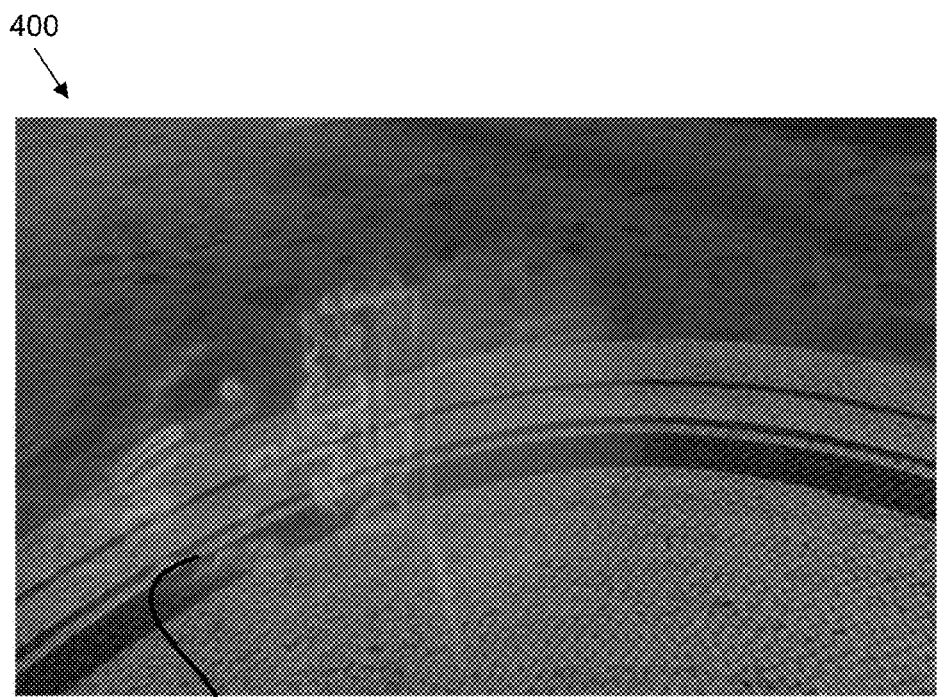
Figure 4L:
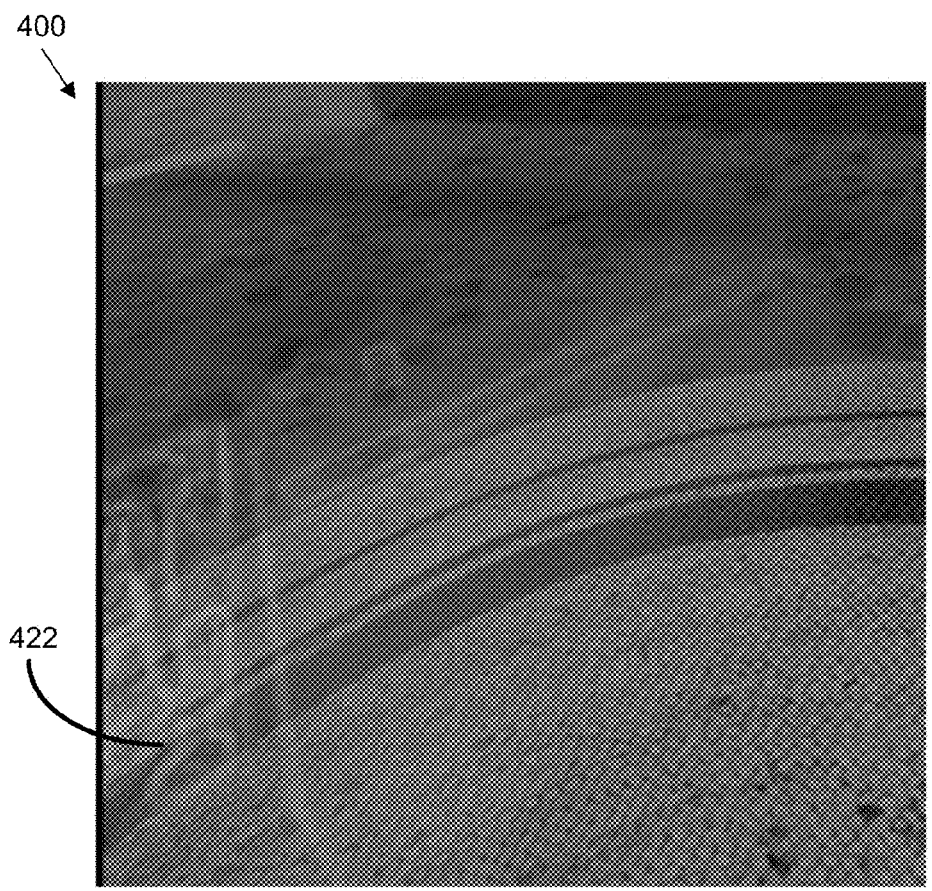
Figure 4M:
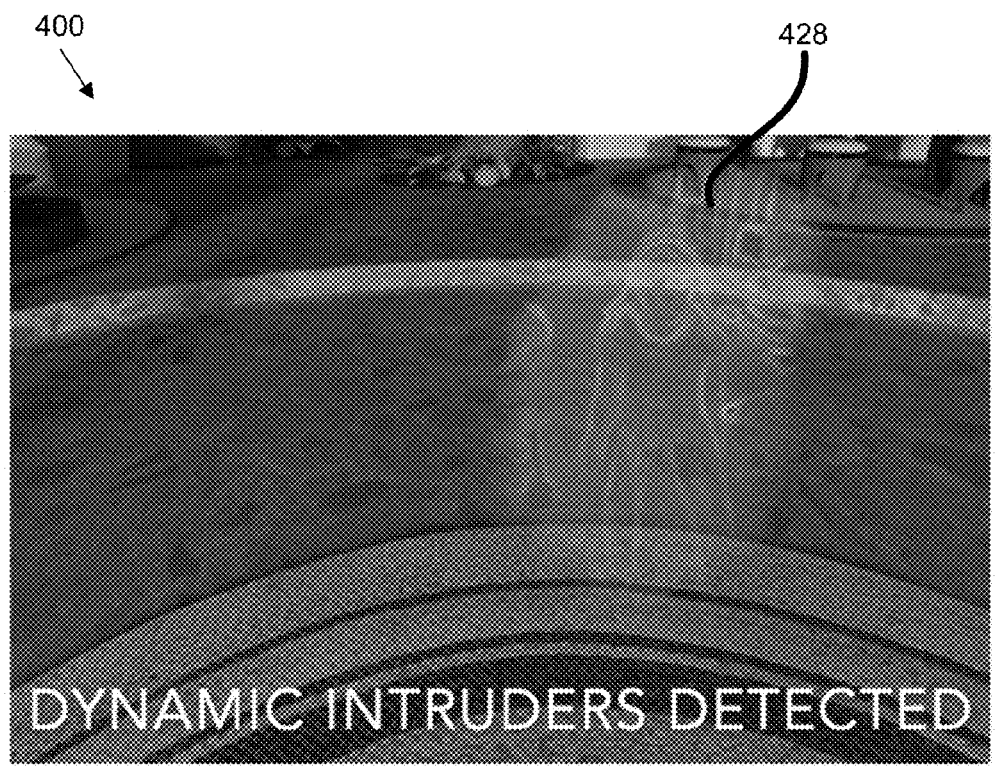
Figure 4N:
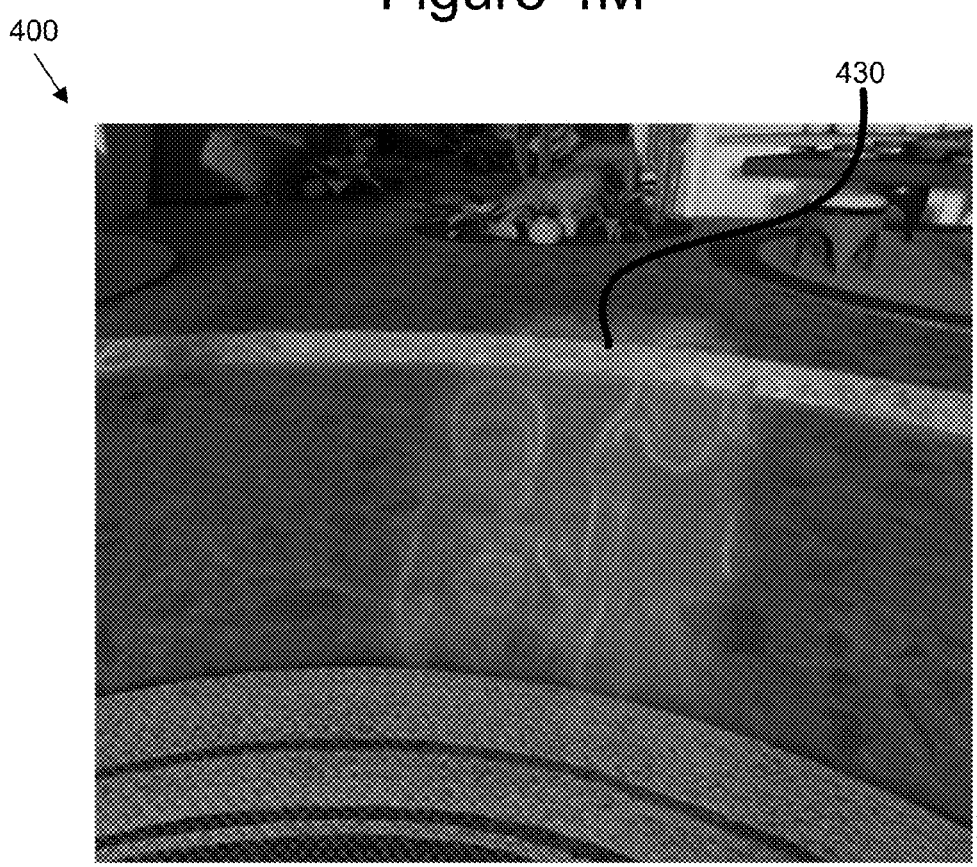

FIGS. 4A-4N is a sequence illustrating an example user interaction with an AR system 400, in accordance with some embodiments. In some embodiments, the artificial-reality environment is presented via an AR headset worn by a user (e.g., the AR device 1100, and/or the VR device 1110).

FIG. 4A shows a user beginning to define a boundary (e.g., a guardian contour, which may correspond to the guardian contour 122 shown in FIG. 1) for interacting with the AR system 400. The user is using a controller 402 to define the boundary. In some embodiments, a wrist-wearable device (e.g., the wrist-wearable device 1000) can be used additionally, or alternatively, to controllers, including the controller 402. In some embodiments, an AR headset includes front-facing and/or peripheral cameras, which may be used to detect hand motions even when the user is not holding or wearing an electronic device. In some embodiments, a hand-held intermediary processing device, such as the HIPD 1200 described in more detail with respect to FIGS. 12A and 12B may include motion-tracking sensors (e.g., the imaging sensors 1254), which may be used to detect hand gestures performed by the user of the AR system 400. A boundary portion 404 is displayed while the user of the AR system 400 is defining the boundary (e.g., the guardian contour 122 in FIG. 1), in accordance with some embodiments. A notification user interface element 406 is displayed, providing instructions for the user to define the boundary. In some embodiments an MR system service module (e.g., the MR system service module 204 in FIG. 2) inter-operates with an MR service 202 that is being used to generate the boundary, where the MR system service causes one or more notifications to be provided while the user defines the boundary corresponding to the guardian contour.

FIG. 4B shows the user continuing to define the boundary via the controller 402 for interacting with the AR system 400. In FIG. 4B, the AR system 400 includes a different boundary portion 404, indicating that the user has further progressed in defining the boundary described with respect to FIG. 4A. The boundary portion 404-B includes an object detection indication 405 (e.g., having a different visual texture than the non-intersecting portion of the boundary portion 404).

FIG. 4C shows a meshed representation 410 being presented within the AR system 400. The meshed representation 410 is defined based on the perimeter of the boundary contour that is shown being defined by the user in FIGS. 4A and 4B. In some embodiments, the guardian contour illustrated by the meshed representation 410 represents an interactable area (e.g., a playable area) of the AR system 400, such that AR content that is configured to be interacted with by the user is presented to appear within the guardian contour represented by the meshed representation 410 (e.g., based on a determination that the physical object is within the boundary). A meshed representation 810 of the guardian contour is presented via the artificial reality environment (e.g., to indicate the playable area). Another meshed representation 812 is presented corresponding to the meshed portion 808. In some embodiments, the meshed representation 810 has different display properties than the meshed representation 812 (e.g., a point cloud to indicate possible objects that are within the boundary.

FIG. 4D shows the user navigating within a user interface 414 displayed within the AR environment presented by the AR system 400. The user interface 414 includes various options for modifying the operations of the AR system 400. In accordance with some embodiments, the various options shown within the user interface 414 includes an option for enabling a guardian intrusion detection module, the user interface 414 including text describing functionality of the intrusion detection module (stating: "Guardian Intrusion Detection, See a visualization when people, pets, or objects enter your guardian boundary when you are in VR").

FIG. 4E shows the user selecting a selectable user interface element 816 located at the user interface 414 within the AR system 400. The user is selecting the selectable user interface element 416 using a hand-held controller (e.g., the controller 402 shown in FIGS. 4A and 4B).

FIG. 4F shows a notification user interface element 417 presented within the AR system 400. The notification user interface element 417 includes text indicating: "Guardian Intrusion Detected," and "Now Guardian can show you a visualization of people, pets, or objects that enter your boundary when you're in VR. Enable this feature to help increase awareness of your physical surroundings." The notification user interface includes selectable affordances to dismiss the notification, or to learn more about the guardian feature. In some embodiments, if the user selects "Learn More," they can be presented with a boundary calibration user interface with selectable user interface elements for adjusting aspects of a predefined boundary corresponding to a guardian contour.

FIG. 4G shows another notification user interface element 418 presented within the AR system 400. The notification user interface element includes text indicating: "Distance and Field of View," and "The visualizations will only appear within your Guardian boundary, and works up to 9 feet in front of you. This feature works best in rooms with ample lighting." In some embodiments, the guardian boundary can be extended beyond nine feet when certain conditional criteria are met (e.g., a large room is detected, or an outdoor environment is detected).

FIG. 4H shows a notification user interface element 420 presented within the AR system 400. The notification user interface element includes text indicating: "Detectable Object Sizes and Customization," "You'll only see visualizations of things larger than the size of your hand. For example, you will see a visualization of a person who has entered your boundary, but not one of a small toy car. This feature will not show your surfaces like walls and mirrors, so please stay alert and keep your play space free of intrusions." In other words, only objects of a certain size can be displayed, but the user can customize the size of the objects they wish to have displayed.

FIG. 4I shows a meshed representation 422 being presented within the AR system 400 based on a determination that the physical object is within the boundary. The field of view of the user is substantially encompassed by artificial reality, but there is a meshed representation of a physical object (e.g., a table), based on a determination that the physical object is within a predefined boundary of the user. The user has a first head orientation (e.g., such that the headset then has a first position within the physical environment) in FIG. 8I.

FIG. 4J illustrates the meshed representation 422 being adjusted based on the user having a second head orientation, different than the head orientation shown in FIG. 4J. In some embodiments, the adjustment is caused to the mesh representation without generating a new mesh and/or without performing a new voxel aggregation.

FIGS. 4K and 4L illustrate respective views of the meshed representation 422 within the AR system 400. Each of the respective views of the meshed representation 422 can be provided based on a user's head being in a first head orientation and a second head orientation. In some embodiments, the adjustment caused to the meshed representation 422 is provided within the AR system 400 without generating a new mesh and/or without performing a new voxel aggregation.

FIGS. 4M and 4N illustrate respective views of respective meshed representation 428 and 430 within the AR system 400. Each of the respective views of the meshed representations can be provided based on a user's head being in a first head orientation and a second head orientation. In some embodiments, the adjustment caused to the meshed representation 422 is obtained (e.g., generated at the AR headset or another computing device in electronic communication with the AR headset) by the AR system 400 without generating a new mesh and/or without performing a new voxel aggregation.

As shown in FIGS. 4M and 4N, when the user moves their head from a first head orientation to a second head orientation, the meshed representation updates to display an additional intruder object that was previously not displayed within the meshed representation 428.

Play Space Scan Integration in Scene API

Figure 5:
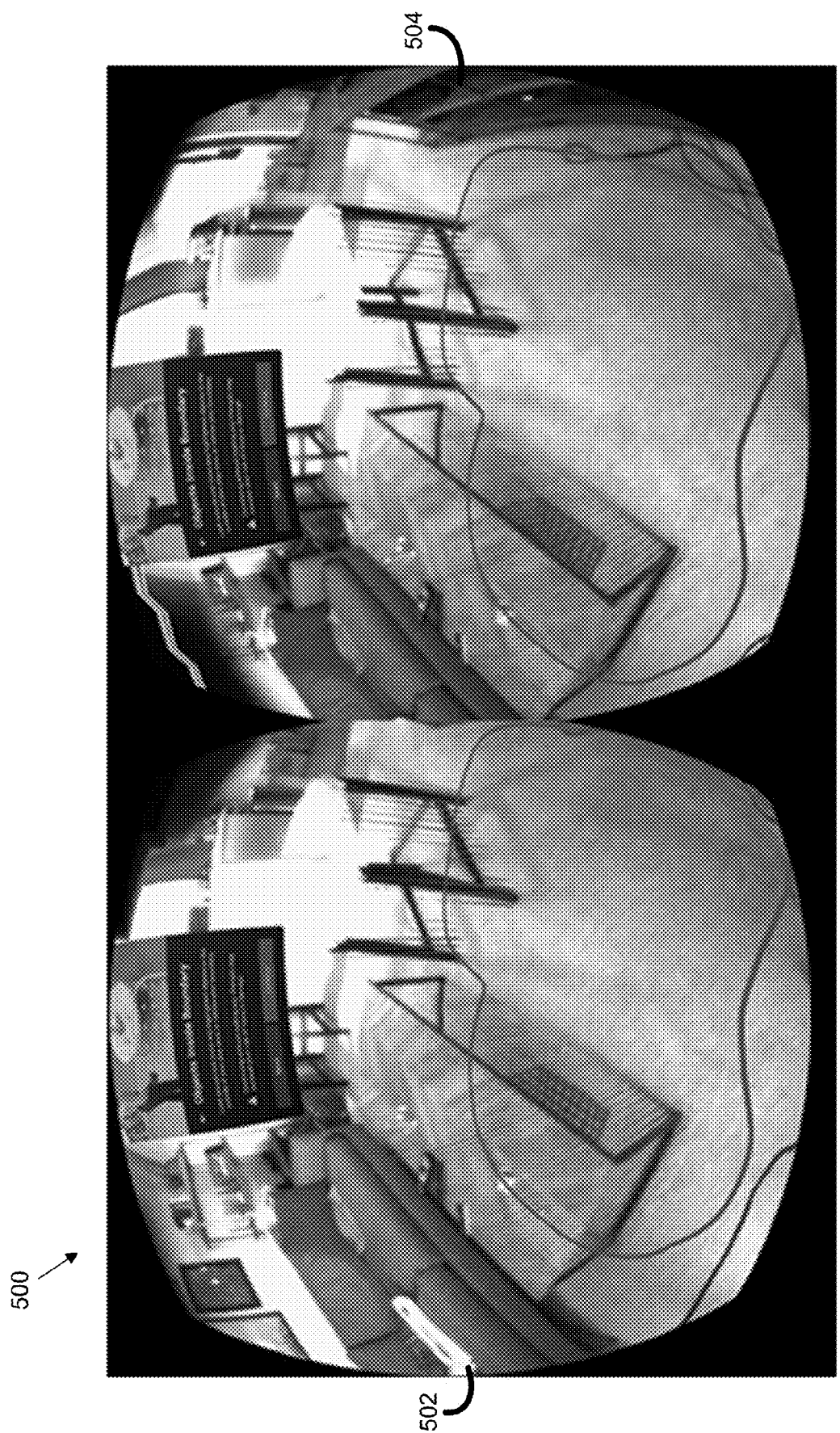
FIG. 5 shows a technique for presenting a meshed representation of physical objects within an example AR system, in accordance with some embodiments.

FIG. 5 shows a technique for presenting a meshed representation of physical objects within an AR system 500, in accordance with some embodiments. In some embodiments, distinct visualizations of meshed representations associated with boundary contours is presented at different lenses of an AR headset (e.g., a left lens 502, and a right lens 504), which can be to account for the respective locations of the different lenses 502 and 504 respectively. In some embodiments, one or more of the components of any of the AR headsets described above can be used in conjunction with the AR system 500.

In some embodiments, as shown by FIG. 5, a play space scanning module is used to estimate free space proximal to a user's current location and/or orientation. In accordance with some embodiments, the play space scanning module is an additional set of software operations of the AR system 100 that causes the stereo image set 101 to be generated or otherwise obtained. In some embodiments, the play space scanning module is used to generate the guardian contour to detect obstacles in the user's play space. In some embodiments, such techniques are employed during the guardian room scale boundary setup. In some embodiments, the mixed-reality service module includes a guardian API, which can include a predefined set of software operations that are configured to be performed when a guardian boundary (e.g., a room scale guardian boundary) is initialized. In some embodiments, the guardian API can be used to set the guardian contour and/or "read" voxels that represent occupied spaces.

In some embodiments, a different API than a voxel aggregation API can be used for play space scanning. For example, the voxel detection module can be replaced with a height map generation module that can be used to generate a height map component that includes a set of plane anchors, wherein each of the plane anchors corresponds to an intruder within the guardian contour. In some embodiments, one or more third-party applications can be used to obtain a height map, including a set of plane anchors, from the height map generation module and/or a set of data objects generated by the by the height map generation module. In some embodiments, such components can be used based on a determination that a head-worn device does not include a required component for another methodology (e.g., a plane tracker).

Example Recordings of Physical Objects by Camera Data (e.g., 3D Mesh Representations of Real-World Objects within Guardian Contours)

Figure 6A:
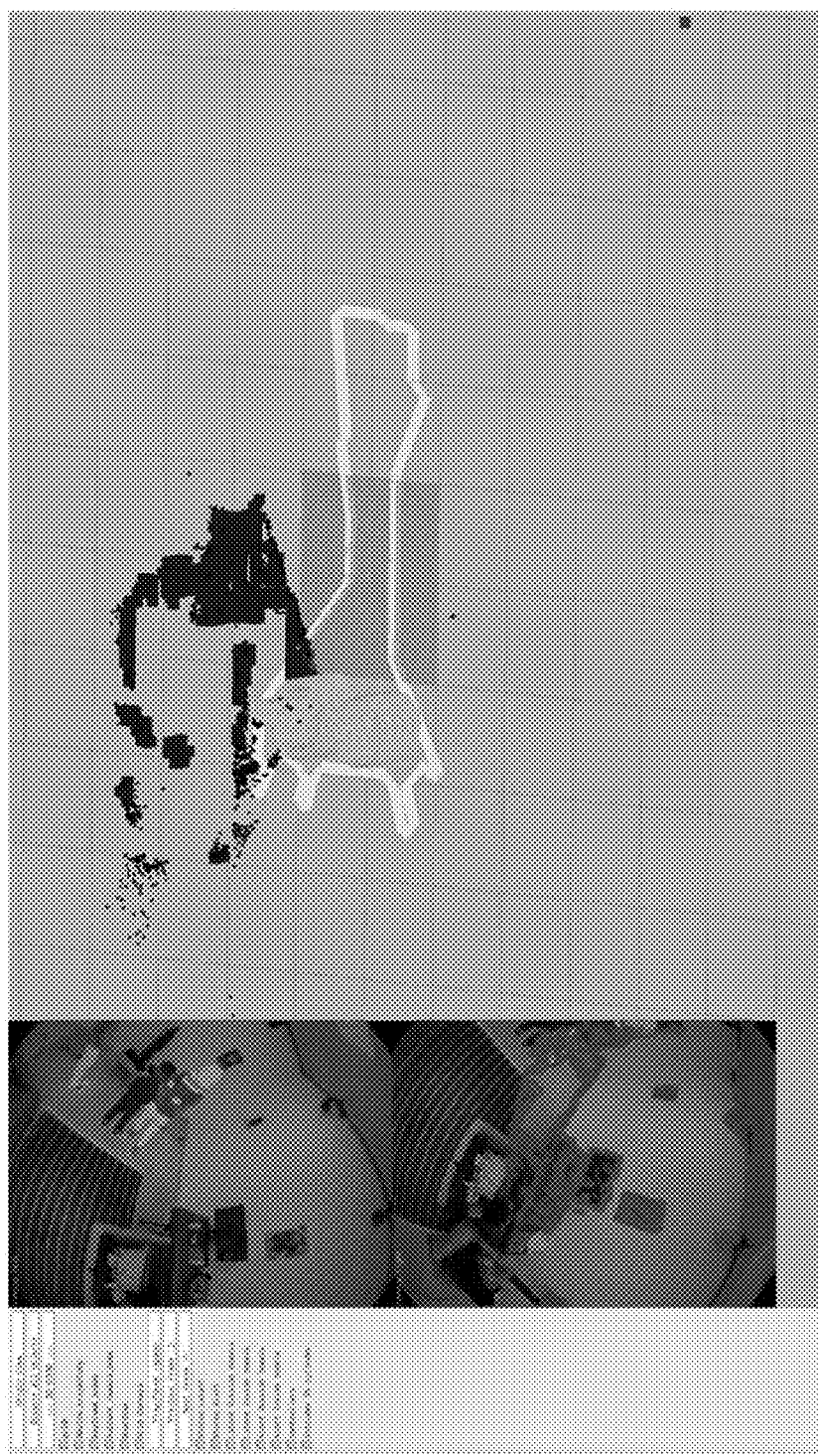
FIGS. 6A to 6C show example recordings (e.g., plots of camera data indicating how physical objects are detected in the camera data, which are referred to herein as recordings), in accordance with some embodiments.
Figure 6B:
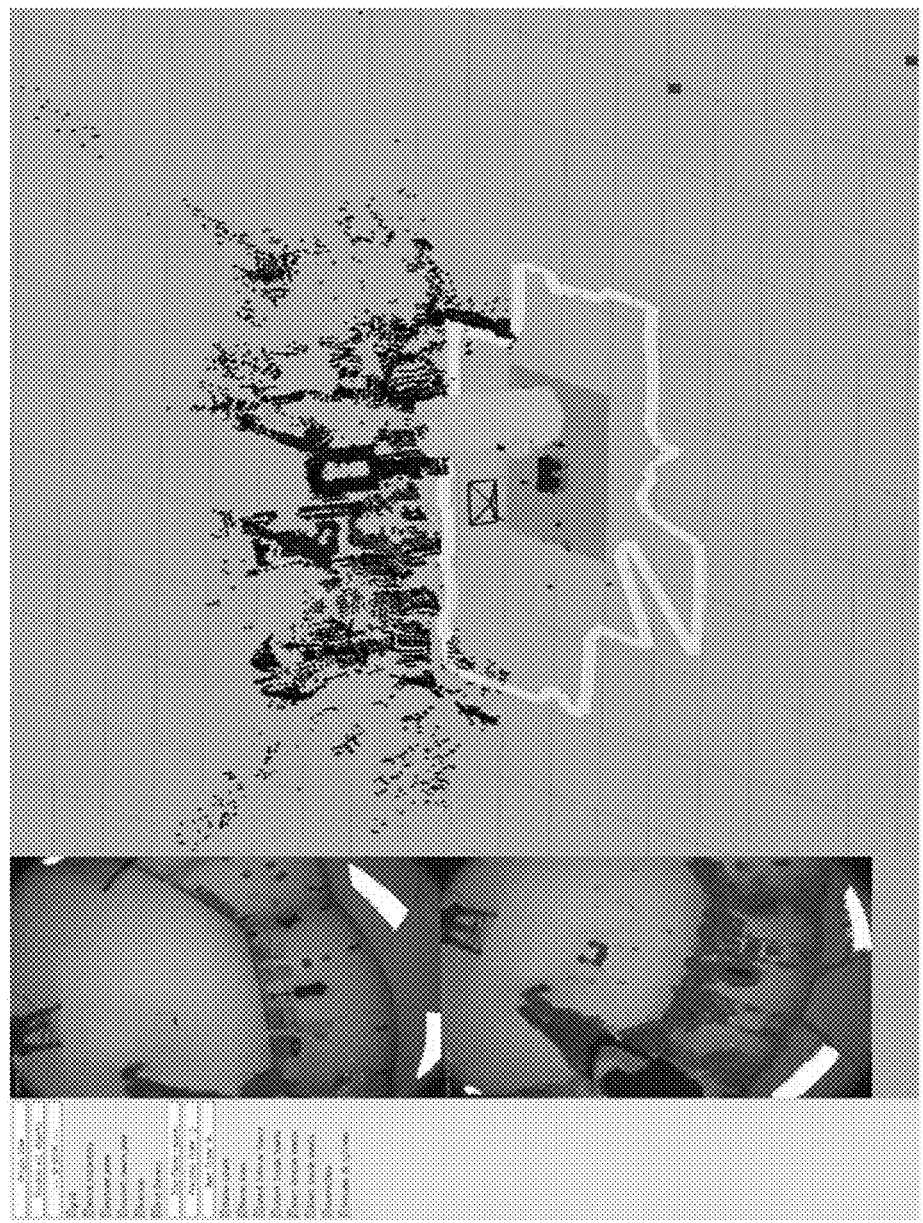
Figure 6C:
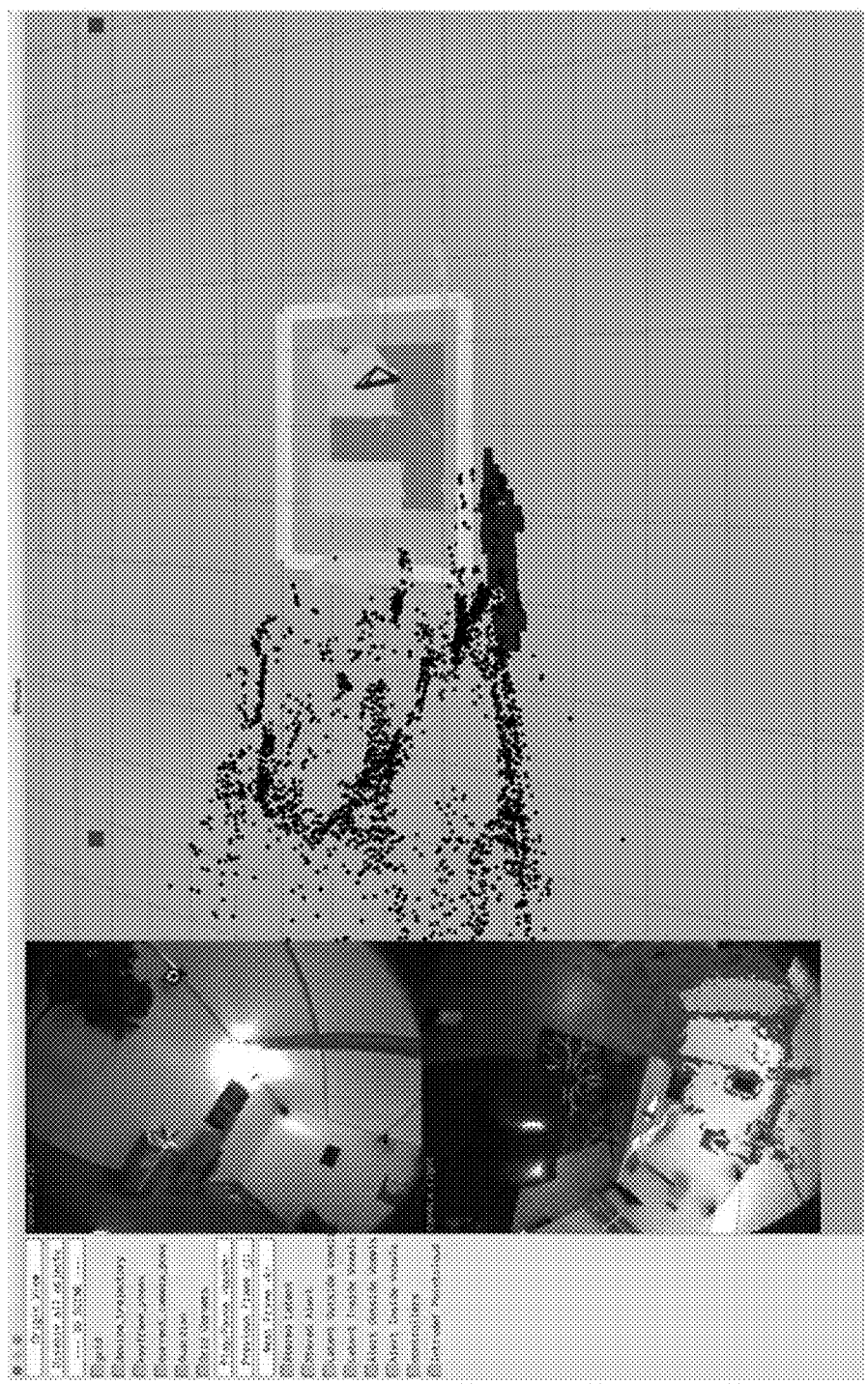

FIGS. 6A to 6C show example recordings (e.g., plots of camera data indicating how physical objects are detected in the camera data, which are referred to herein as recordings), in accordance with some embodiments. The recordings shown in FIGS. 6A to 6C can be recorded via imaging sensors of an AR headset and/or processors in communication with a presentation component (e.g., a lens display) of the AR headset (e.g., processors 1148A of the AR system 1120 that includes the AR device 1100). In some embodiments, a respective recording can combine portions of video data detected via an imaging sensor with portions of video data provided by the processor in communication with the presentation component (which can be an assembly of optical waveguides, in accordance with some embodiments). In accordance with some embodiments, a recording of a user's physical surroundings is obtained (e.g., via front-facing cameras of the user's AR device 1100), which may be performed concurrently with the user's interactions with AR content presented by the AR headset, and/or as part of a training process (e.g., testing, verification, calibration) before interactable AR content is presented to be interacted with at particular locations based on the guardian contour (e.g., the guardian contour 122 defined as part of the operations of the AR system 100). There may be distinct methodologies for obtaining such recordings, where each methodology may have distinct technical advantages.

FIG. 6A shows a recording 602 of a meshed representation that corresponds to a synthetic object within a synthetic artificial reality environment. In some embodiments, recordings of synthetically generated environments are obtained, where the synthetically generated environments include one or more generated representations of physical objects (e.g., a table and a chair generated based on a set of predefined mesh data), which may be positioned within a recording of a user's physical surroundings, and/or generated surrounding based on data about actual physical surroundings obtained while the user previously interacted with the AR headset. In some embodiments, recordings of synthetically-generated environments provide for a higher level of accuracy than recordings of real physical environments of a user's surroundings.

As shown by the tabular data in FIG. 6A, each meshed representation can correspond to a plurality of detection rates (e.g., "Detection rate %" which can be based on the data used to generate the meshed representation. For example, "P50" can correspond to the worst 50% of the data used to detect the physical object. "P75" can correspond to the worst 75% of the data used to detect the physical object. And "P75" can correspond to the worst 95% of the data used to detect the physical object. In some embodiments, the AR system can operate with different respective P-levels based on whether the lower quality data is required to generate meshed representations of physical objects within the user's environment.

FIG. 6B shows a recording 604 of a meshed representation that corresponds to a real-dynamic environment of a user in an AR environment. In some embodiments, real-dynamic recordings are obtained (e.g., from of physical users (e.g., testing users) interacting with physical surroundings in order to verify the accuracy of one or more components of the AR system 100. In accordance with some embodiments, such real-dynamic recordings are performed while the test users are in a controlled physical environment that allows for particular aspects of the AR system 100 to be tested. Such real-dynamic recording methodologies may be helpful for capturing natural skin tones, movements, and/or other physical features of the respective test users within the physical surroundings. In some embodiments, such verification techniques have a lower level of precision than alternative recording techniques (e.g., recordings of synthetically-generated environments). In some embodiments, no ground truth intruder models are available for use when providing meshed representations of real-dynamic intruder objects. In some embodiments where no ground truth intruder models are available, a cylinder model is used to approximate a ground truth intruder model for one or more respective intruder objects. In some embodiments cylinder size can be modified based on determining that unobservable voxels have been generated based on a first cylinder size, which can be determined based on a low detection rate.

FIG. 6C shows a recording 606 of a meshed representation that corresponds to a real-static environment of a user in an AR environment. In accordance with some embodiments, real-static recordings of users' physical surroundings are obtained (e.g., via a laser scanning process), which allows for some advantages of the real-world data as well as increased precision as compared to the real-dynamic recordings. In some embodiments, only static intruders are detected during the real-static recording process. In some embodiments, one or more ground truth intruder models can be identified based on the shape or other properties of an intruder object within the AR environment.

Example Meshed Representations of a Dynamic Intruder

FIGS. 7A to 7E illustrate an example of a meshed representation of a dynamic intruder entering an artificial-reality environment. The AR environment shown in FIGS. 7A to 7E can be presented via any of the AR headsets described herein.

Figure 7A:
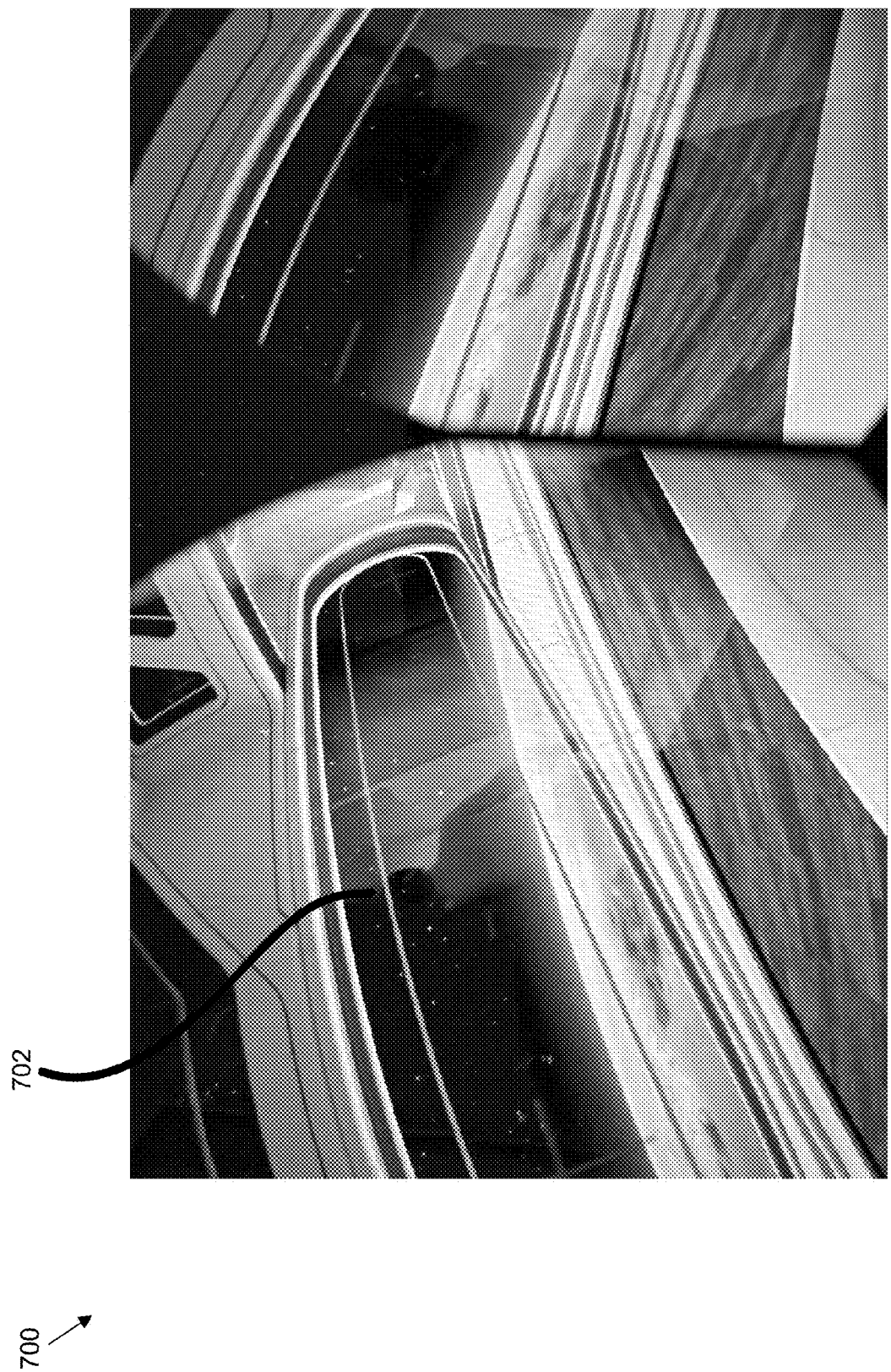
FIGS. 7A to 7E illustrate an example of a meshed representation of a dynamic intruder entering an artificial-reality environment.

FIG. 7A shows a meshed representation 702 corresponding to a user that is walking away from a user of the AR headset. In some embodiments, additional aspects of the physical world surrounding the user are presented based on determining that the physical object that the meshed representation 702 corresponds to is a dynamic intruder (e.g., a moving object). In some embodiments, the amount of space surrounding the user (e.g., the background) that is presented in the meshed representation is based on a speed or acceleration of the dynamic intruder, and/or the type of interaction that the intruder is performing with their physical surroundings. In some embodiments, the space surrounding the user is definable to provide a background-less representation of the moving object (e.g., no background, an inch of background, a foot a background are all examples of how the background can be included in the meshed representation.

Figure 7B:

FIG. 7B shows a meshed representation 704 (which can be the same meshed representation 702) that corresponds to the same dynamic intruder as the meshed representation in FIG. 7A. The meshed representation 704 includes a larger surrounding region of the dynamic intruder, which can be based on a determination that the dynamic intruder is approaching, is moving toward the user, and/or is moving with a greater speed.

Figure 7C:
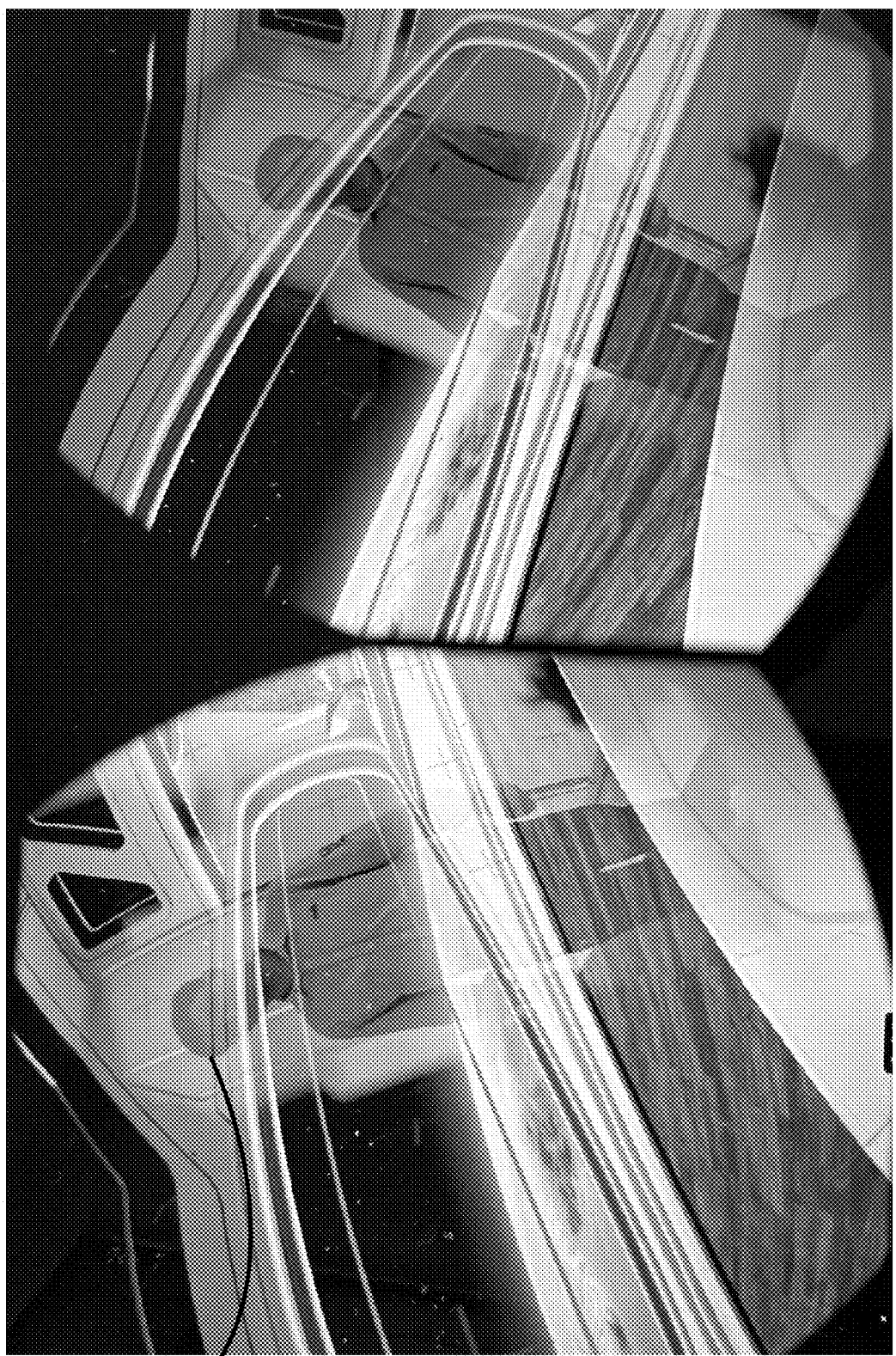

FIG. 7C shows a meshed representation 706 (which can be the same meshed representation as either of the meshed representations 702 or 704) corresponding to a dynamic intruder. The surrounding area is larger and more detailed in FIG. 7C than it was in FIGS. 7A to 7B, which can be based on a determination that the dynamic intruder is attempting to interact with the user (e.g., speaking to the user).

Figure 7D:

FIG. 7D shows the user controlling a volume control user interface element 1108 corresponding to a user selected volume output of a speaker at the head-wearable device.

Figure 7E:
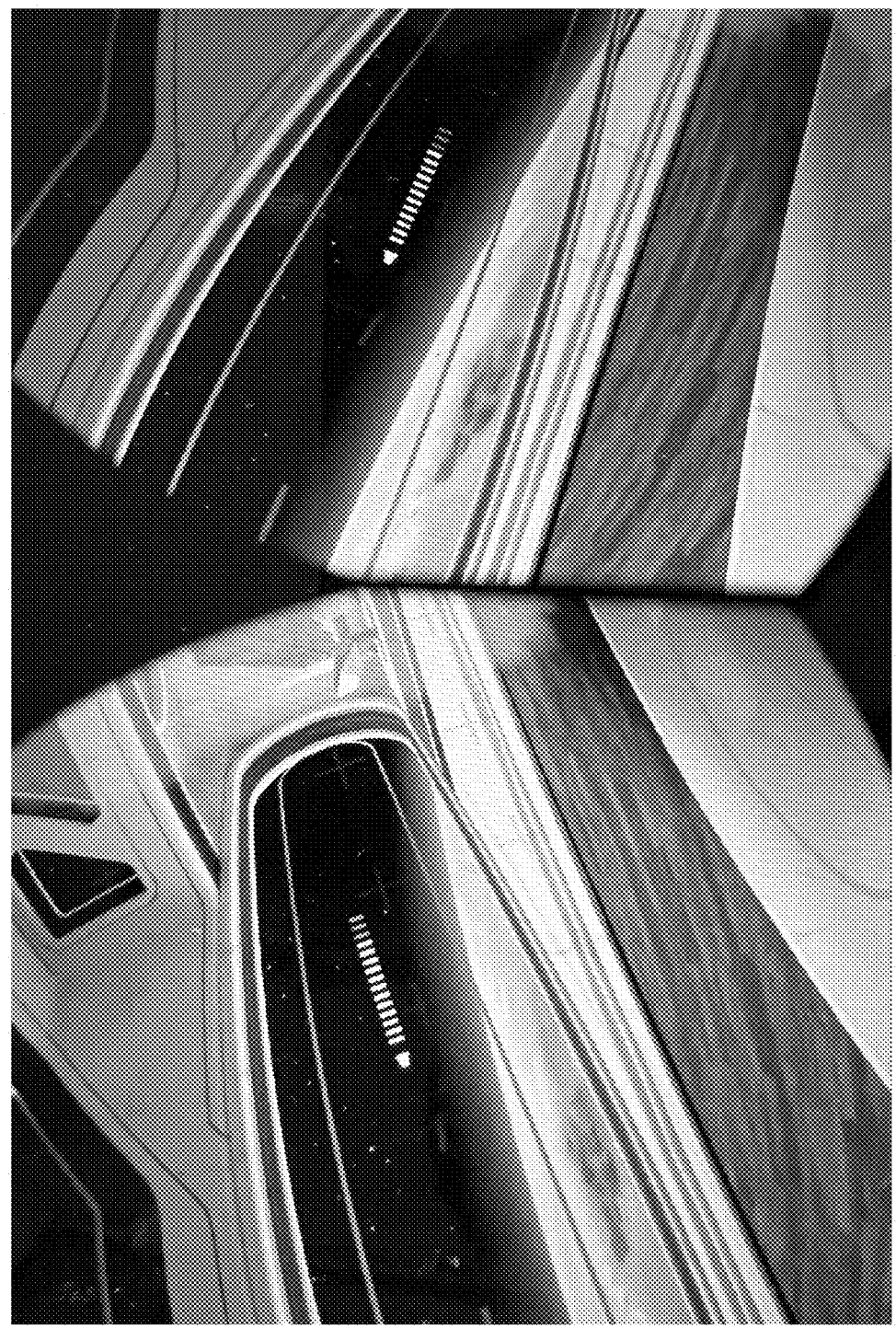

FIG. 7E shows the artificial-reality environment from FIGS. 7A to 7D without any meshed representations of physical objects. The dynamic intruder is still present in the environment shown in FIG. 7E, but the AR headset has determined to forego presenting meshed representations corresponding to the dynamic intruder. In some embodiments, the user can provide a user input to cause the AR headset to forego displaying the dynamic intruder.

In some embodiments, techniques like those shown and described with reference to FIG. 3B can be used to reduce a viewable area around the dynamic intruder, thereby reducing how much background of the physical world is viewable and focusing more narrowly on rendering only the dynamic intruder apart from the background of the physical world.

Figure 8A:
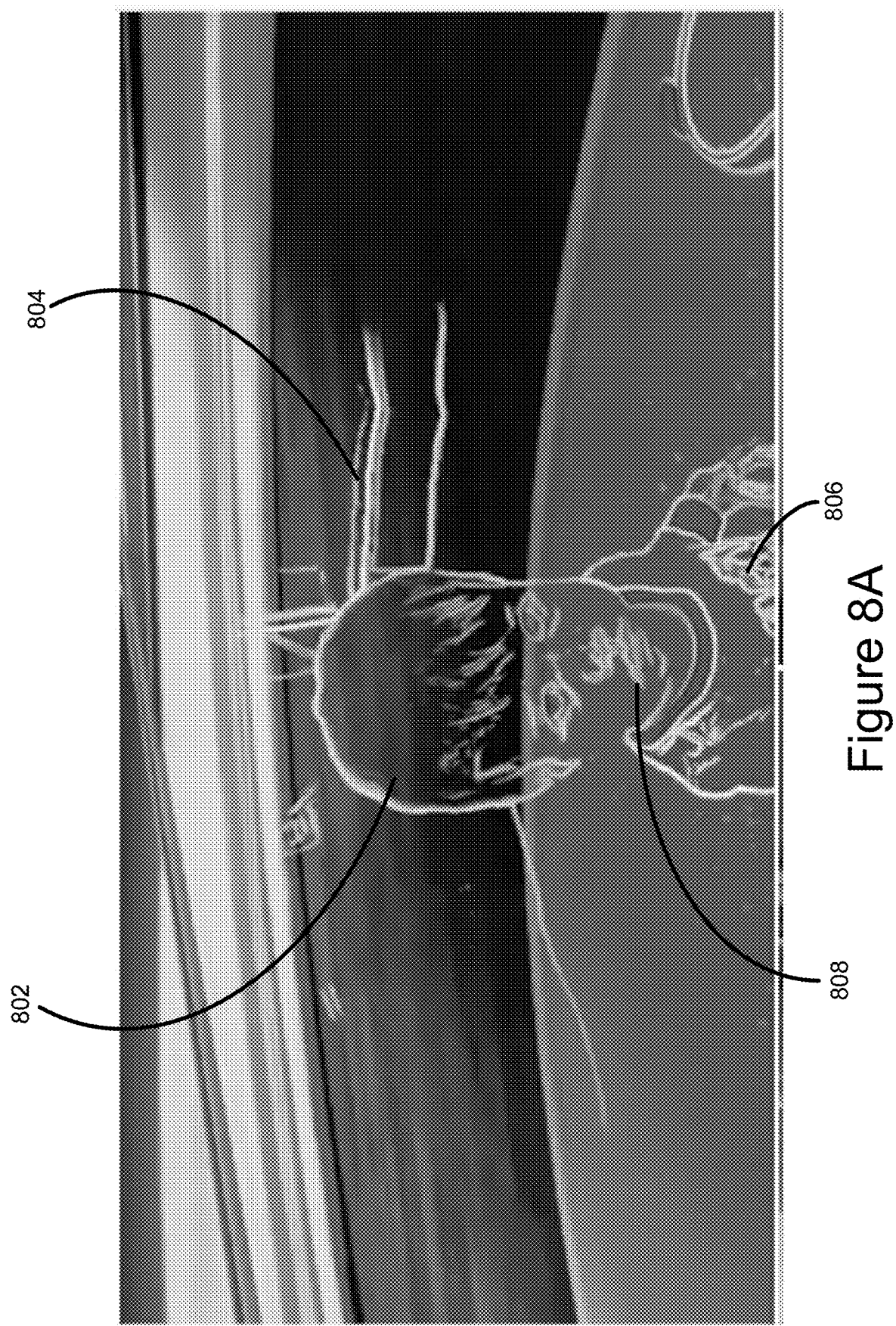
FIGS. 8A to 8C illustrate examples of a meshed representation of a living being presented within an artificial-reality environment.
Figure 8C:
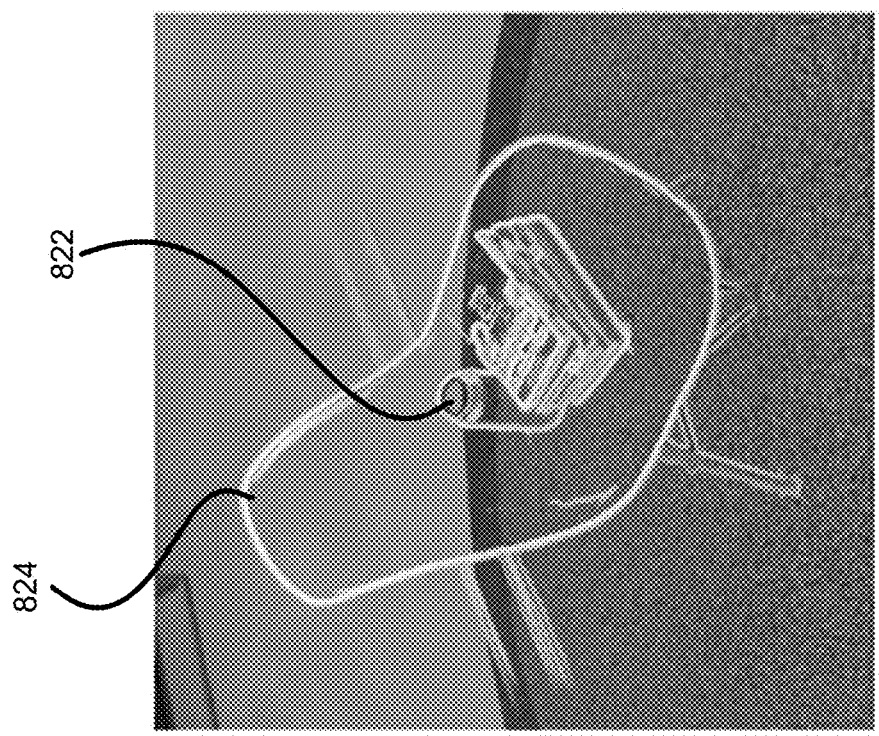
Figure 8B:
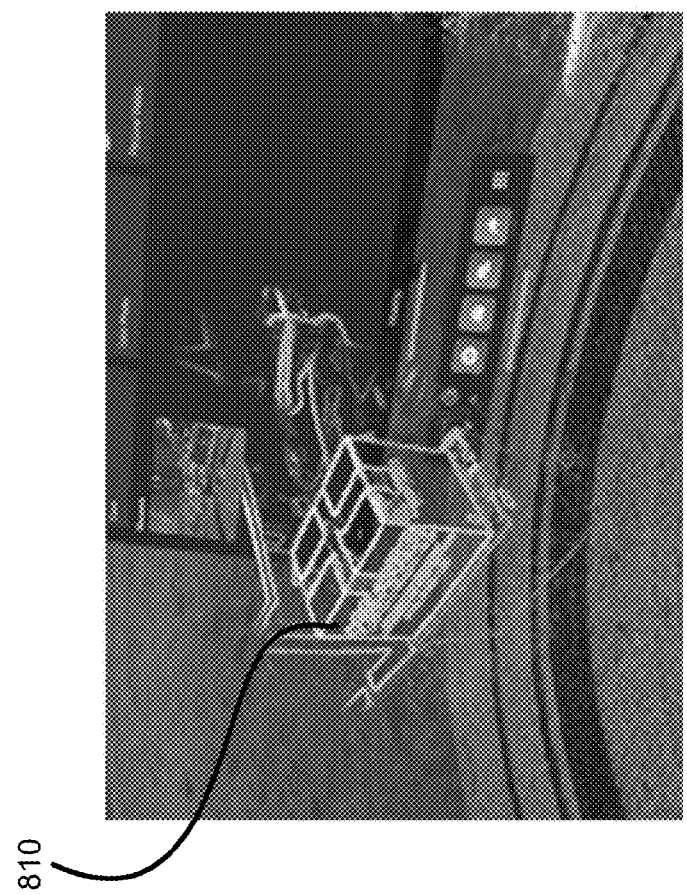

FIGS. 8A to 8C illustrate examples of a meshed representation of a living being presented within an artificial-reality environment. As shown in FIGS. 8A to 8C, the meshed representations can include colors corresponding to various properties of the physical objects, including spatial relations between the objects and the users and whether the respective intruder is a living a being or an inanimate object.

FIG. 8A shows a meshed representation 802 presented within an artificial-reality environment. The meshed representation 802 corresponds to a physical object that is a living being (e.g., a child of the user). In some embodiments, when an intruder object is a dynamic intruder (e.g., a human, a dog, a cat, a chicken, etc.), certain portions around the neighboring voxel space are represented via a meshed representation, which can prevent flicker if the living being moves. For example, a meshed representation 804 is presented that corresponds to a texture of a wall that is behind the meshed representation 802.

In some embodiments, when the meshed representation corresponds to a portion of a living object (e.g., an aspect of a user's face, such as the meshed representation 802), the meshed representation includes certain additional textural features (e.g., showing a user's face skin) that would not otherwise be displayed in accordance with some embodiments. For example, a meshed portion 808 corresponds to the child's mouth. In some embodiments, outlines can be included in meshed representations that correspond to recognized textual elements (e.g., a meshed portion 806 corresponding to letters on the child's shirt).

FIG. 8B shows a meshed representation 810 corresponding to a stack of physical objects (e.g., two boxes stacked on top of each other). Based on detecting the stack of objects, additional operations can be performed in conjunction with presenting the meshed representation of the stack of objects. For example, the meshed representation 810 includes lines indicating the division between each respective object of the stack of objects. For one of the objects of the stack of objects, additional details are shown corresponding to label information and different materials (e.g., packing tape) on a portion of the object. In some embodiments, non-visual properties of respective objects can be used to determine if respective objects have different material properties. In some embodiments, the amount of texture displayed is based on distance from the object and/or whether the object is in the direct field of view of the user.

FIG. 8C shows a meshed representation 824 corresponding to a chair, and the meshed representation 824 includes additional meshed portions (e.g., a meshed portion 822 corresponding to a drink can on the chair). In some embodiments, when a physical object is detected and it is determined that a user is likely to interact with the physical object (e.g., to sit on, to lean on, to pick up), then additional details can be presented in the meshed representation that corresponds to the physical object.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 1000, a head-wearable device, an HIPD 1200, a smart textile-based garment 1300, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 9A-9D-2

Figure 9A:
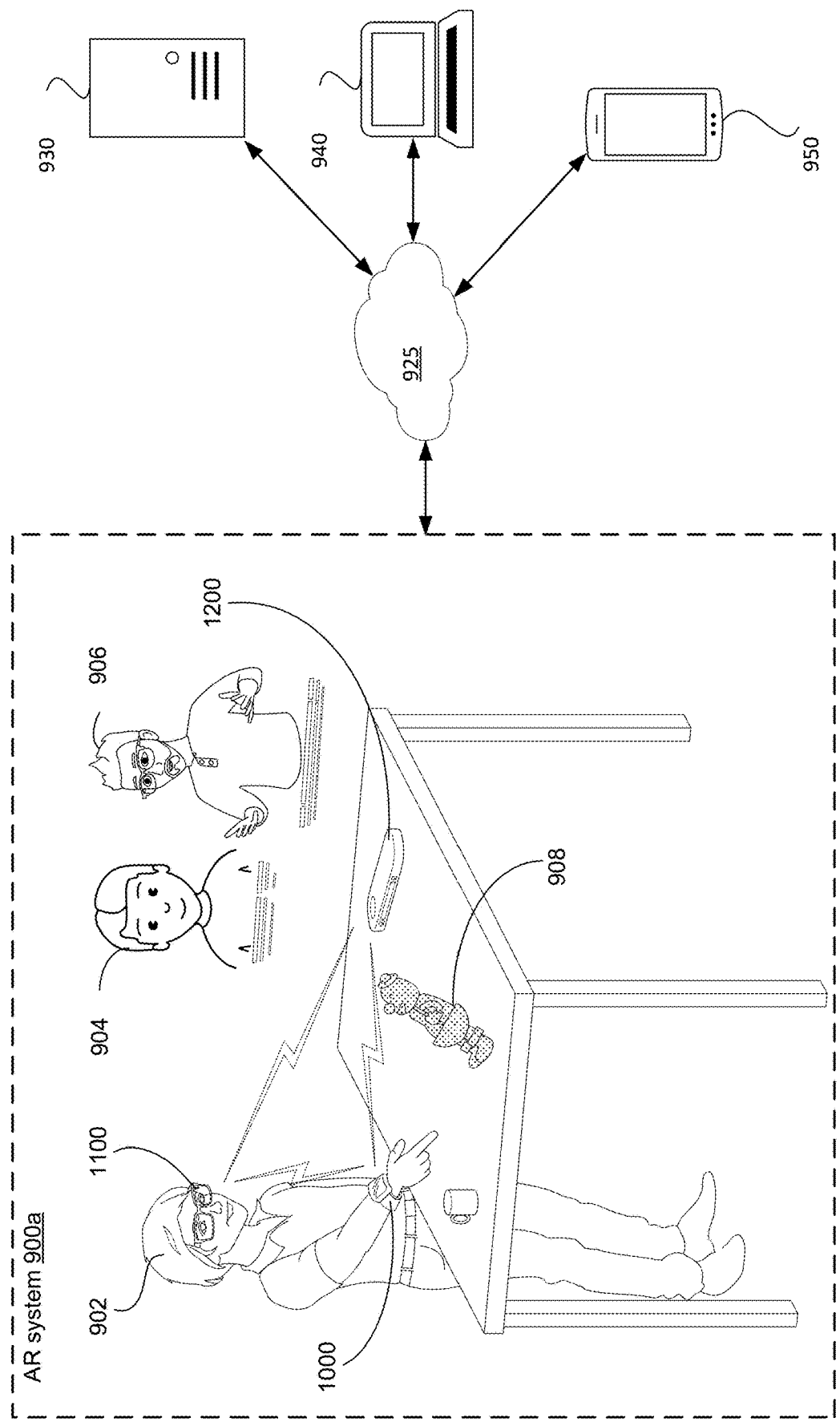
Figure 9B:
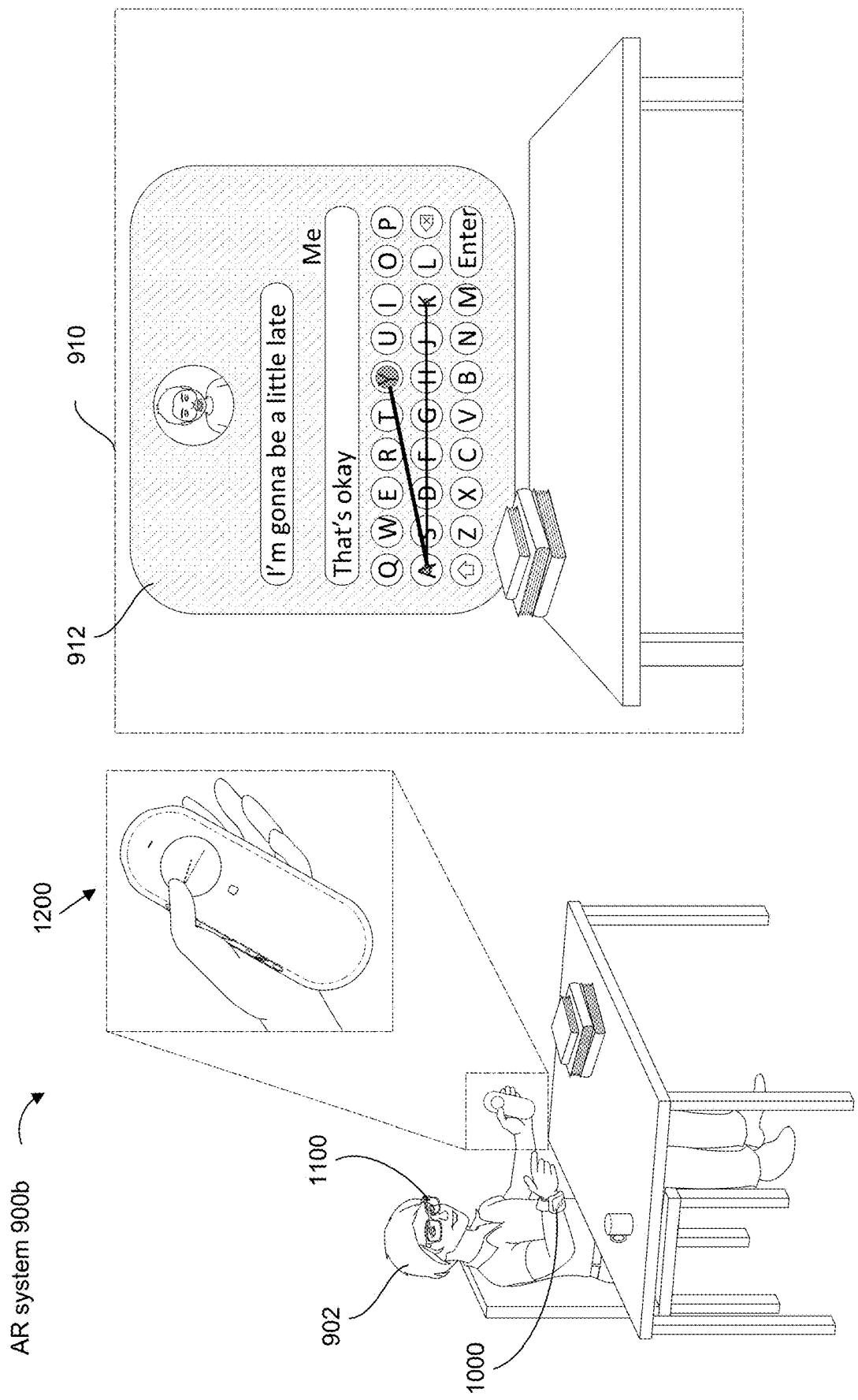
Figures 1, 9C:
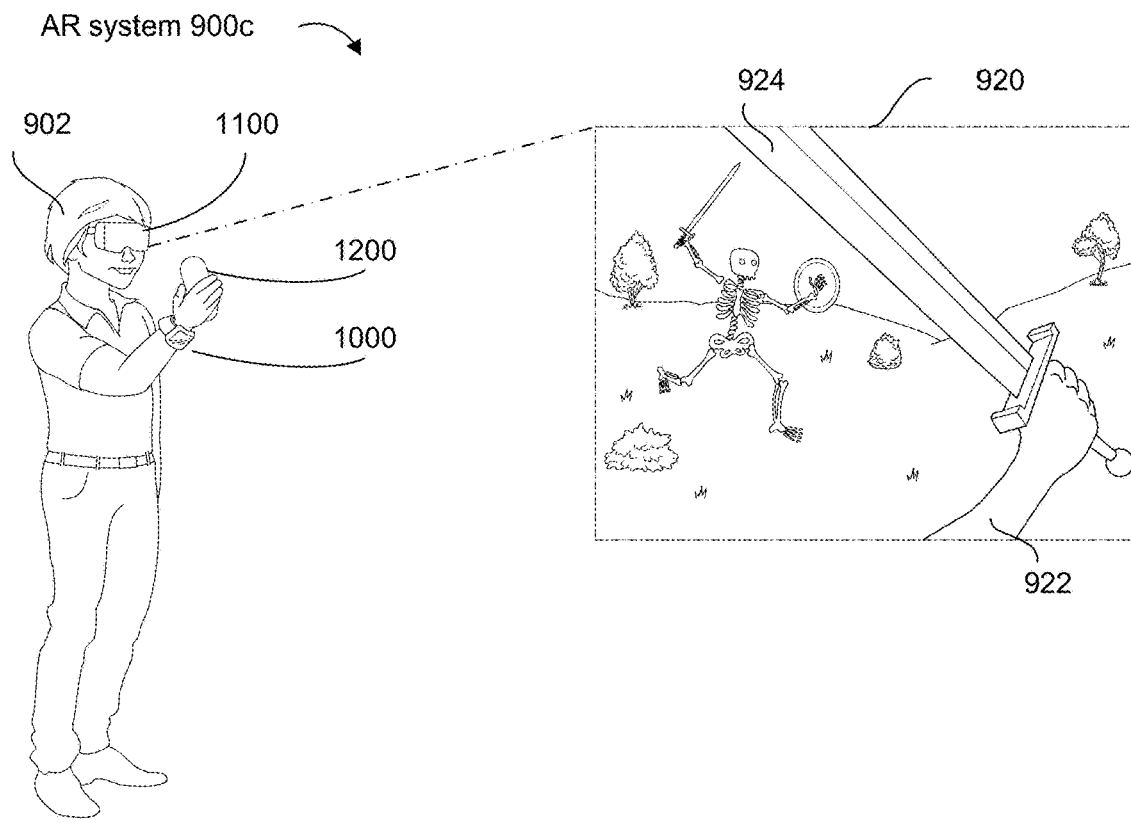
Figures 2, 9C:
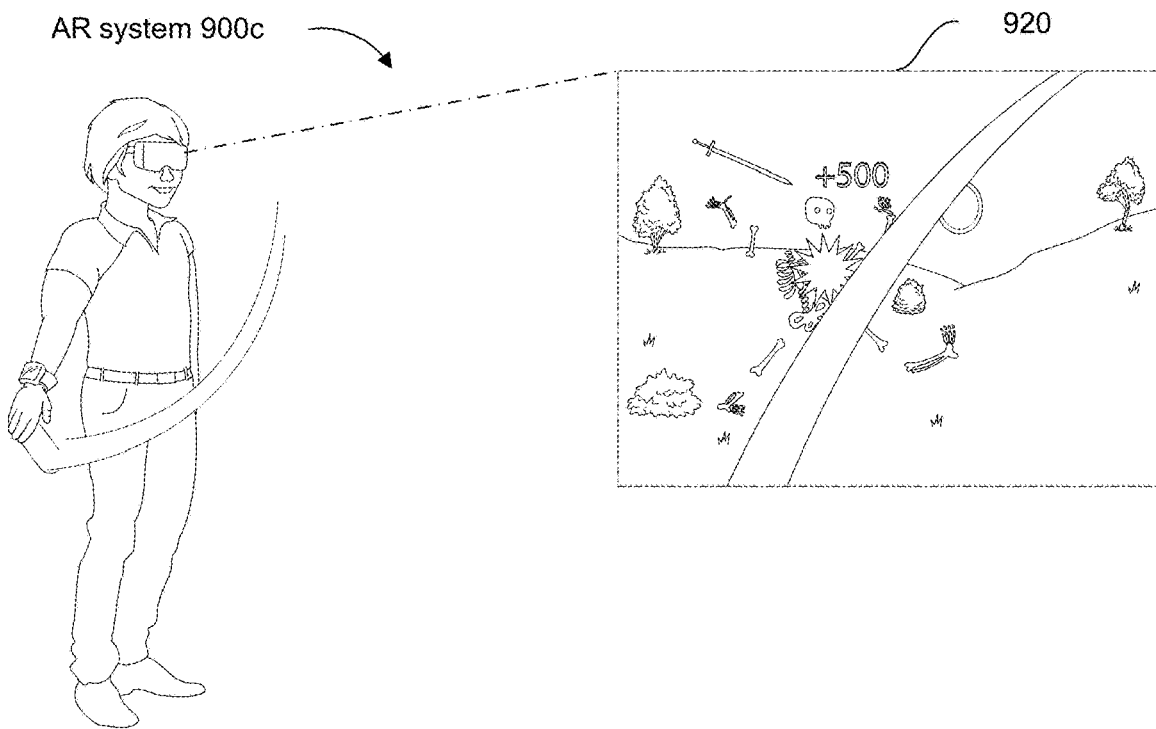
Figures 1, 9D:
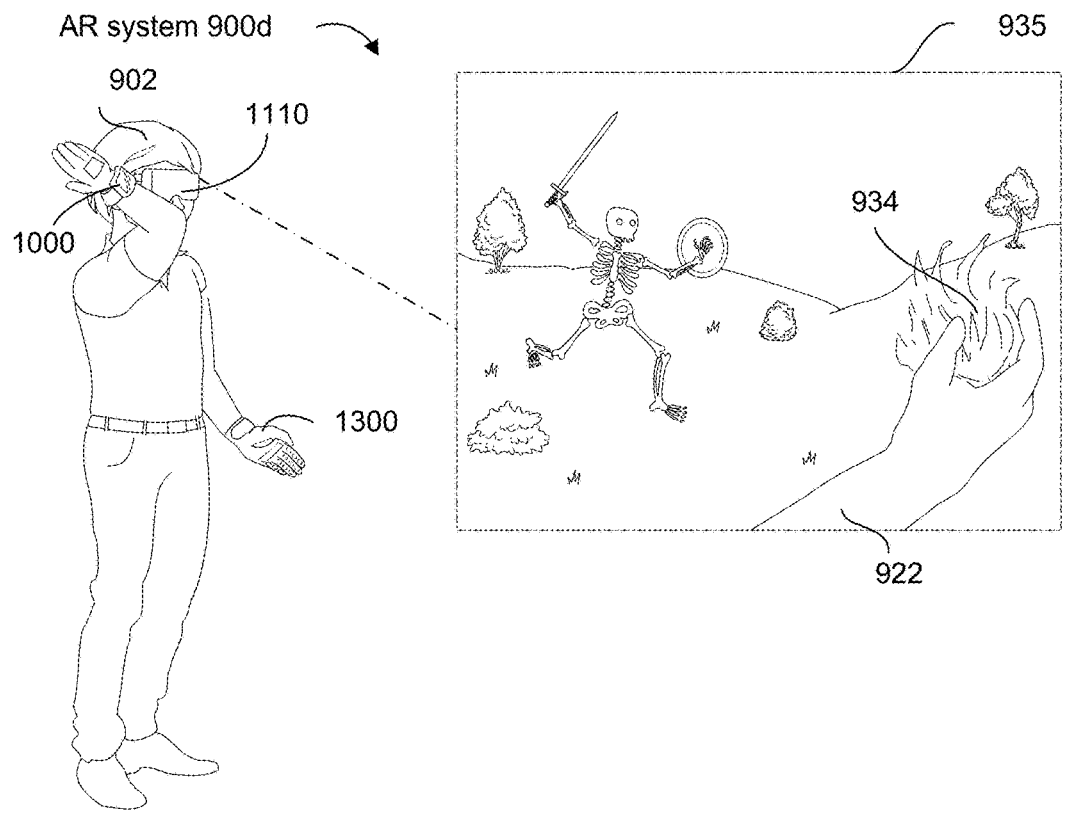
Figures 2, 9D:
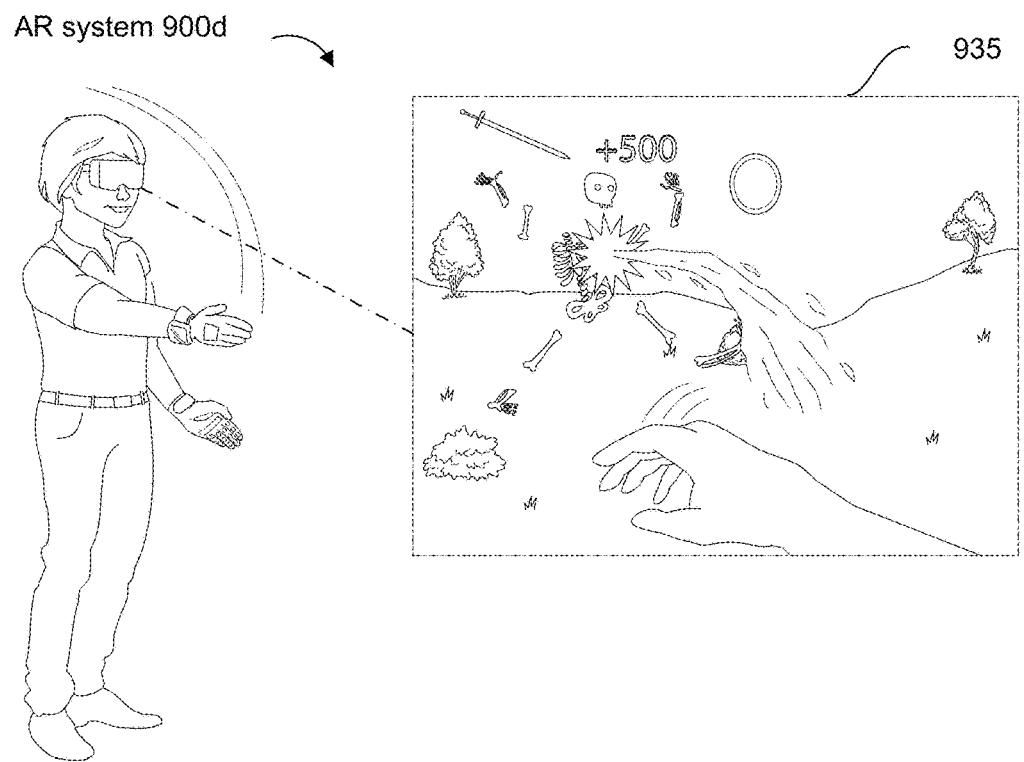

FIGS. 9A, 9B, 9C-1, 9C-2, 9D-1, and 9D-2 illustrate example AR systems, in accordance with some embodiments. FIG. 9A shows a first AR system 900a and first example user interactions using a wrist-wearable device 1000, a head-wearable device (e.g., AR device 1100), and/or a handheld intermediary processing device (HIPD) 1200. FIG. 9B shows a second AR system 900b and second example user interactions using a wrist-wearable device 1000, AR device 1100, and/or an HIPD 1200. FIGS. 9C-1 and 9C-2 show a third AR system 900c and third example user interactions using a wrist-wearable device 1000, a head-wearable device (e.g., virtual-reality (VR) device 1110), and/or an HIPD 1200. FIGS. 9D-1 and 9D-2 show a fourth AR system 900d and fourth example user interactions using a wrist-wearable device 1000, VR device 1110, and/or a smart textile-based garment 1300 (e.g., wearable gloves, haptic gloves).

The wrist-wearable device 1000 and its constituent components are described below in reference to FIGS. 10A-10B, the head-wearable devices and their constituent components are described below in reference to FIGS. 11A-11D, and the HIPD 1200 and its constituent components are described below in reference to FIGS. 12A-12B. The smart textile-based garment 1300 and its one or more components are described below in reference to FIGS. 13A-13C. The wrist-wearable device 1000, the head-wearable devices, and/or the HIPD 1200 can communicatively couple via a network 925 (e.g., cellular, near field, Wi-Fi, personal area network, or wireless LAN). Additionally, the wrist-wearable device 1000, the head-wearable devices, and/or the HIPD 1200 can also communicatively couple with one or more servers 930, computers 940 (e.g., laptops or computers), mobile devices 950 (e.g., smartphones or tablets), and/or other electronic devices via the network 925 (e.g., cellular, near field, Wi-Fi, personal area network, or wireless LAN). Similarly, the smart textile-based garment 1300, when used, can also communicatively couple with the wrist-wearable device 1000, the head-wearable devices, the HIPD 1200, the one or more servers 930, the computers 940, the mobile devices 950, and/or other electronic devices via the network 925.

Turning to FIG. 9A, a user 902 is shown wearing the wrist-wearable device 1000 and the AR device 1100, and having the HIPD 1200 on their desk. The wrist-wearable device 1000, the AR device 1100, and the HIPD 1200 facilitate user interaction with an AR environment. In particular, as shown by the first AR system 900a, the wrist-wearable device 1000, the AR device 1100, and/or the HIPD 1200 cause presentation of one or more avatars 904, digital representations of contacts 906, and virtual objects 908. As discussed below, the user 902 can interact with the one or more avatars 904, digital representations of the contacts 906, and virtual objects 908 via the wrist-wearable device 1000, the AR device 1100, and/or the HIPD 1200.

The user 902 can use any of the wrist-wearable device 1000, the AR device 1100, and/or the HIPD 1200 to provide user inputs. For example, the user 902 can perform one or more hand gestures that are detected by the wrist-wearable device 1000 (e.g., using one or more EMG sensors and/or IMUs, described below in reference to FIGS. 10A-10B) and/or AR device 1100 (e.g., using one or more image sensors or cameras, described below in reference to FIGS. 11A-11B) to provide a user input. Alternatively, or additionally, the user 902 can provide a user input via one or more touch surfaces of the wrist-wearable device 1000, the AR device 1100, and/or the HIPD 1200, and/or voice commands captured by a microphone of the wrist-wearable device 1000, the AR device 1100, and/or the HIPD 1200. In some embodiments, the wrist-wearable device 1000, the AR device 1100, and/or the HIPD 1200 include a digital assistant to help the user in providing a user input (e.g., completing a sequence of operations, suggesting different operations or commands, providing reminders, or confirming a command). In some embodiments, the user 902 can provide a user input via one or more facial gestures and/or facial expressions. For example, cameras of the wrist-wearable device 1000, the AR device 1100, and/or the HIPD 1200 can track the eyes of the user 902 for navigating a user interface.

The wrist-wearable device 1000, the AR device 1100, and/or the HIPD 1200 can operate alone or in conjunction to allow the user 902 to interact with the AR environment. In some embodiments, the HIPD 1200 is configured to operate as a central hub or control center for the wrist-wearable device 1000, the AR device 1100, and/or another communicatively coupled device. For example, the user 902 can provide an input to interact with the AR environment at any of the wrist-wearable device 1000, the AR device 1100, and/or the HIPD 1200, and the HIPD 1200 can identify one or more back-end and front-end tasks to cause the performance of the requested interaction and distribute instructions to cause the performance of the one or more back-end and front-end tasks at the wrist-wearable device 1000, the AR device 1100, and/or the HIPD 1200. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 12A-12B, the HIPD 1200 can perform the back-end tasks and provide the wrist-wearable device 1000 and/or the AR device 1100 operational data corresponding to the performed back-end tasks such that the wrist-wearable device 1000 and/or the AR device 1100 can perform the front-end tasks. In this way, the HIPD 1200, which has more computational resources and greater thermal headroom than the wrist-wearable device 1000 and/or the AR device 1100, performs computationally intensive tasks and reduces the computer resource utilization and/or power usage of the wrist-wearable device 1000 and/or the AR device 1100.

In the example shown by the first AR system 900a, the HIPD 1200 identifies one or more back-end tasks and front-end tasks associated with a user request to initiate an AR video call with one or more other users (represented by the avatar 904 and the digital representation of the contact 906) and distributes instructions to cause the performance of the one or more back-end tasks and front-end tasks. In particular, the HIPD 1200 performs back-end tasks for processing and/or rendering image data (and other data)

associated with the AR video call and provides operational data associated with the performed back-end tasks to the AR device 1100 such that the AR device 1100 performs front-end tasks for presenting the AR video call (e.g., presenting the avatar 904 and the digital representation of the contact 906).

In some embodiments, the HIPD 1200 can operate as a focal or anchor point for causing the presentation of information. This allows the user 902 to be generally aware of where information is presented. For example, as shown in the first AR system 900*a*, the avatar 904 and the digital representation of the contact 906 are presented above the HIPD 1200. In particular, the HIPD 1200 and the AR device 1100 operate in conjunction to determine a location for presenting the avatar 904 and the digital representation of the contact 906. In some embodiments, information can be presented within a predetermined distance from the HIPD 1200 (e.g., within five meters). For example, as shown in the first AR system 900*a*, virtual object 908 is presented on the desk some distance from the HIPD 1200. Similar to the above example, the HIPD 1200 and the AR device 1100 can operate in conjunction to determine a location for presenting the virtual object 908. Alternatively, in some embodiments, presentation of information is not bound by the HIPD 1200. More specifically, the avatar 904, the digital representation of the contact 906, and the virtual object 908 do not have to be presented within a predetermined distance of the HIPD 1200.

User inputs provided at the wrist-wearable device 1000, the AR device 1100, and/or the HIPD 1200 are coordinated such that the user can use any device to initiate, continue, and/or complete an operation. For example, the user 902 can provide a user input to the AR device 1100 to cause the AR device 1100 to present the virtual object 908 and, while the virtual object 908 is presented by the AR device 1100, the user 902 can provide one or more hand gestures via the wrist-wearable device 1000 to interact and/or manipulate the virtual object 908.

FIG. 9B shows the user 902 wearing the wrist-wearable device 1000 and the AR device 1100, and holding the HIPD 1200. In the second AR system 900*b*, the wrist-wearable device 1000, the AR device 1100, and/or the HIPD 1200 are used to receive and/or provide one or more messages to a contact of the user 902. In particular, the wrist-wearable device 1000, the AR device 1100, and/or the HIPD 1200 detect and coordinate one or more user inputs to initiate a messaging application and prepare a response to a received message via the messaging application.

In some embodiments, the user 902 initiates, via a user input, an application on the wrist-wearable device 1000, the AR device 1100, and/or the HIPD 1200 that causes the application to initiate on at least one device. For example, in the second AR system 900*b*, the user 902 performs a hand gesture associated with a command for initiating a messaging application (represented by messaging user interface 912), the wrist-wearable device 1000 detects the hand gesture, and, based on a determination that the user 902 is wearing AR device 1100, causes the AR device 1100 to present a messaging user interface 912 of the messaging application. The AR device 1100 can present the messaging user interface 912 to the user 902 via its display (e.g., as shown by user 902's field of view 910). In some embodiments, the application is initiated and can be run on the device (e.g., the wrist-wearable device 1000, the AR device 1100, and/or the HIPD 1200) that detects the user input to initiate the application, and the device provides another device operational data to cause the presentation of the messaging application. For example, the wrist-wearable device 1000 can detect the user input to initiate a messaging application, initiate and run the messaging application, and provide operational data to the AR device 1100 and/or the HIPD 1200 to cause presentation of the messaging application. Alternatively, the application can be initiated and run at a device other than the device that detected the user input. For example, the wrist-wearable device 1000 can detect the hand gesture associated with initiating the messaging application and cause the HIPD 1200 to run the messaging application and coordinate the presentation of the messaging application.

Further, the user 902 can provide a user input provided at the wrist-wearable device 1000, the AR device 1100, and/or the HIPD 1200 to continue and/or complete an operation initiated at another device. For example, after initiating the messaging application via the wrist-wearable device 1000 and while the AR device 1100 presents the messaging user interface 912, the user 902 can provide an input at the HIPD 1200 to prepare a response (e.g., shown by the swipe gesture performed on the HIPD 1200). The gestures of the user 902 detected by the HIPD 1200 can be provided and/or displayed on another device. For example, the swipe gestures performed by the user 902 directed to the HIPD 1200 are displayed on a virtual keyboard of the messaging user interface 912 displayed by the AR device 1100.

In some embodiments, the wrist-wearable device 1000, the AR device 1100, the HIPD 1200, and/or other communicatively coupled devices can present one or more notifications to the user 902. The notification can be an indication of a new message, an incoming call, an application update, a status update, etc. The user 902 can select the notification via the wrist-wearable device 1000, the AR device 1100, or the HIPD 1200 and cause presentation of an application or operation associated with the notification on at least one device. For example, the user 902 can receive a notification that a message was received at the wrist-wearable device 1000, the AR device 1100, the HIPD 1200, and/or other communicatively coupled device and provide a user input at the wrist-wearable device 1000, the AR device 1100, and/or the HIPD 1200 to review the notification, and the device detecting the user input can cause an application associated with the notification to be initiated and/or presented at the wrist-wearable device 1000, the AR device 1100, and/or the HIPD 1200.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 1100 can present to the user 902 game application data and the HIPD 1200 can use a controller to provide inputs to the game. Similarly, the user 902 can use the wrist-wearable device 1000 to initiate a camera of the AR device 1100, and the user can use the wrist-wearable device 1000, the AR device 1100, and/or the HIPD 1200 to manipulate the image capture (e.g., zoom in or out or apply filters) and capture image data.

Turning to FIGS. 9C-1 and 9C-2, the user 902 is shown wearing the wrist-wearable device 1000 and a VR device 1110, and holding the HIPD 1200. In the third AR system 900*c*, the wrist-wearable device 1000, the VR device 1110, and/or the HIPD 1200 are used to interact within an AR environment, such as a VR game or other AR application. While the VR device 1110 presents a representation of a VR game (e.g., first AR game environment 920) to the user 902, the wrist-wearable device 1000, the VR device 1110, and/or the HIPD 1200 detect and coordinate one or more user inputs to allow the user 902 to interact with the VR game.

In some embodiments, the user 902 can provide a user input via the wrist-wearable device 1000, the VR device 1110, and/or the HIPD 1200 that causes an action in a corresponding AR environment. For example, the user 902 in the third AR system 900c (shown in FIG. 9C-1) raises the HIPD 1200 to prepare for a swing in the first AR game environment 920. The VR device 1110, responsive to the user 902 raising the HIPD 1200, causes the AR representation of the user 922 to perform a similar action (e.g., raise a virtual object, such as a virtual sword 924). In some embodiments, each device uses respective sensor data and/or image data to detect the user input and provide an accurate representation of the user 902's motion. For example, imaging sensors 1254 (e.g., SLAM cameras or other cameras discussed below in FIGS. 12A and 12B) of the HIPD 1200 can be used to detect a position of the 1200 relative to the location of the user 902 such that the virtual object can be positioned appropriately within the first AR game environment 920; sensor data from the wrist-wearable device 1000 can be used to detect a velocity at which the user 902 raises the HIPD 1200 such that the AR representation of the user 922 and the virtual sword 924 are synchronized with the user 902's movements; and image sensors 1126 (FIGS. 11A-11C) of the VR device 1110 can be used to represent the body of the user 902, boundary conditions, or real-world objects within the first AR game environment 920.

In FIG. 9C-2, the user 902 performs a downward swing while holding the HIPD 1200. The user 902's downward swing is detected by the wrist-wearable device 1000, the VR device 1110, and/or the HIPD 1200 and a corresponding action is performed in the first AR game environment 920. In some embodiments, the data captured by each device is used to improve the user's experience within the AR environment. For example, sensor data of the wrist-wearable device 1000 can be used to determine a speed and/or force at which the downward swing is performed and image sensors of the HIPD 1200 and/or the VR device 1110 can be used to determine a location of the swing and how it should be represented in the first AR game environment 920, which, in turn, can be used as inputs for the AR environment (e.g., game mechanics, which can use detected speed, force, locations, and/or aspects of the user 902's actions to classify a user's inputs (e.g., user performs a light strike, hard strike, critical strike, glancing strike, miss) or calculate an output (e.g., amount of damage)).

While the wrist-wearable device 1000, the VR device 1110, and/or the HIPD 1200 are described as detecting user inputs, in some embodiments, user inputs are detected at a single device (with the single device being responsible for distributing signals to the other devices for performing the user input). For example, the HIPD 1200 can operate an application for generating the first AR game environment 920 and provide the VR device 1110 with corresponding data for causing the presentation of the first AR game environment 920, as well as detect the 902's movements (while holding the HIPD 1200) to cause the performance of corresponding actions within the first AR game environment 920. Additionally, or alternatively, in some embodiments, operational data (e.g., sensor data, image data, application data, device data, and/or other data) of one or more devices is provide to a single device (e.g., the HIPD 1200) to process the operational data and cause respective devices to perform an action associated with processed operational data.

In FIGS. 9D-1 and 9D-2, the user 902 is shown wearing the wrist-wearable device 1000, the VR device 1110, and smart textile-based garments 1300. In the fourth AR system 900d, the wrist-wearable device 1000, the VR device 1110, and/or the smart textile-based garments 1300 are used to interact within an AR environment (e.g., any AR system described above in reference to FIGS. 9A-9C-2, as well as AR system 100, 200, and other AR systems described herein). While the VR device 1110 presents a representation of a VR game (e.g., second AR game environment 935) to the user 902, the wrist-wearable device 1000, the VR device 1110, and/or the smart textile-based garments 1300 detect and coordinate one or more user inputs to allow the user 902 to interact with the AR environment.

In some embodiments, the user 902 can provide a user input via the wrist-wearable device 1000, the VR device 1110, and/or the smart textile-based garments 1300 that causes an action in a corresponding AR environment. For example, the user 902 in the fourth AR system 900d (shown in FIG. 9D-1) raises a hand wearing the smart textile-based garments 1300 to prepare to cast a spell or throw an object within the second AR game environment 935. The VR device 1110, responsive to the user 902 holding up their hand (wearing smart textile-based garments 1300), causes the AR representation of the user 922 to perform a similar action (e.g., hold a virtual object or throw a fireball 934). In some embodiments, each device uses respective sensor data and/or image data to detect the user input and provides an accurate representation of the motion of the user 902.

In FIG. 9D-2, the user 902 performs a throwing motion while wearing the smart textile-based garment 1300. The throwing motion of the user 902 is detected by the wrist-wearable device 1000, the VR device 1110, and/or the smart textile-based garments 1300, and a corresponding action is performed in the second AR game environment 935. As described above, the data captured by each device is used to improve the user's experience within the AR environment. Although not shown, the smart textile-based garments 1300 can be used in conjunction with an VR device 1110 and/or an HIPD 1200.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

Figure 10A:
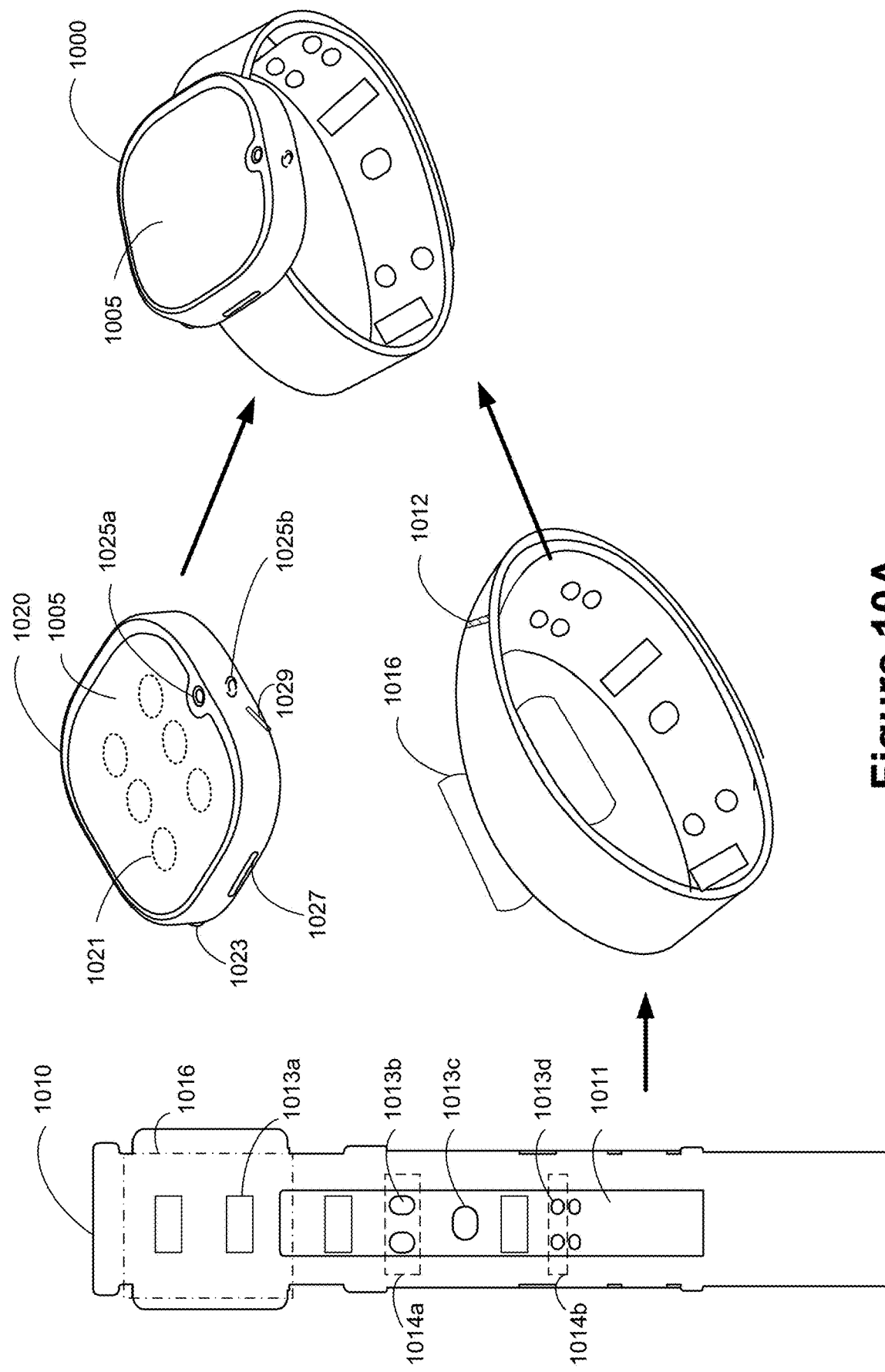
FIGS. 10A to 10B illustrate an example wrist-wearable device, in accordance with some embodiments.
Figure 10B:
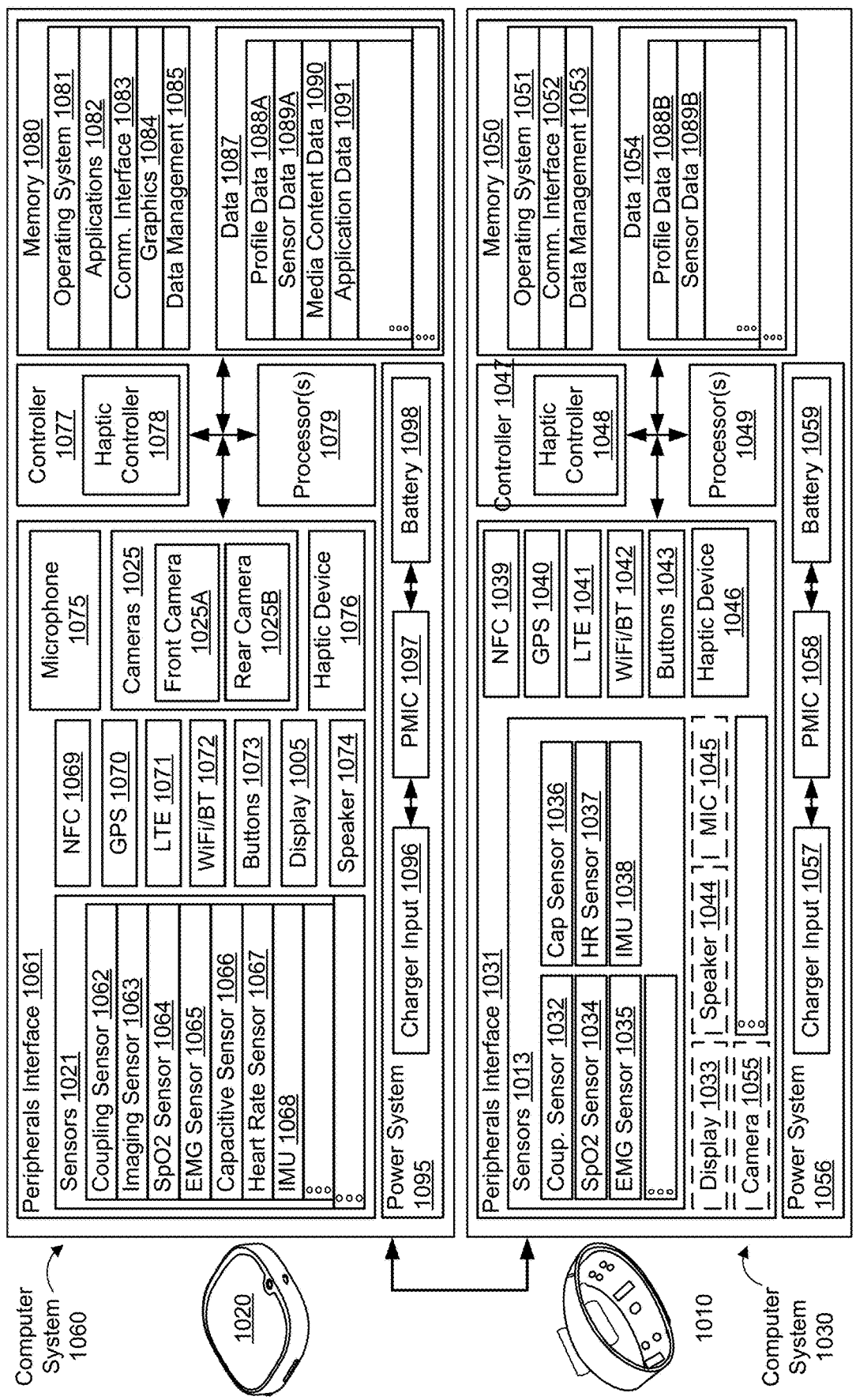

FIGS. 10A and 10B illustrate an example wrist-wearable device 1000, in accordance with some embodiments. FIG. 10A illustrates components of the wrist-wearable device 1000, which can be used individually or in combination, including combinations that include other electronic devices and/or electronic components.

FIG. 10A shows a wearable band 1010 and a watch body 1020 (or capsule) being coupled, as discussed below, to form the wrist-wearable device 1000.

As will be described in more detail below, operations executed by the wrist-wearable device 1000 can include (i) presenting content to a user (e.g., displaying visual content via a display 1005); (ii) detecting (e.g., sensing) user input (e.g., sensing a touch on peripheral button 1023 and/or at a touch screen of the display 1005, a hand gesture detected by sensors (e.g., biopotential sensors)); (iii) sensing biometric data via one or more sensors 1013 (e.g., neuromuscular signals, heart rate, temperature, or sleep); messaging (e.g., text, speech, or video); image capture via one or more imaging devices or cameras 1025; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 1020, independently in the wearable band 1010, and/or via an electronic communication between the watch body 1020 and the wearable band 1010. In some embodiments, functions can be executed on the wrist-wearable device 1000 while an AR environment is being presented (e.g., via one of the AR systems 900a to 900d). As the skilled artisan will appreciate upon reading the descriptions provided herein, the novel wearable devices described herein can be used with other types of AR environments.

The wearable band 1010 can be configured to be worn by a user such that an inner (or inside) surface of the wearable structure 1011 of the wearable band 1010 is in contact with the user's skin. When worn by a user, sensors 1013 contact the user's skin. The sensors 1013 can sense biometric data such as a user's heart rate, saturated oxygen level, temperature, sweat level, neuromuscular-signal sensors, or a combination thereof. The sensors 1013 can also sense data about a user's environment, including a user's motion, altitude, location, orientation, gait, acceleration, position, or a combination thereof. In some embodiments, the sensors 1013 are configured to track a position and/or motion of the wearable band 1010. The one or more sensors 1013 can include any of the sensors defined above and/or discussed below with respect to FIG. 10B.

The one or more sensors 1013 can be distributed on an inside and/or an outside surface of the wearable band 1010. In some embodiments, the one or more sensors 1013 are uniformly spaced along the wearable band 1010. Alternatively, in some embodiments, the one or more sensors 1013 are positioned at distinct points along the wearable band 1010. As shown in FIG. 10A, the one or more sensors 1013 can be the same or distinct. For example, in some embodiments, the one or more sensors 1013 can be shaped as a pill (e.g., sensor 1013a), an oval, a circle a square, an oblong (e.g., sensor 1013c), and/or any other shape that maintains contact with the user's skin (e.g., such that neuromuscular signal and/or other biometric data can be accurately measured at the user's skin). In some embodiments, the one or more sensors 1013 are aligned to form pairs of sensors (e.g., for sensing neuromuscular signals based on differential sensing within each respective sensor). For example, sensor 1013b is aligned with an adjacent sensor to form sensor pair 1014a, and sensor 1013d is aligned with an adjacent sensor to form sensor pair 1014b. In some embodiments, the wearable band 1010 does not have a sensor pair. Alternatively, in some embodiments, the wearable band 1010 has a predetermined number of sensor pairs (one pair of sensors, three pairs of sensors, four pairs of sensors, six pairs of sensors, or sixteen pairs of sensors).

The wearable band 1010 can include any suitable number of sensors 1013. In some embodiments, the amount and arrangements of sensors 1013 depend on the particular application for which the wearable band 1010 is used. For instance, a wearable band 1010 configured as an armband, wristband, or chest-band may include a plurality of sensors 1013 with a different number of sensors 1013 and different arrangement for each use case, such as medical use cases, compared to gaming or general day-to-day use cases.

In accordance with some embodiments, the wearable band 1010 further includes an electrical ground electrode and a shielding electrode. The electrical ground and shielding electrodes, like the sensors 1013, can be distributed on the inside surface of the wearable band 1010 such that they contact a portion of the user's skin. For example, the electrical ground and shielding electrodes can be at an inside surface of coupling mechanism 1016 or an inside surface of a wearable structure 1011. The electrical ground and shielding electrodes can be formed and/or use the same components as the sensors 1013. In some embodiments, the wearable band 1010 includes more than one electrical ground electrode and more than one shielding electrode.

The sensors 1013 can be formed as part of the wearable structure 1011 of the wearable band 1010. In some embodiments, the sensors 1013 are flush or substantially flush with the wearable structure 1011 such that they do not extend beyond the surface of the wearable structure 1011. While flush with the wearable structure 1011, the sensors 1013 are still configured to contact the user's skin (e.g., via a skin-contacting surface). Alternatively, in some embodiments, the sensors 1013 extend beyond the wearable structure 1011 a predetermined distance (e.g., 0.1 mm to 2 mm) to make contact and depress into the user's skin. In some embodiments, the sensors 1013 are coupled to an actuator (not shown) configured to adjust an extension height (e.g., a distance from the surface of the wearable structure 1011) of the sensors 1013 such that the sensors 1013 make contact and depress into the user's skin. In some embodiments, the actuators adjust the extension height between 0.01 mm to 1.2 mm. This allows the user to customize the positioning of the sensors 1013 to improve the overall comfort of the wearable band 1010 when worn while still allowing the sensors 1013 to contact the user's skin. In some embodiments, the sensors 1013 are indistinguishable from the wearable structure 1011 when worn by the user.

The wearable structure 1011 can be formed of an elastic material, elastomers, etc., configured to be stretched and fitted to be worn by the user. In some embodiments, the wearable structure 1011 is a textile or woven fabric. As described above, the sensors 1013 can be formed as part of a wearable structure 1011. For example, the sensors 1013 can be molded into the wearable structure 1011 or be integrated into a woven fabric (e.g., the sensors 1013 can be sewn into the fabric and mimic the pliability of fabric (e.g., the sensors 1013 can be constructed from a series of woven strands of fabric)).

The wearable structure 1011 can include flexible electronic connectors that interconnect the sensors 1013, the electronic circuitry, and/or other electronic components (described below in reference to FIG. 10B) that are enclosed in the wearable band 1010. In some embodiments, the flexible electronic connectors are configured to interconnect the sensors 1013, the electronic circuitry, and/or other electronic components of the wearable band 1010 with respective sensors and/or other electronic components of another electronic device (e.g., watch body 1020). The flexible electronic connectors are configured to move with the wearable structure 1011 such that the user adjustment to the wearable structure 1011 (e.g., resizing, pulling, or folding) does not stress or strain the electrical coupling of components of the wearable band 1010.

As described above, the wearable band 1010 is configured to be worn by a user. In particular, the wearable band 1010 can be shaped or otherwise manipulated to be worn by a user. For example, the wearable band 1010 can be shaped to have a substantially circular shape such that it can be configured to be worn on the user's lower arm or wrist. Alternatively, the wearable band 1010 can be shaped to be worn on another body part of the user, such as the user's upper arm (e.g., around a bicep), forearm, chest, legs, etc. The wearable band 1010 can include a retaining mechanism 1012 (e.g., a buckle or a hook and loop fastener) for securing the wearable band 1010 to the user's wrist or other body part. While the wearable band 1010 is worn by the user, the sensors 1013 sense data (referred to as sensor data) from the user's skin. In particular, the sensors 1013 of the wearable band 1010 obtain (e.g., sense and record) neuromuscular signals.

The sensed data (e.g., sensed neuromuscular signals) can be used to detect and/or determine the user's intention to perform certain motor actions. In particular, the sensors 1013 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 1005 of the wrist-wearable device 1000 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 1013 can be used to provide a user with an enhanced interaction with a physical object (e.g., devices communicatively coupled with the wearable band 1010) and/or a virtual object in an AR application generated by an AR system (e.g., user interface objects presented on the display 1005 or another computing device (e.g., a smartphone)).

In some embodiments, the wearable band 1010 includes one or more haptic devices 1046 (FIG. 10B; e.g., a vibratory haptic actuator) that are configured to provide haptic feedback (e.g., a cutaneous and/or kinesthetic sensation) to the user's skin. The sensors 1013 and/or the haptic devices 1046 can be configured to operate in conjunction with multiple applications including, without limitation, health monitoring, social media, games, and AR (e.g., the applications associated with AR).

The wearable band 1010 can also include a coupling mechanism 1016 (e.g., a cradle or a shape of the coupling mechanism can correspond to the shape of the watch body 1020 of the wrist-wearable device 1000) for detachably coupling a capsule (e.g., a computing unit) or watch body 1020 (via a coupling surface of the watch body 1020) to the wearable band 1010. In particular, the coupling mechanism 1016 can be configured to receive a coupling surface proximate to the bottom side of the watch body 1020 (e.g., a side opposite to a front side of the watch body 1020 where the display 1005 is located), such that a user can push the watch body 1020 downward into the coupling mechanism 1016 to attach the watch body 1020 to the coupling mechanism 1016. In some embodiments, the coupling mechanism 1016 can be configured to receive a top side of the watch body 1020 (e.g., a side proximate to the front side of the watch body 1020 where the display 1005 is located) that is pushed upward into the cradle, as opposed to being pushed downward into the coupling mechanism 1016. In some embodiments, the coupling mechanism 1016 is an integrated component of the wearable band 1010 such that the wearable band 1010 and the coupling mechanism 1016 are a single unitary structure. In some embodiments, the coupling mechanism 1016 is a type of frame or shell that allows the watch body 1020 coupling surface to be retained within or on the wearable band 1010 coupling mechanism 1016 (e.g., a cradle, a tracker band, a support base, or a clasp).

The coupling mechanism 1016 can allow for the watch body 1020 to be detachably coupled to the wearable band 1010 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 1020 to the wearable band 1010 and to decouple the watch body 1020 from the wearable band 1010. For example, a user can twist, slide, turn, push, pull, or rotate the watch body 1020 relative to the wearable band 1010, or a combination thereof, to attach the watch body 1020 to the wearable band 1010 and to detach the watch body 1020 from the wearable band 1010. Alternatively, as discussed below, in some embodiments, the watch body 1020 can be decoupled from the wearable band 1010 by actuation of the release mechanism 1029.

The wearable band 1010 can be coupled with a watch body 1020 to increase the functionality of the wearable band 1010 (e.g., converting the wearable band 1010 into a wrist-wearable device 1000, adding an additional computing unit and/or battery to increase computational resources and/or a battery life of the wearable band 1010, or adding additional sensors to improve sensed data). As described above, the wearable band 1010 (and the coupling mechanism 1016) is configured to operate independently (e.g., execute functions independently) from watch body 1020. For example, the coupling mechanism 1016 can include one or more sensors 1013 that contact a user's skin when the wearable band 1010 is worn by the user and provide sensor data for determining control commands.

A user can detach the watch body 1020 (or capsule) from the wearable band 1010 in order to reduce the encumbrance of the wrist-wearable device 1000 to the user. For embodiments in which the watch body 1020 is removable, the watch body 1020 can be referred to as a removable structure, such that in these embodiments the wrist-wearable device 1000 includes a wearable portion (e.g., the wearable band 1010) and a removable structure (the watch body 1020).

Turning to the watch body 1020, the watch body 1020 can have a substantially rectangular or circular shape. The watch body 1020 is configured to be worn by the user on their wrist or on another body part. More specifically, the watch body 1020 is sized to be easily carried by the user, attached on a portion of the user's clothing, and/or coupled to the wearable band 1010 (forming the wrist-wearable device 1000). As described above, the watch body 1020 can have a shape corresponding to the coupling mechanism 1016 of the wearable band 1010. In some embodiments, the watch body 1020 includes a single release mechanism 1029 or multiple release mechanisms (e.g., two release mechanisms 1029 positioned on opposing sides of the watch body 1020, such as spring-loaded buttons) for decoupling the watch body 1020 and the wearable band 1010. The release mechanism 1029 can include, without limitation, a button, a knob, a plunger, a handle, a lever, a fastener, a clasp, a dial, a latch, or a combination thereof.

A user can actuate the release mechanism 1029 by pushing, turning, lifting, depressing, shifting, or performing other actions on the release mechanism 1029. Actuation of the release mechanism 1029 can release (e.g., decouple) the watch body 1020 from the coupling mechanism 1016 of the wearable band 1010, allowing the user to use the watch body 1020 independently from wearable band 1010 and vice versa. For example, decoupling the watch body 1020 from the wearable band 1010 can allow the user to capture images using rear-facing camera 1025b. Although the coupling mechanism 1016 is shown positioned at a corner of watch body 1020, the release mechanism 1029 can be positioned anywhere on watch body 1020 that is convenient for the user to actuate. In addition, in some embodiments, the wearable band 1010 can also include a respective release mechanism for decoupling the watch body 1020 from the coupling mechanism 1016. In some embodiments, the release mechanism 1029 is optional and the watch body 1020 can be decoupled from the coupling mechanism 1016, as described above (e.g., via twisting or rotating).

The watch body 1020 can include one or more peripheral buttons 1023 and 1027 for performing various operations at the watch body 1020. For example, the peripheral buttons 1023 and 1027 can be used to turn on or wake (e.g., transition from a sleep state to an active state) the display 1005, unlock the watch body 1020, increase or decrease volume, increase or decrease brightness, interact with one or more applications, interact with one or more user interfaces. Additionally, or alternatively, in some embodiments, the display 1005 operates as a touch screen and allows the user to provide one or more inputs for interacting with the watch body 1020.

In some embodiments, the watch body 1020 includes one or more sensors 1021. The sensors 1021 of the watch body 1020 can be the same or distinct from the sensors 1013 of the wearable band 1010. The sensors 1021 of the watch body 1020 can be distributed on an inside and/or an outside surface of the watch body 1020. In some embodiments, the sensors 1021 are configured to contact a user's skin when the watch body 1020 is worn by the user. For example, the sensors 1021 can be placed on the bottom side of the watch body 1020 and the coupling mechanism 1016 can be a cradle with an opening that allows the bottom side of the watch body 1020 to directly contact the user's skin. Alternatively, in some embodiments, the watch body 1020 does not include sensors that are configured to contact the user's skin (e.g., including sensors internal and/or external to the watch body 1020 that are configured to sense data of the watch body 1020 and the watch body 1020's surrounding environment). In some embodiments, the sensors 1013 are configured to track a position and/or motion of the watch body 1020.

The watch body 1020 and the wearable band 1010 can share data using a wired communication method (e.g., a Universal Asynchronous Receiver/Transmitter (UART) or a USB transceiver) and/or a wireless communication method (e.g., near-field communication or Bluetooth). For example, the watch body 1020 and the wearable band 1010 can share data sensed by the sensors 1013 and 1021, as well as application- and device-specific information (e.g., active and/or available applications), output devices (e.g., display or speakers), and/or input devices (e.g., touch screens, microphones, or imaging sensors).

In some embodiments, the watch body 1020 can include, without limitation, a front-facing camera 1025a and/or a rear-facing camera 1025b, sensors 1021 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 10B; imaging sensor 1063), a touch sensor, a sweat sensor). In some embodiments, the watch body 1020 can include one or more haptic devices 1076 (FIG. 10B; a vibratory haptic actuator) that is configured to provide haptic feedback (e.g., a cutaneous and/or kinesthetic sensation) to the user. The sensors 1021 and/or the haptic device 1076 can also be configured to operate in conjunction with multiple applications, including, without limitation, health-monitoring applications, social media applications, game applications, and AR applications (e.g., the applications associated with AR).

As described above, the watch body 1020 and the wearable band 1010, when coupled, can form the wrist-wearable device 1000. When coupled, the watch body 1020 and wearable band 1010 operate as a single device to execute functions (e.g., operations, detections, or communications) described herein. In some embodiments, each device is provided with particular instructions for performing the one or more operations of the wrist-wearable device 1000. For example, in accordance with a determination that the watch body 1020 does not include neuromuscular-signal sensors, the wearable band 1010 can include alternative instructions for performing associated instructions (e.g., providing sensed neuromuscular-signal data to the watch body 1020 via a different electronic device). Operations of the wrist-wearable device 1000 can be performed by the watch body 1020 alone or in conjunction with the wearable band 1010 (e.g., via respective processors and/or hardware components) and vice versa. In some embodiments, operations of the wrist-wearable device 1000, the watch body 1020, and/or the wearable band 1010 can be performed in conjunction with one or more processors and/or hardware components of another communicatively coupled device (e.g., FIGS. 12A-12B; the HIPD 1200).

As described below with reference to the block diagram of FIG. 10B, the wearable band 1010 and/or the watch body 1020 can each include independent resources required to independently execute functions. For example, the wearable band 1010 and/or the watch body 1020 can each include a power source (e.g., a battery), a memory, data storage, a processor (e.g., a CPU), communications, a light source, and/or input/output devices.

FIG. 10B shows block diagrams of a computing system 1030 corresponding to the wearable band 1010 and a computing system 1060 corresponding to the watch body 1020, according to some embodiments. A computing system of the wrist-wearable device 1000 includes a combination of components of the wearable band computing system 1030 and the watch body computing system 1060, in accordance with some embodiments.

The watch body 1020 and/or the wearable band 1010 can include one or more components shown in watch body computing system 1060. In some embodiments, a single integrated circuit includes all or a substantial portion of the components of the watch body computing system 1060 that are included in a single integrated circuit. Alternatively, in some embodiments, components of the watch body computing system 1060 are included in a plurality of integrated circuits that are communicatively coupled. In some embodiments, the watch body computing system 1060 is configured to couple (e.g., via a wired or wireless connection) with the wearable band computing system 1030, which allows the computing systems to share components, distribute tasks, and/or perform other operations described herein (individually or as a single device).

The watch body computing system 1060 can include one or more processors 1079, a controller 1077, a peripherals interface 1061, a power system 1095, and memory (e.g., a memory 1080), each of which are defined above and described in more detail below.

The power system 1095 can include a charger input 1096, a power-management integrated circuit (PMIC) 1097, and a battery 1098, each of which are defined above. In some embodiments, a watch body 1020 and a wearable band 1010 can have respective charger inputs (e.g., charger inputs 1096 and 1057), respective batteries (e.g., batteries 1098 and 1059), and can share power with each other (e.g., the watch body 1020 can power and/or charge the wearable band 1010 and vice versa). Although watch body 1020 and/or the wearable band 1010 can include respective charger inputs, a single charger input can charge both devices when coupled. The watch body 1020 and the wearable band 1010 can receive a charge using a variety of techniques. In some embodiments, the watch body 1020 and the wearable band 1010 can use a wired charging assembly (e.g., power cords) to receive the charge. Alternatively, or in addition, the watch body 1020 and/or the wearable band 1010 can be configured for wireless charging. For example, a portable charging device can be designed to mate with a portion of watch body 1020 and/or wearable band 1010 and wirelessly deliver usable power to a battery of watch body 1020 and/or wearable band 1010. The watch body 1020 and the wearable band 1010 can have independent power systems (e.g., power system 1095 and 1056) to enable each to operate independently. The watch body 1020 and wearable band 1010 can also share power (e.g., one can charge the other) via respective PMICs (e.g., PMICs 1097 and 1058) that can share power over power and ground conductors and/or over wireless charging antennas.

In some embodiments, the peripherals interface 1061 can include one or more sensors 1021, many of which listed below are defined above. The sensors 1021 can include one or more coupling sensors 1062 for detecting when the watch body 1020 is coupled with another electronic device (e.g., a wearable band 1010). The sensors 1021 can include imaging sensors 1063 (one or more of the cameras 1025 and/or separate imaging sensors 1063 (e.g., thermal-imaging sensors)). In some embodiments, the sensors 1021 include one or more SpO2 sensors 1064. In some embodiments, the sensors 1021 include one or more biopotential-signal sensors (e.g., EMG sensors 1065, which may be disposed on a user-facing portion of the watch body 1020 and/or the wearable band 1010). In some embodiments, the sensors 1021 include one or more capacitive sensors 1066. In some embodiments, the sensors 1021 include one or more heart rate sensors 1067. In some embodiments, the sensors 1021 include one or more IMUs 1068. In some embodiments, one or more IMUs 1068 can be configured to detect movement of a user's hand or other location that the watch body 1020 is placed or held.

In some embodiments, the peripherals interface 1061 includes an NFC component 1069, a GPS component 1070, a long-term evolution (LTE) component 1071, and/or a Wi-Fi and/or Bluetooth communication component 1072. In some embodiments, the peripherals interface 1061 includes one or more buttons 1073 (e.g., the peripheral buttons 1023 and 1027 in FIG. 10A), which, when selected by a user, cause operations to be performed at the watch body 1020. In some embodiments, the peripherals interface 1061 includes one or more indicators, such as a light-emitting diode (LED), to provide a user with visual indicators (e.g., message received, low battery, an active microphone, and/or a camera).

The watch body 1020 can include at least one display 1005 for displaying visual representations of information or data to the user, including user-interface elements and/or three-dimensional (3D) virtual objects. The display can also include a touch screen for inputting user inputs, such as touch gestures, swipe gestures, and the like. The watch body 1020 can include at least one speaker 1074 and at least one microphone 1075 for providing audio signals to the user and receiving audio input from the user. The user can provide user inputs through the microphone 1075 and can also receive audio output from the speaker 1074 as part of a haptic event provided by the haptic controller 1078. The watch body 1020 can include at least one camera 1025, including a front-facing camera 1025*a* and a rear-facing camera 1025*b*. The cameras 1025 can include ultra-wide-angle cameras, wide-angle cameras, fish-eye cameras, spherical cameras, telephoto cameras, depth-sensing cameras, or other types of cameras.

The watch body computing system 1060 can include one or more haptic controllers 1078 and associated componentry (e.g., haptic devices 1076) for providing haptic events at the watch body 1020 (e.g., a vibrating sensation or audio output in response to an event at the watch body 1020). The haptic controllers 1078 can communicate with one or more haptic devices 1076, such as electroacoustic devices, including a speaker of the one or more speakers 1074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 1078 can provide haptic events to respective haptic actuators that are capable of being sensed by a user of the watch body 1020. In some embodiments, the one or more haptic controllers 1078 can receive input signals from an application of the applications 1082.

In some embodiments, the computer system 1030 and/or the computer system 1060 can include memory 1080, which can be controlled by a memory controller of the one or more controllers 1077 and/or one or more processors 1079. In some embodiments, software components stored in the memory 1080 include one or more applications 1082 configured to perform operations at the watch body 1020. In some embodiments, the one or more applications 1082 include games, word processors, messaging applications, calling applications, web browsers, social media applications, media streaming applications, financial applications, calendars, clocks, etc. In some embodiments, software components stored in the memory 1080 include one or more communication interface modules 1083 as defined above. In some embodiments, software components stored in the memory 1080 include one or more graphics modules 1084 for rendering, encoding, and/or decoding audio and/or visual data; and one or more data management modules 1085 for collecting, organizing, and/or providing access to the data 1087 stored in memory 1080. In some embodiments, one or more of applications 1082 and/or one or more modules can work in conjunction with one another to perform various tasks at the watch body 1020.

In some embodiments, software components stored in the memory 1080 can include one or more operating systems 1081 (e.g., a Linux-based operating system, an Android operating system, etc.). The memory 1080 can also include data 1087. The data 1087 can include profile data 1088A, sensor data 1089A, media content data 1090, application data 1091.

It should be appreciated that the watch body computing system 1060 is an example of a computing system within the watch body 1020, and that the watch body 1020 can have more or fewer components than shown in the watch body computing system 1060, combine two or more components, and/or have a different configuration and/or arrangement of the components. The various components shown in watch body computing system 1060 are implemented in hardware, software, firmware, or a combination thereof, including one or more signal processing and/or application-specific integrated circuits.

Turning to the wearable band computing system 1030, one or more components that can be included in the wearable band 1010 are shown. The wearable band computing system 1030 can include more or fewer components than shown in the watch body computing system 1060, combine two or more components, and/or have a different configuration and/or arrangement of some or all of the components. In some embodiments, all, or a substantial portion of the components of the wearable band computing system 1030 are included in a single integrated circuit. Alternatively, in some embodiments, components of the wearable band computing system 1030 are included in a plurality of integrated circuits that are communicatively coupled. As described above, in some embodiments, the wearable band computing system 1030 is configured to couple (e.g., via a wired or wireless connection) with the watch body computing system 1060, which allows the computing systems to share components, distribute tasks, and/or perform other operations described herein (individually or as a single device).

The wearable band computing system 1030, similar to the watch body computing system 1060, can include one or more processors 1049, one or more controllers 1047 (including one or more haptics controller 1048), a peripherals interface 1031 that can include one or more sensors 1013 and other peripheral devices, power source (e.g., a power system 1056), and memory (e.g., a memory 1050) that includes an operating system (e.g., an operating system 1051), data (e.g., data 1054 including profile data 1088B, sensor data 1089B, etc.), and one or more modules (e.g., a communications interface module 1052, a data management module 1053, etc.).

The one or more sensors 1013 can be analogous to sensors 1021 of the computer system 1060 in light of the definitions above. For example, sensors 1013 can include one or more coupling sensors 1032, one or more SpO2 sensors 1034, one or more EMG sensors 1035, one or more capacitive sensors 1036, one or more heart rate sensors 1037, and one or more IMU sensors 1038.

The peripherals interface 1031 can also include other components analogous to those included in the peripheral interface 1061 of the computer system 1060, including an NFC component 1039, a GPS component 1040, an LTE component 1041, a Wi-Fi and/or Bluetooth communication component 1042, and/or one or more haptic devices 1076 as described above in reference to peripherals interface 1061. In some embodiments, the peripherals interface 1031 includes one or more buttons 1043, a display 1033, a speaker 1044, a microphone 1045, and a camera 1055. In some embodiments, the peripherals interface 1031 includes one or more indicators, such as an LED.

It should be appreciated that the wearable band computing system 1030 is an example of a computing system within the wearable band 1010, and that the wearable band 1010 can have more or fewer components than shown in the wearable band computing system 1030, combine two or more components, and/or have a different configuration and/or arrangement of the components. The various components shown in wearable band computing system 1030 can be implemented in one or a combination of hardware, software, and firmware, including one or more signal processing and/or application-specific integrated circuits.

The wrist-wearable device 1000 with respect to FIG. 10A is an example of the wearable band 1010 and the watch body 1020 coupled, so the wrist-wearable device 1000 will be understood to include the components shown and described for the wearable band computing system 1030 and the watch body computing system 1060. In some embodiments, wrist-wearable device 1000 has a split architecture (e.g., a split mechanical architecture or a split electrical architecture) between the watch body 1020 and the wearable band 1010. In other words, all of the components shown in the wearable band computing system 1030 and the watch body computing system 1060 can be housed or otherwise disposed in a combined watch device 1000, or within individual components of the watch body 1020, wearable band 1010, and/or portions thereof (e.g., a coupling mechanism 1016 of the wearable band 1010).

The techniques described above can be used with any device for sensing neuromuscular signals, including the arm-wearable devices of FIG. 10A-10B, but could also be used with other types of wearable devices for sensing neuromuscular signals (such as body-wearable or head-wearable devices that might have neuromuscular sensors closer to the brain or spinal column).

In some embodiments, a wrist-wearable device 1000 can be used in conjunction with a head-wearable device described below (e.g., AR device 1100 and VR device 1110) and/or an HIPD 1200, and the wrist-wearable device 1000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 1000 can also be used in conjunction with a wearable garment, such as smart textile-based garment 1300 described below in reference to FIGS. 13A-13C. Having thus described example wrist-wearable device, attention will now be turned to example head-wearable devices, such AR device 1100 and VR device 1110.

Example Head-Wearable Devices

FIGS. 11A, 11B-1, 11B-2, and 11C show example head-wearable devices, in accordance with some embodiments. Head-wearable devices can include, but are not limited to, AR devices 1100 (e.g., AR or smart eyewear devices, such as smart glasses, smart monocles, smart contacts, etc.), VR devices 1110 (e.g., VR headsets or head-mounted displays (HMDs)), or other ocularly coupled devices. The AR devices 1100 and the VR devices 1110 are instances of the head-wearable devices (e.g., AR headsets) described in reference to FIGS. 1A to 8C herein, such that the head-wearable device should be understood to have the features of the AR devices 1100 and/or the VR devices 1110 and vice versa. The AR devices 1100 and the VR devices 1110 can perform various functions and/or operations associated with navigating through user interfaces and selectively opening applications, as well as the functions and/or operations described above with reference to FIGS. 1A to 8C.

Figure 11A:
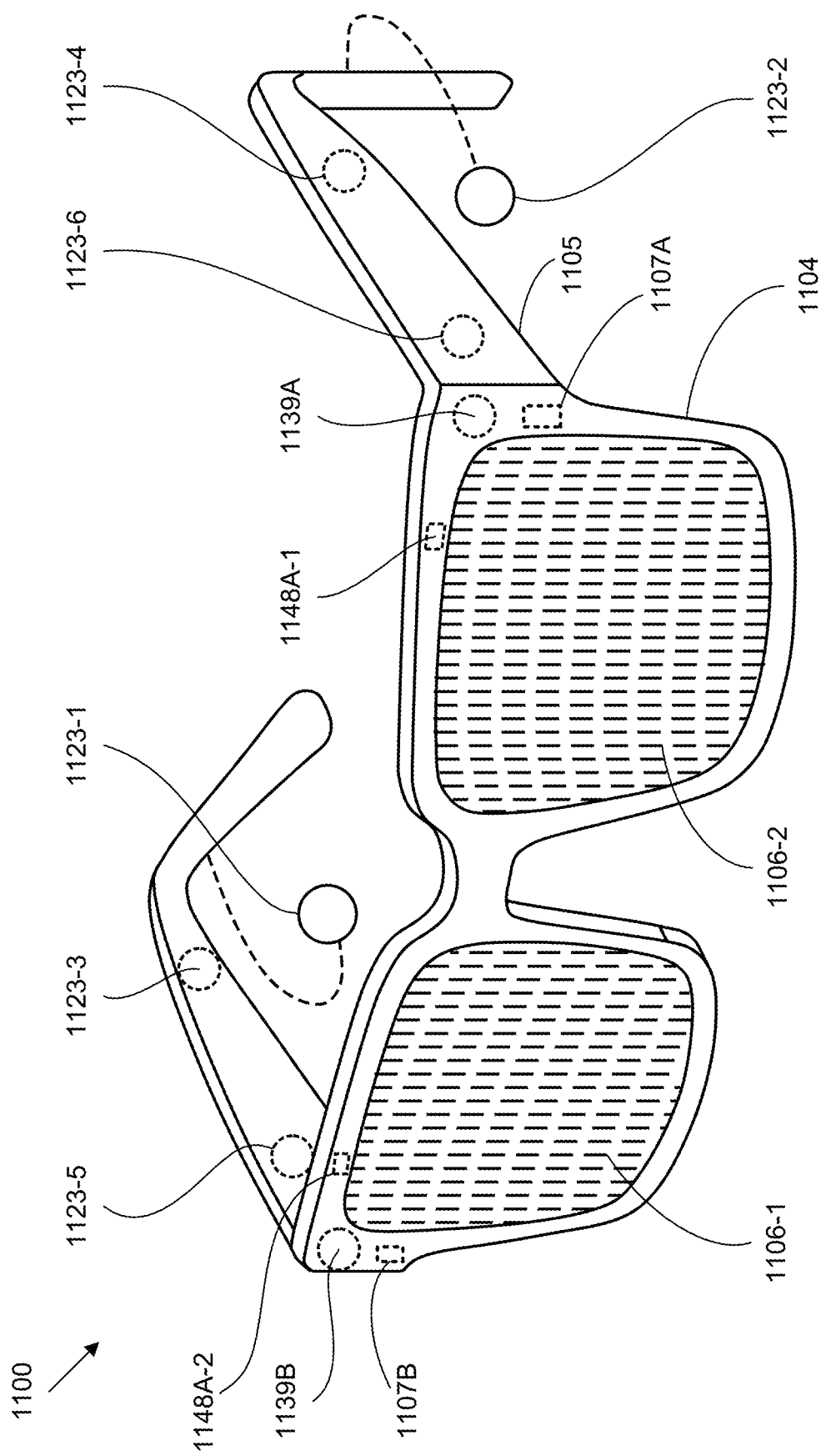
Figures 1, 11B:
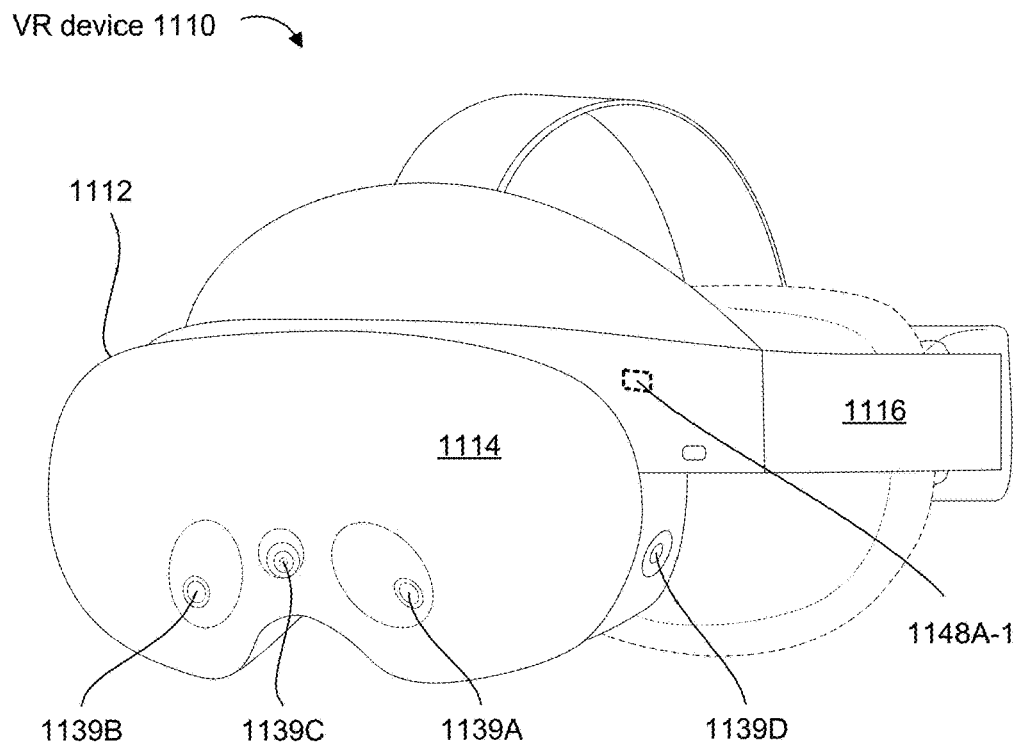
Figures 2, 11B:
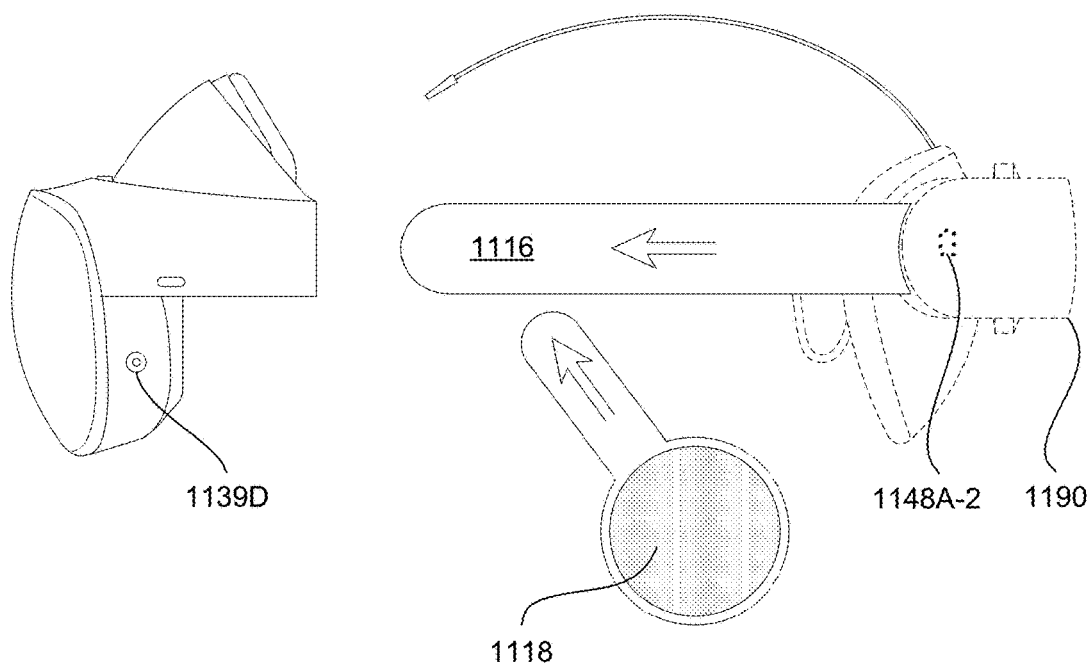

In some embodiments, an AR system (e.g., FIGS. 9A-9D-2; AR systems 900a-900d) includes an AR device 1100 (as shown in FIG. 11A) and/or VR device 1110 (as shown in FIGS. 11B-1-B-2). In some embodiments, the AR device 1100 and the VR device 1110 can include one or more analogous components (e.g., components for presenting interactive AR environments, such as processors, memory, and/or presentation devices, including one or more displays and/or one or more waveguides), some of which are described in more detail with respect to FIG. 11C. The head-wearable devices can use display projectors (e.g., display projector assemblies 1107A and 1107B) and/or waveguides for projecting representations of data to a user. Some embodiments of head-wearable devices do not include displays.

FIG. 11A shows an example visual depiction of the AR device 1100 (e.g., which may also be described herein as augmented-reality glasses and/or smart glasses). The AR device 1100 can work in conjunction with additional electronic components that are not shown in FIGS. 11A, such as a wearable accessory device and/or an intermediary processing device, in electronic communication or otherwise configured to be used in conjunction with the AR device 1100. In some embodiments, the wearable accessory device and/or the intermediary processing device may be configured to couple with the AR device 1100 via a coupling mechanism in electronic communication with a coupling sensor 1124, where the coupling sensor 1124 can detect when an electronic device becomes physically or electronically coupled with the AR device 1100. In some embodiments, the AR device 1100 can be configured to couple to a housing (e.g., a portion of frame 1104 or temple arms 1105), which may include one or more additional coupling mechanisms configured to couple with additional accessory devices. The components shown in FIG. 11A can be implemented in hardware, software, firmware, or a combination thereof, including one or more signal-processing components and/or application-specific integrated circuits (ASICs).

The AR device 1100 includes mechanical glasses components, including a frame 1104 configured to hold one or more lenses (e.g., one or both lenses 1106-1 and 1106-2). One of ordinary skill in the art will appreciate that the AR device 1100 can include additional mechanical components, such as hinges configured to allow portions of the frame 1104 of the AR device 1100 to be folded and unfolded, a bridge configured to span the gap between the lenses 1106-1 and 1106-2 and rest on the user's nose, nose pads configured to rest on the bridge of the nose and provide support for the AR device 1100, earpieces configured to rest on the user's ears and provide additional support for the AR device 1100, temple arms 1105 configured to extend from the hinges to the earpieces of the AR device 1100, and the like. One of ordinary skill in the art will further appreciate that some examples of the AR device 1100 can include none of the mechanical components described herein. For example, smart contact lenses configured to present AR to users may not include any components of the AR device 1100.

The lenses 1106-1 and 1106-2 can be individual displays or display devices (e.g., a waveguide for projected representations). The lenses 1106-1 and 1106-2 may act together or independently to present an image or series of images to a user. In some embodiments, the lenses 1106-1 and 1106-2 can operate in conjunction with one or more display projector assemblies 1107A and 1107B to present image data to a user. While the AR device 1100 includes two displays, embodiments of this disclosure may be implemented in AR devices with a single near-eye display (NED) or more than two NEDs.

The AR device 1100 includes electronic components, many of which will be described in more detail below with respect to FIG. 11C. Some example electronic components are illustrated in FIG. 11A, including sensors 1123-1, 1123-2, 1123-3, 1123-4, 1123-5, and 1123-6, which can be distributed along a substantial portion of the frame 1104 of the AR device 1100. The different types of sensors are described below in reference to FIG. 11C. The AR device 1100 also includes a left camera 1139A and a right camera 1139B, which are located on different sides of the frame 1104. And the eyewear device includes one or more processors 1148A and 1148B (e.g., an integral microprocessor, such as an ASIC) that is embedded into a portion of the frame 1104.

FIGS. 11B-1 and 11B-2 show an example visual depiction of the VR device 1110 (e.g., a head-mounted display (HMD) 1112, also referred to herein as an AR headset, a head-wearable device, or a VR headset). The HMD 1112 includes a front body 1114 and a frame 1116 (e.g., a strap or band) shaped to fit around a user's head. In some embodiments, the front body 1114 and/or the frame 1116 includes one or more electronic elements for facilitating presentation of and/or interactions with an AR and/or VR system (e.g., displays, processors (e.g., processor 1148A-1), IMUs, tracking emitters or detectors, or sensors). In some embodiments, the HMD 1112 includes output audio transducers (e.g., an audio transducer 1118-1), as shown in FIG. 11B-2. In some embodiments, one or more components, such as the output audio transducer(s) 1118 and the frame 1116, can be configured to attach and detach (e.g., are detachably attachable) to the HMD 1112 (e.g., a portion or all of the frame 1116 and/or the output audio transducer 1118), as shown in FIG. 11B-2. In some embodiments, coupling a detachable component to the HMD 1112 causes the detachable component to come into electronic communication with the HMD 1112. The VR device 1110 includes electronic components, many of which will be described in more detail below with respect to FIG. 11C.

FIGS. 11B-1 and 11B-2 also show that the VR device 1110 having one or more cameras, such as the left camera 1139A and the right camera 1139B, which can be analogous to the left and right cameras on the frame 1104 of the AR device 1100. In some embodiments, the VR device 1110 includes one or more additional cameras (e.g., cameras 1139C and 1139D), which can be configured to augment image data obtained by the cameras 1139A and 1139B by providing more information. For example, the camera 1139C can be used to supply color information that is not discerned by cameras 1139A and 1139B. In some embodiments, one or more of the cameras 1139A to 1139D can include an optional IR (infrared) cut filter configured to remove IR light from being received at the respective camera sensors.

The VR device 1110 can include a housing 1190 storing one or more components of the VR device 1110 and/or additional components of the VR device 1110. The housing 1190 can be a modular electronic device configured to couple with the VR device 1110 (or an AR device 1100) and supplement and/or extend the capabilities of the VR device 1110 (or an AR device 1100). For example, the housing 1190 can include additional sensors, cameras, power sources, and processors (e.g., processor 1148A-2). to improve and/or increase the functionality of the VR device 1110. Examples of the different components included in the housing 1190 are described below in reference to FIG. 11C.

Alternatively, or in addition, in some embodiments, the head-wearable device, such as the VR device 1110 and/or the AR device 1100, includes, or is communicatively coupled to, another external device (e.g., a paired device), such as an HIPD 12 (discussed below in reference to FIGS. 12A-12B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 1200, an optional neckband, and/or a wearable accessory device) with the head-wearable devices (e.g., an AR device 1100 and/or a VR device 1110) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 1200) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 1200, can process information generated by one or more of its sensors and/or information provided by other communicatively coupled devices. For example, a head-wearable device can include an IMU, and the intermediary processing device (a neckband and/or an HIPD 1200) can compute all inertial and spatial calculations from the IMUs located on the head-wearable device. Additional examples of processing performed by a communicatively coupled device, such as the HIPD 1200, are provided below in reference to FIGS. 12A and 12B.

AR systems may include a variety of types of visual feedback mechanisms. For example, display devices in the AR devices 1100 and/or the VR devices 1110 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 1100 and/or the VR device 1110 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 1100 and the VR device 1110, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 1100 and/or the VR device 1110 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 1000, an HIPD 1200, smart textile-based garment 1300), and/or other devices described herein.

Figure 11C:
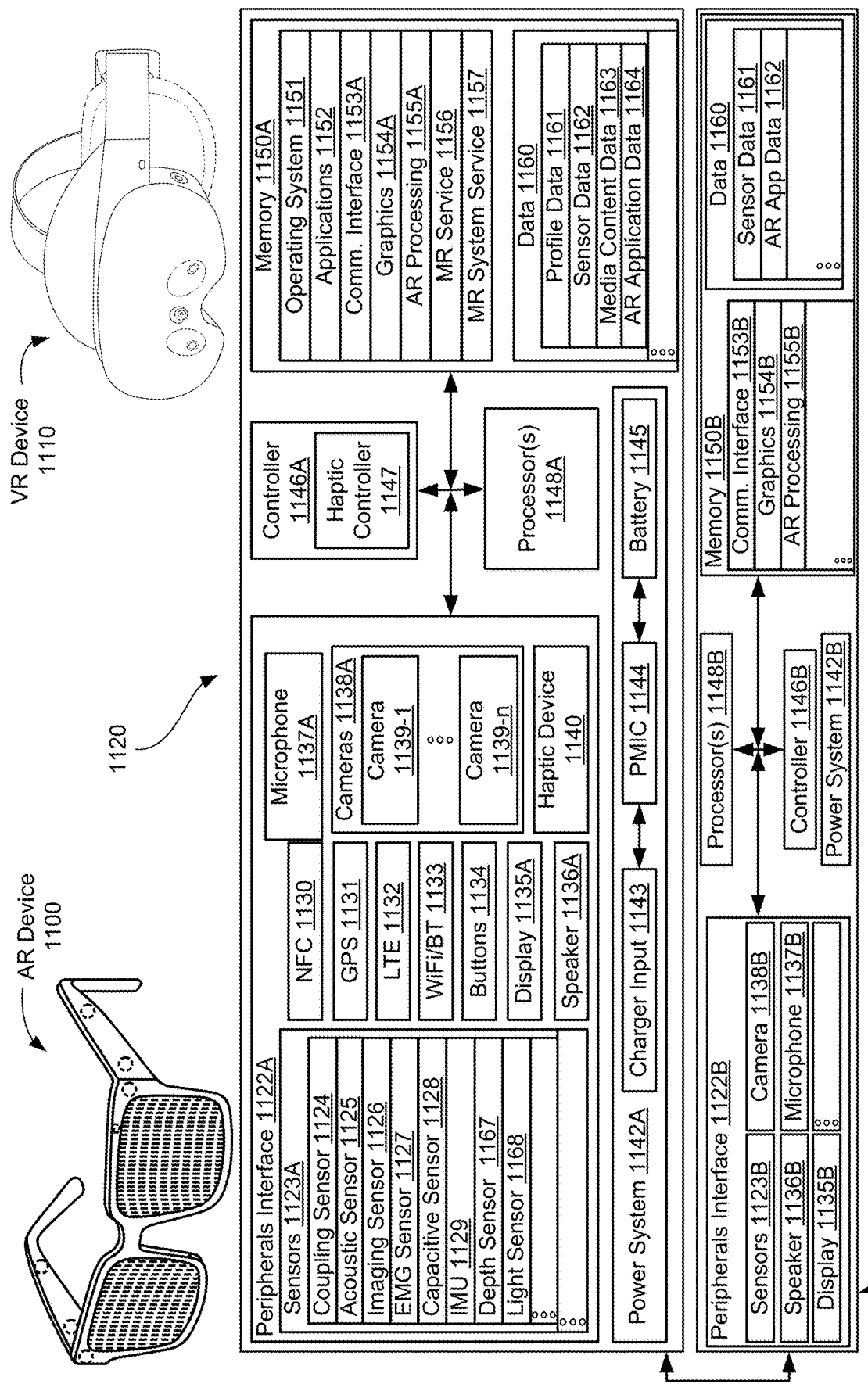

FIG. 11C illustrates a computing system 1120 and an optional housing 1190, each of which shows components that can be included in a head-wearable device (e.g., the AR device 1100 and/or the VR device 1110). In some embodiments, more or fewer components can be included in the optional housing 1190 depending on practical restraints of the respective head-wearable device being described. Additionally, or alternatively, the optional housing 1190 can include additional components to expand and/or augment the functionality of a head-wearable device.

In some embodiments, the computing system 1120 and/or the optional housing 1190 can include one or more peripheral interfaces 1122A and 1122B, one or more power systems 1142A and 1142B (including charger input 1143, PMIC 1144, and battery 1145), one or more controllers 1146A and 1146B (including one or more haptic controllers 1147), one or more processors 1148A and 1148B (as defined above, including any of the examples provided), and memory 1150A and 1150B, which can all be in electronic communication with each other. For example, the one or more processors 1148A and/or 1148B can be configured to execute instructions stored in the memory 1150A and/or 1150B, which can cause a controller of the one or more controllers 1146A and/or 1146B to cause operations to be performed at one or more peripheral devices of the peripheral interfaces 1122A and/or 1122B. In some embodiments, each operation described can occur based on electrical power provided by the power system 1142A and/or 1142B.

In some embodiments, the peripherals interface 1122A can include one or more devices configured to be part of the computing system 1120, many of which have been defined above and/or described with respect to wrist-wearable devices shown in FIGS. 10A and 10B. For example, the peripherals interface can include one or more sensors 1123A. Some example sensors include one or more coupling sensors 1124, one or more acoustic sensors 1125, one or more imaging sensors 1126, one or more EMG sensors 1127, one or more capacitive sensors 1128, and/or one or more IMUs 1129. In some embodiments, the sensors 1123A further include depth sensors 1167, light sensors 1168, and/or any other types of sensors defined above or described with respect to any other embodiments discussed herein.

In some embodiments, the peripherals interface can include one or more additional peripheral devices, including one or more NFC devices 1130, one or more GPS devices 1131, one or more LTE devices 1132, one or more Wi-Fi and/or Bluetooth devices 1133, one or more buttons 1134 (e.g., including buttons that are slidable or otherwise adjustable), one or more displays 1135A, one or more speakers 1136A, one or more microphones 1137A, one or more cameras 1138A (e.g., including the first camera 1139-1 through nth camera 1139-n, which are analogous to the left camera 1139A and/or the right camera 1139B), one or more haptic devices 1140, and/or any other types of peripheral devices defined above or described with respect to any other embodiments discussed herein.

The head-wearable devices can include a variety of types of visual feedback mechanisms (e.g., presentation devices). For example, display devices in the AR device 1100 and/or the VR device 1110 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 1135A can be coupled to each of the lenses 1106-1 and 1106-2 of the AR device 1100. The displays 1135A coupled to each of the lenses 1106-1 and 1106-2 can act together or independently to present an image or series of images to a user. In some embodiments, the AR device 1100 and/or the VR device 1110 includes a single display 1135A (e.g., a near-eye display) or more than two displays 1135A.

In some embodiments, a first set of one or more displays 1135A can be used to present an augmented-reality environment, and a second set of one or more display devices 1135A can be used to present a VR environment. In some embodiments, one or more waveguides are used in conjunction with presenting AR content to the user of the AR device 1100 and/or the VR device 1110 (e.g., as a means of delivering light from a display projector assembly and/or one or more displays 1135A to the user's eyes). In some embodiments, one or more waveguides are fully or partially integrated into the AR device 1100 and/or the VR device 1110. Additionally, or alternatively, to display screens, some AR systems include one or more projection systems. For example, display devices in the AR device 1100 and/or the VR device 1110 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 1135A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 1135A for presenting information to users. For example, an external display 1135A can be used to show a current battery level, network activity (e.g., connected, disconnected), current activity (e.g., playing a game, in a call, in a meeting, or watching a movie), and/or other relevant information. In some embodiments, the external displays 1135A can be used to communicate with others. For example, a user of the head-wearable device can cause the external displays 1135A to present a "do not disturb" notification. The external displays 1135A can also be used by the user to share any information captured by the one or more components of the peripherals interface 1122A and/or generated by the head-wearable device (e.g., during operation and/or performance of one or more applications).

The memory 1150A can include instructions and/or data executable by one or more processors 1148A (and/or processors 1148B of the housing 1190) and/or a memory controller of the one or more controllers 1146A (and/or controller 1146B of the housing 1190). The memory 1150A can include one or more operating systems 1151, one or more applications 1152, one or more communication interface modules 1153A, one or more graphics modules 1154A, one or more AR processing modules 1155A, one or more MR service modules 1156, which may be configured to perform operations related to intruder detection and/or voxel grid generation based on detected intruders within a predefined boundary, one or more MR system service modules 1157, which may be configured to cause rendering of AR content (e.g., visual representations of intruders within a predefined guardian boundary configured to facilitate user interactions with the AR content), and/or any other types of modules or components defined above or described with respect to any other embodiments discussed herein.

The data 1160 stored in memory 1150A can be used in conjunction with one or more of the applications and/or programs discussed above. The data 1160 can include profile data 1161, sensor data 1162, media content data 1163, AR application data 1164, and/or any other types of data defined above or described with respect to any other embodiments discussed herein.

In some embodiments, the controller 1146A of the head-wearable devices processes information generated by the sensors 1123A on the head-wearable devices and/or another component of the head-wearable devices and/or communicatively coupled with the head-wearable devices (e.g., components of the housing 1190, such as components of peripherals interface 1122B). For example, the controller 1146A can process information from the acoustic sensors 1125 and/or image sensors 1126. For each detected sound, the controller 1146A can perform a direction of arrival (DOA) estimation to estimate a direction from which the detected sound arrived at a head-wearable device. As one or more of the acoustic sensors 1125 detect sounds, the controller 1146A can populate an audio data set with the information (e.g., represented by sensor data 1162).

In some embodiments, a physical electronic connector can convey information between the head-wearable devices and another electronic device, and/or between one or more processors 1148A of the head-wearable devices and the controller 1146A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 1200) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 1100 and/or the VR device 1110 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 11B-1 and 11B-2 show the VR device 1110 having cameras 1139A-1139D, which can be used to provide depth information for creating a voxel field and a 2D mesh to provide object information to the user to avoid collisions.

The optional housing 1190 can include analogous components to those describe above with respect to the computing system 1120. For example, the optional housing 1190 can include a respective peripherals interface 1122B, including more or fewer components to those described above with respect to the peripherals interface 1122A. As described above, the components of the optional housing 1190 can be used to augment and/or expand on the functionality of the head-wearable devices. For example, the optional housing 1190 can include respective sensors 1123B, speakers 1136B, displays 1135B, microphones 1137B, cameras 1138B, and/or other components to capture and/or present data. Similarly, the optional housing 1190 can include one or more processors 1148B, controllers 1146B, and/or memory 1150B (including respective communication interface modules 1153B, one or more graphics modules 1154B, one or more AR processing modules 1155B) that can be used individually and/or in conjunction with the components of the computing system 1120.

The techniques described above in FIGS. 11A-11C can be used with different head-wearable devices. In some embodiments, the head-wearable devices (e.g., the AR device 1100 and/or the VR device 1110) can be used in conjunction with one or more wearable devices such as a wrist-wearable device 1000 (or components thereof) and/or a smart textile-based garment 1300 (FIGS. 13A-13C), as well as an HIPD 1200.

Example Handheld Intermediary Processing Devices

Figure 12A:
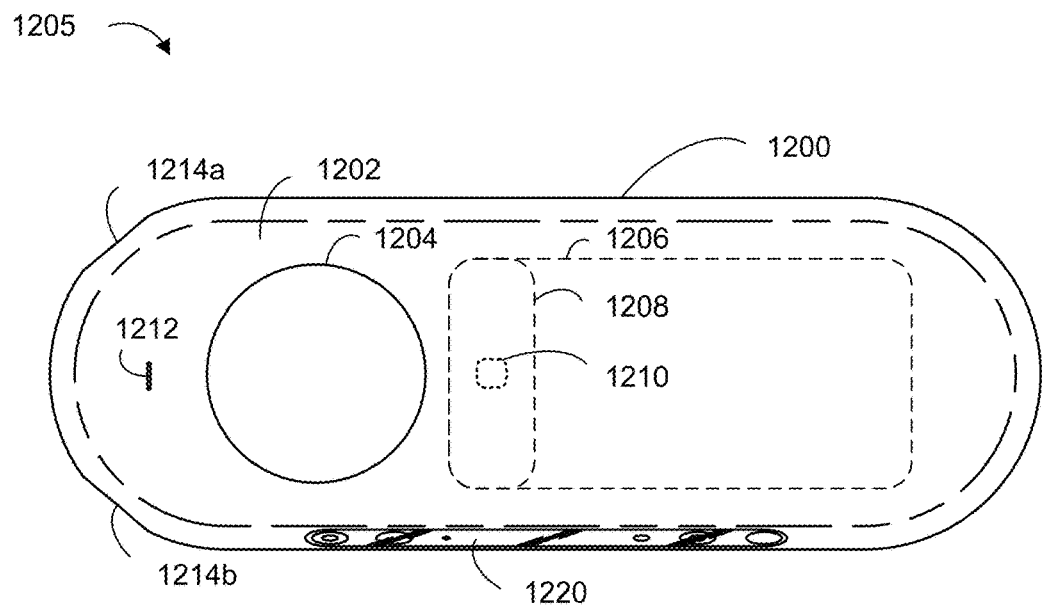
FIGS. 12A and 12B illustrate an example handheld intermediary processing device, in accordance with some embodiments.
Figure 12A:
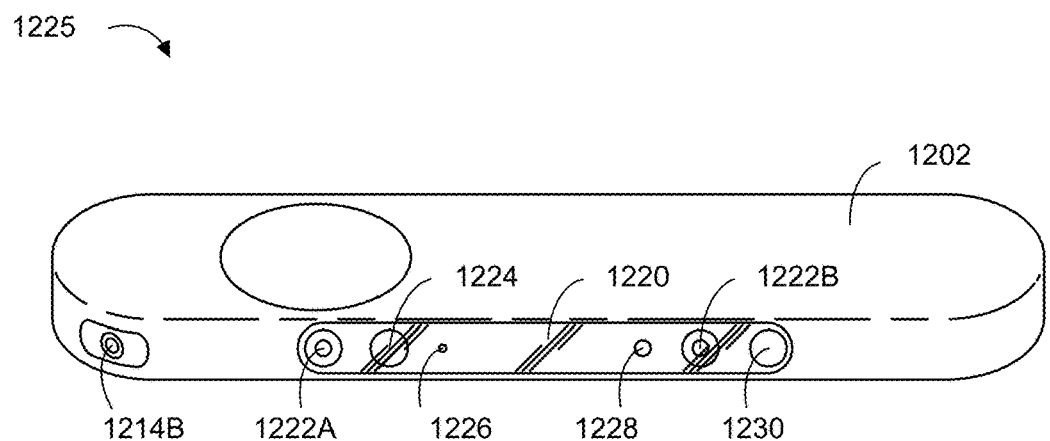
Figure 12B:
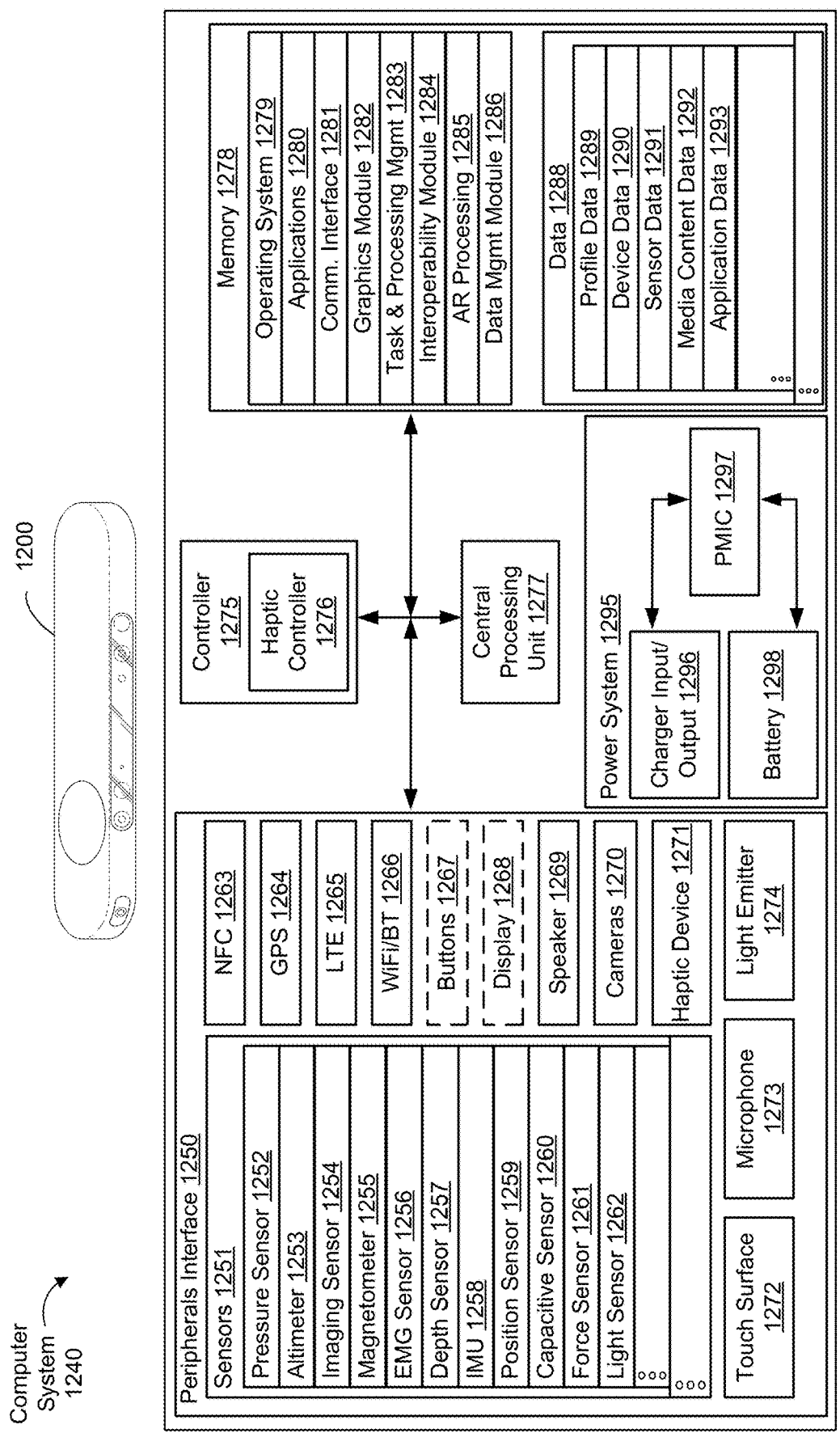

FIGS. 12A and 12B illustrate an example handheld intermediary processing device (HIPD) 1200, in accordance with some embodiments. The HIPD 1200 can perform various functions and/or operations associated with navigating through user interfaces and selectively opening applications.

FIG. 12A shows a top view 1205 and a side view 1225 of the HIPD 1200. The HIPD 1200 is configured to communicatively couple with one or more wearable devices (or other electronic devices) associated with a user. For example, the HIPD 1200 is configured to communicatively couple with a user's wrist-wearable device 1000 (or components thereof, such as the watch body 1020 and the wearable band 1010), AR device 1100, and/or VR device 1110. The HIPD 1200 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 1200 can successfully be communicatively coupled with an electronic device, such as a wearable device).

The HIPD 1200 can perform various functions independently and/or in conjunction with one or more wearable devices (e.g., wrist-wearable device 1000, AR device 1100, and/or VR device 1110). The HIPD 1200 is configured to increase and/or improve the functionality of communicatively coupled devices, such as the wearable devices. The HIPD 1200 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to Figures. Additionally, as will be described in more detail below, functionality and/or operations of the HIPD 1200 can include, without limitation, task offloading and/or handoffs, thermals offloading and/or handoffs, 6 degrees of freedom (6DoF) raycasting and/or gaming (e.g., using imaging devices or cameras 1214A and 1214B, which can be used for simultaneous localization and mapping (SLAM), and/or with other image processing techniques), portable charging; messaging, image capturing via one or more imaging devices or cameras (e.g., cameras 1222A and 1222B), sensing user input (e.g., sensing a touch on a multitouch input surface 1202), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 1200 and/or in communication between the HIPD 1200 and another wearable device described herein. In some embodiments, functions can be executed on the HIPD 1200 in conjunction with an AR environment. As the skilled artisan will appreciate upon reading the descriptions provided herein, the novel HIPD 1200 described herein can be used with any type of suitable AR environment.

While the HIPD 1200 is communicatively coupled with a wearable device and/or other electronic device, the HIPD 1200 is configured to perform one or more operations initiated at the wearable device and/or the other electronic device. In particular, one or more operations of the wearable device and/or the other electronic device can be offloaded to the HIPD 1200 to be performed. The HIPD 1200 performs one or more operations of the wearable device and/or the other electronic device and provides data corresponding to the completed operations to the wearable device and/or the other electronic device. For example, a user can initiate a video stream using the AR device 1100 and back-end tasks associated with performing the video stream (e.g., video rendering) can be offloaded to the HIPD 1200, which the HIPD 1200 performs and provides corresponding data to the AR device 1100 to perform remaining front-end tasks associated with the video stream (e.g., presenting the rendered video data via a display of the AR device 1100). In this way, the HIPD 1200, which has more computational resources and greater thermal headroom than a wearable device can perform computationally intensive tasks for the wearable device, improving performance of an operation performed by the wearable device.

The HIPD 1200 includes a multi-touch input surface 1202 on a first side (e.g., a front surface) that is configured to detect one or more user inputs. In particular, the multi-touch input surface 1202 can detect single-tap inputs, multi-tap inputs, swipe gestures and/or inputs, force-based and/or pressure-based touch inputs, held taps, and the like. The multi-touch input surface 1202 is configured to detect capacitive touch inputs and/or force (and/or pressure) touch inputs. The multi-touch input surface 1202 includes a first touch-input surface 1204 defined by a surface depression, and a second touch-input surface 1206 defined by a substantially planar portion. The first touch-input surface 1204 can be disposed adjacent to the second touch-input surface 1206. In some embodiments, the first touch-input surface 1204 and the second touch-input surface 1206 can be different dimensions, shapes, and/or cover different portions of the multi-touch input surface 1202. For example, the first touch-input surface 1204 can be substantially circular and the second touch-input surface 1206 is substantially rectangular. In some embodiments, the surface depression of the multi-touch input surface 1202 is configured to guide user handling of the HIPD 1200. In particular, the surface depression is configured such that the user holds the HIPD 1200 upright when held in a single hand (e.g., such that the using imaging devices or cameras 1214A and 1214B are pointed toward a ceiling or the sky). Additionally, the surface depression is configured such that the user's thumb rests within the first touch-input surface 1204.

In some embodiments, the different touch-input surfaces include a plurality of touch-input zones. For example, the second touch-input surface 1206 includes at least a first touch-input zone 1208 within a second touch-input zone 1206 and a third touch-input zone 1210 within the first touch-input zone 1208. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1208 causes the HIPD 1200 to perform a first command and a user input detected within the second touch-input zone 1206 causes the HIPD 1200 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1208 can be configured to detect force touch inputs (e.g., a magnitude at which the user presses down) and capacitive touch inputs, and the second touch-input zone 1206 can be configured to detect capacitive touch inputs.

The HIPD 1200 includes one or more sensors 1251 for sensing data used in the performance of one or more operations and/or functions. For example, the HIPD 1200 can include an IMU that is used in conjunction with cameras 1214 for 3-dimensional object manipulation (e.g., enlarging, moving, destroying, etc. an object) in an AR or VR environment. Non-limiting examples of the sensors 1251 included in the HIPD 1200 include a light sensor, a magnetometer, a depth sensor, a pressure sensor, and a force sensor. Additional examples of the sensors 1251 are provided below in reference to FIG. 12B.

The HIPD 1200 can include one or more light indicators 1212 to provide one or more notifications to the user. In some embodiments, the light indicators are LEDs or other types of illumination devices. The light indicators 1212 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1204. The light indicators can be illuminated in different colors and/or patterns to provide the user with one or more notifications and/or information about the device. For example, a light indicator positioned around the first touch-input surface 1204 can flash when the user receives a notification (e.g., a message), change red when the HIPD 1200 is out of power, operate as a progress bar (e.g., a light ring that is closed when a task is completed (e.g., 0% to 100%)), operates as a volume indicator, etc.).

In some embodiments, the HIPD 1200 includes one or more additional sensors on another surface. For example, as shown FIG. 12A, HIPD 1200 includes a set of one or more sensors (e.g., sensor set 1220) on an edge of the HIPD 1200. The sensor set 1220, when positioned on an edge of the of the HIPD 1200, can be pe positioned at a predetermined tilt angle (e.g., 26 degrees), which allows the sensor set 1220 to be angled toward the user when placed on a desk or other flat surface. Alternatively, in some embodiments, the sensor set 1220 is positioned on a surface opposite the multi-touch input surface 1202 (e.g., a back surface). The one or more sensors of the sensor set 1220 are discussed in detail below.

The side view 1225 of the of the HIPD 1200 shows the sensor set 1220 and camera 1214B. The sensor set 1220 includes one or more cameras 1222A and 1222B, a depth projector 1224, an ambient light sensor 1228, and a depth receiver 1230. In some embodiments, the sensor set 1220 includes a light indicator 1226. The light indicator 1226 can operate as a privacy indicator to let the user and/or those around them know that a camera and/or microphone is active. The sensor set 1220 is configured to capture a user's facial expression such that the user can puppet a custom avatar (e.g., showing emotions, such as smiles, laughter, etc., on the avatar or a digital representation of the user). The sensor set 1220 can be configured as a side stereo red-green-blue (RGB) system, a rear indirect time-of-flight (iToF) system, or a rear stereo RGB system. As the skilled artisan will appreciate upon reading the descriptions provided herein, the novel HIPD 1200 described herein can use different sensor set 1220 configurations and/or sensor set 1220 placement.

In some embodiments, the HIPD 1200 includes one or more haptic devices 1271 (FIG. 12B; e.g., a vibratory haptic actuator) that are configured to provide haptic feedback (e.g., kinesthetic sensation). The sensors 1251, and/or the haptic devices 1271 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 1200 is configured to operate without a display. However, in optional embodiments, the HIPD 1200 can include a display 1268 (FIG. 12B). The HIPD 1200 can also income one or more optional peripheral buttons 1267 (FIG. 12B). For example, the peripheral buttons 1267 can be used to turn on or turn off the HIPD 1200. Further, the HIPD 1200 housing can be formed of polymers and/or elastomer elastomers. The HIPD 1200 can be configured to have a non-slip surface to allow the HIPD 1200 to be placed on a surface without requiring a user to watch over the HIPD 1200. In other words, the HIPD 1200 is designed such that it would not easily slide off a surfaces. In some embodiments, the HIPD 1200 include one or magnets to couple the HIPD 1200 to another surface. This allows the user to mount the HIPD 1200 to different surfaces and provide the user with greater flexibility in use of the HIPD 1200.

As described above, the HIPD 1200 can distribute and/or provide instructions for performing the one or more tasks at the HIPD 1200 and/or a communicatively coupled device. For example, the HIPD 1200 can identify one or more back-end tasks to be performed by the HIPD 1200 and one or more front-end tasks to be performed by a communicatively coupled device. While the HIPD 1200 is configured to offload and/or handoff tasks of a communicatively coupled device, the HIPD 1200 can perform both back-end and front-end tasks (e.g., via one or more processors, such as CPU 1277; FIG. 12B). The HIPD 1200 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 1200 can perform the above operations alone or in conjunction with a wearable device (or other communicatively coupled electronic device).

FIG. 12B shows block diagrams of a computing system 1240 of the HIPD 1200, in accordance with some embodiments. The HIPD 1200, described in detail above, can include one or more components shown in HIPD computing system 1240. The HIPD 1200 will be understood to include the components shown and described below for the HIPD computing system 1240. In some embodiments, all, or a substantial portion of the components of the HIPD computing system 1240 are included in a single integrated circuit.

Alternatively, in some embodiments, components of the HIPD computing system 1240 are included in a plurality of integrated circuits that are communicatively coupled.

The HIPD computing system 1240 can include a processor (e.g., a CPU 1277, a GPU, and/or a CPU with integrated graphics), a controller 1275, a peripherals interface 1250 that includes one or more sensors 1251 and other peripheral devices, a power source (e.g., a power system 1295), and memory (e.g., a memory 1278) that includes an operating system (e.g., an operating system 1279), data (e.g., data 1288), one or more applications (e.g., applications 1280), and one or more modules (e.g., a communications interface module 1281, a graphics module 1282, a task and processing management module 1283, an interoperability module 1284, an AR processing module 1285, a data management module 1286, etc.). The HIPD computing system 1240 further includes a power system 1295 that includes a charger input and output 1296, a PMIC 1297, and a battery 1298, all of which are defined above.

In some embodiments, the peripherals interface 1250 can include one or more sensors 1251. The sensors 1251 can include analogous sensors to those described above in reference to FIG. 10B. For example, the sensors 1251 can include imaging sensors 1254, (optional) EMG sensors 1256, IMUs 1258, and capacitive sensors 1260. In some embodiments, the sensors 1251 can include one or more pressure sensor 1252 for sensing pressure data, an altimeter 1253 for sensing an altitude of the HIPD 1200, a magnetometer 1255 for sensing a magnetic field, a depth sensor 1257 (or a time-of flight sensor) for determining a difference between the camera and the subject of an image, a position sensor 1259 (e.g., a flexible position sensor) for sensing a relative displacement or position change of a portion of the HIPD 1200, a force sensor 1261 for sensing a force applied to a portion of the HIPD 1200, and a light sensor 1262 (e.g., an ambient light sensor) for detecting an amount of lighting. The sensors 1251 can include one or more sensors not shown in FIG. 12B.

Analogous to the peripherals described above in reference to FIGS. 10B, the peripherals interface 1250 can also include an NFC component 1263, a GPS component 1264, an LTE component 1265, a Wi-Fi and/or Bluetooth communication component 1266, a speaker 1269, a haptic device 1271, and a microphone 1273. As described above in reference to FIG. 12A, the HIPD 1200 can optionally include a display 1268 and/or one or more buttons 1267. The peripherals interface 1250 can further include one or more cameras 1270, touch surfaces 1272, and/or one or more light emitters 1274. The multi-touch input surface 1202 described above in reference to FIG. 12A is an example of touch surface 1272. The light emitters 1274 can be one or more LEDs, lasers, etc. and can be used to project or present information to a user. For example, the light emitters 1274 can include light indicators 1212 and 1226 described above in reference to FIG. 12A. The cameras 1270 (e.g., cameras 1214A, 1214B, and 1222 described above in FIG. 12A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1270 can be used for SLAM; 6 DoF ray casting, gaming, object manipulation, and/or other rendering; facial recognition and facial expression recognition, etc.

Similar to the watch body computing system 1060 and the watch band computing system 1030 described above in reference to FIG. 10B, the HIPD computing system 1240 can include one or more haptic controllers 1276 and associated componentry (e.g., haptic devices 1271) for providing haptic events at the HIPD 1200.

Memory 1278 can include high-speed random-access memory and/or non-volatile memory, such as one or more magnetic disk storage devices, flash memory devices, or other non-volatile solid-state memory devices. Access to the memory 1278 by other components of the HIPD 1200, such as the one or more processors and the peripherals interface 1250, can be controlled by a memory controller of the controllers 1275.

In some embodiments, software components stored in the memory 1278 include one or more operating systems 1279, one or more applications 1280, one or more communication interface modules 1281, one or more graphics modules 1282, one or more data management modules 1285, which are analogous to the software components described above in reference to FIG. 10B.

In some embodiments, software components stored in the memory 1278 include a task and processing management module 1283 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1283 uses data 1288 (e.g., device data 1290) to distribute the one or more front-end and/or back-end tasks based on communicatively coupled devices' computing resources, available power, thermal headroom, ongoing operations, and/or other factors. For example, the task and processing management module 1283 can cause the performance of one or more back-end tasks (of an operation performed at communicatively coupled AR device 1100) at the HIPD 1200 in accordance with a determination that the operation is utilizing a predetermined amount (e.g., at least 70%) of computing resources available at the AR device 1100.

In some embodiments, software components stored in the memory 1278 include an interoperability module 1284 for exchanging and utilizing information received and/or provided to distinct communicatively coupled devices. The interoperability module 1284 allows for different systems, devices, and/or applications to connect and communicate in a coordinated way without user input. In some embodiments, software components stored in the memory 1278 include an AR module 1285 that is configured to process signals based at least on sensor data for use in an AR and/or VR environment. For example, the AR processing module 1285 can be used for 3D object manipulation, gesture recognition, facial and facial expression, recognition, etc.

The memory 1278 can also include data 1287, including structured data. In some embodiments, the data 1287 can include profile data 1289, device data 1289 (including device data of one or more devices communicatively coupled with the HIPD 1200, such as device type, hardware, software, configurations, etc.), sensor data 1291, media content data 1292, and/or application data 1293.

It should be appreciated that the HIPD computing system 1240 is an example of a computing system within the HIPD 1200, and that the HIPD 1200 can have more or fewer components than shown in the HIPD computing system 1240, combine two or more components, and/or have a different configuration and/or arrangement of the components. The various components shown in HIPD computing system 1240 are implemented in hardware, software, firmware, or a combination thereof, including one or more signal processing and/or application-specific integrated circuits.

Figure 13B:
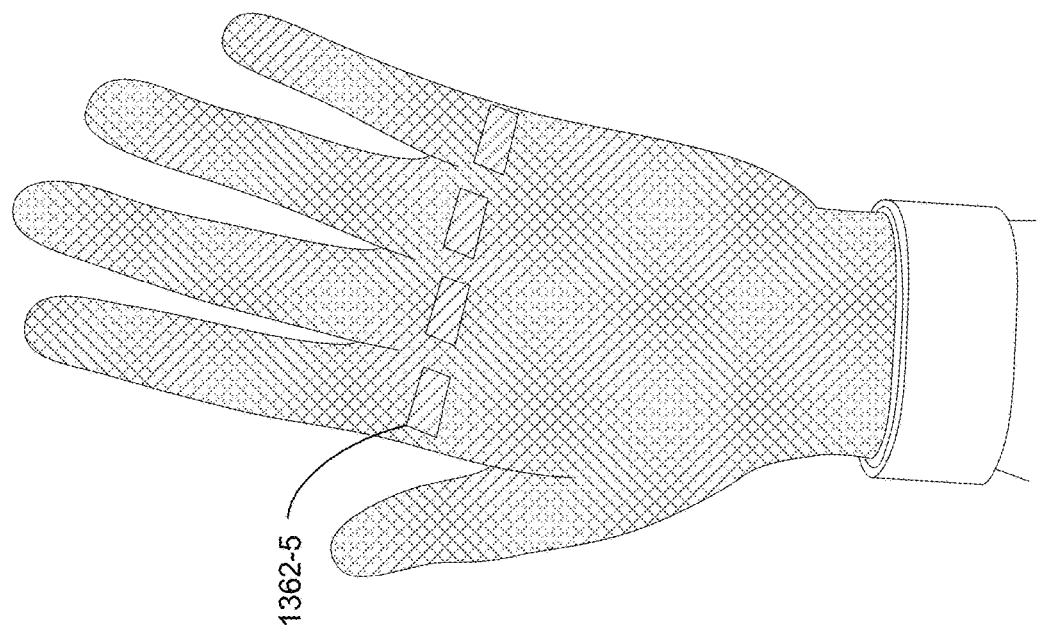
FIGS. 13A to 13C illustrate an example smart textile-based garment, in accordance with some embodiments.
Figure 13A:
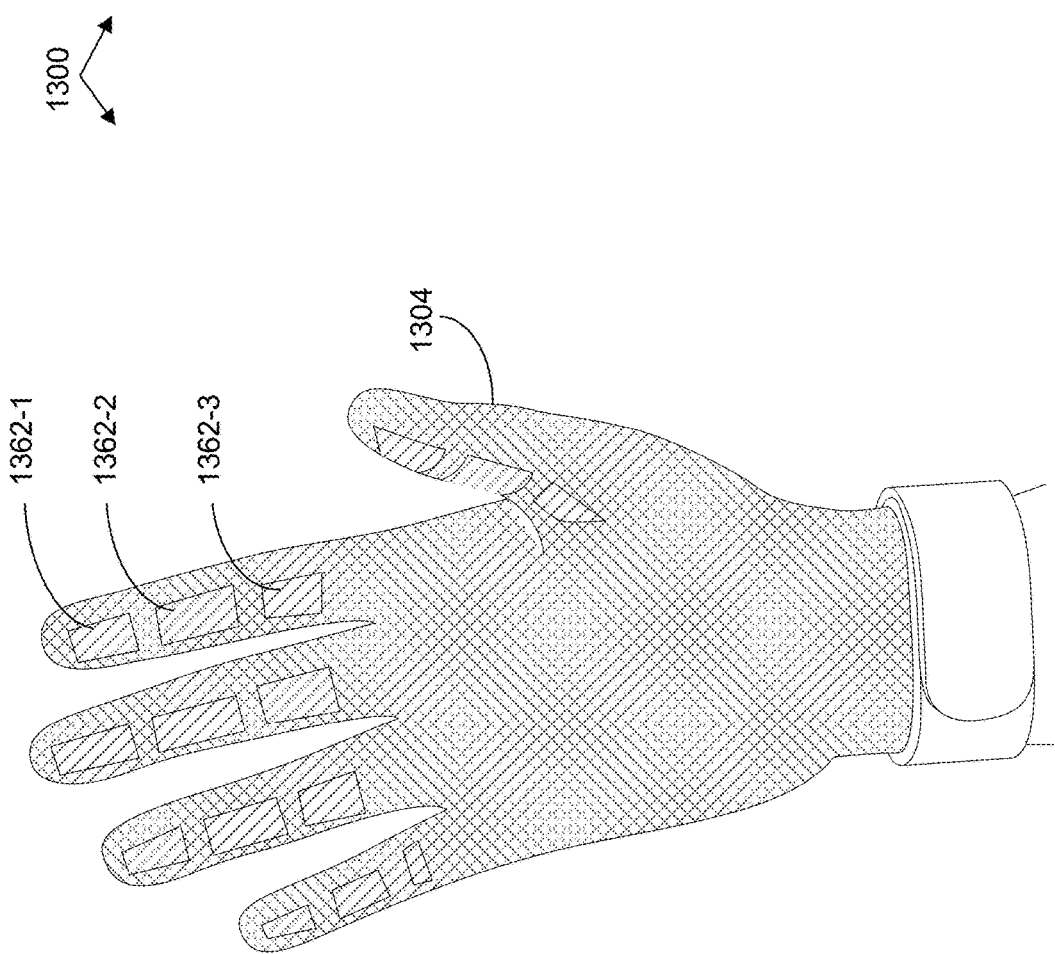
Figure 13C:
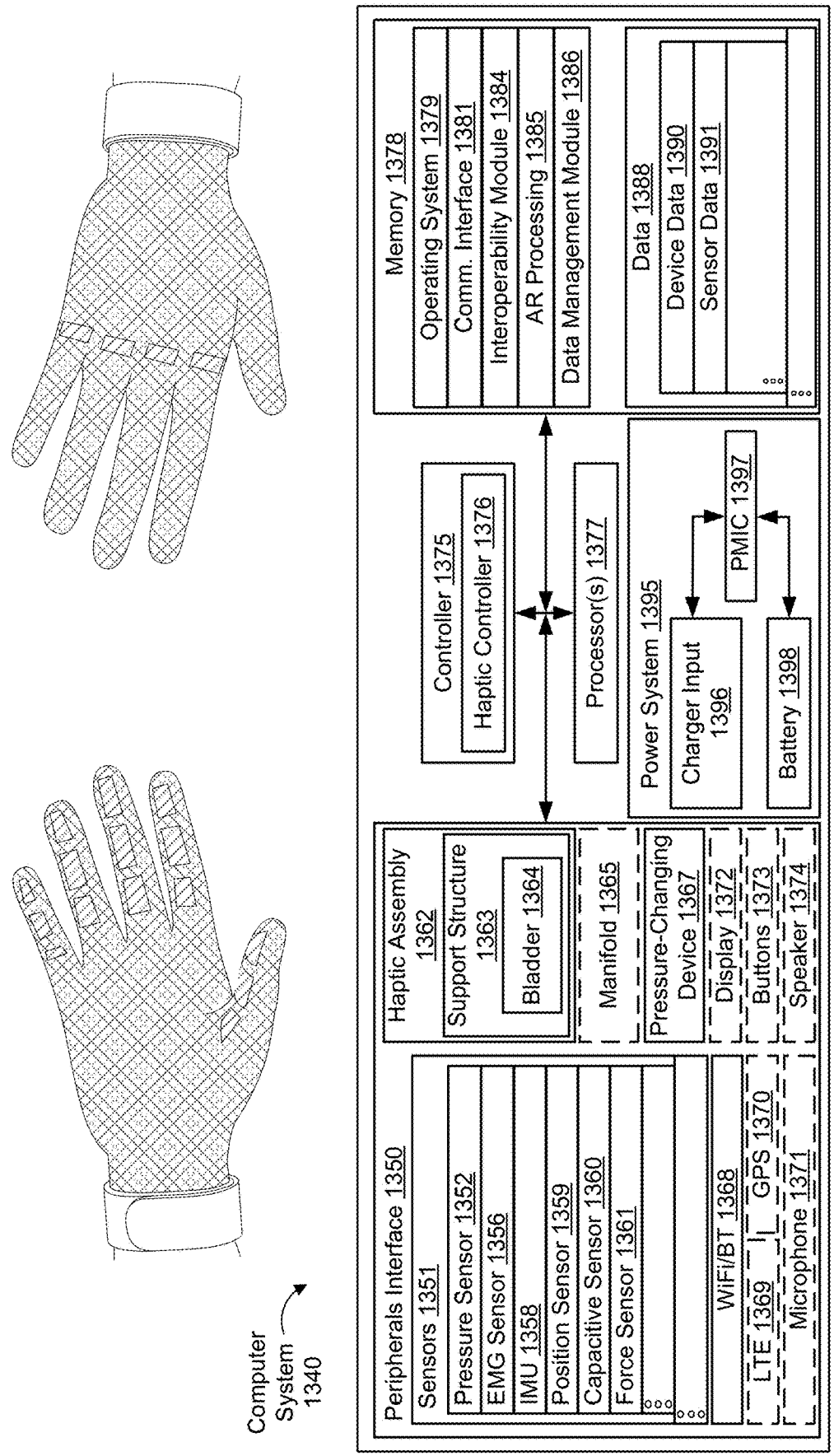

The techniques described above in FIG. 12A-12B can be used with any device used as a human-machine interface controller. In some embodiments, an HIPD 1200 can be used in conjunction with one or more wearable device such as a head-wearable device (e.g., AR device 1100 and VR device 1110) and/or a wrist-wearable device 1000 (or components thereof). In some embodiments, an HIPD 1200 can also be used in conjunction with a wearable garment, such as smart textile-based garment 1300 (FIGS. 13A-13C). Having thus described example HIPD 1200, attention will now be turned to example feedback devices, such as smart textile-based garment 1300.

Example Smart Textile-Based Garments

FIGS. 13A and 13B illustrate an example smart textile-based garment, in accordance with some embodiments. The smart textile-based garment 1300 (e.g., wearable gloves, a shirt, a headband, a wristbands, socks, etc.) is configured to communicatively couple with one or more electronic devices, such as a wrist-wearable device 1000, a head-wearable device, an HIPD 1200, a laptop, tablet, and/or other computing devices. The smart textile-based garment 1300 can perform various functions and/or operations associated with navigating through user interfaces and selectively opening applications.

The smart textile-based garment 1300 can be part of an AR system, such as AR system 900d described above in reference to FIGS. 9D-1 and 9D-2. The smart textile-based garment 1300 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1300 receives instructions from a communicatively coupled device (e.g., the wrist-wearable device 1000, a head-wearable device, and HIPD 1200, etc.) for causing the performance of a feedback response. Alternatively, or in addition, in some embodiments, the smart textile-based garment 1300 determines one or more feedback responses to provide a user. The smart textile-based garment 1300 can determine the one or more feedback responses based on sensor data captured by one or more of its sensors (e.g., sensors 1351; FIG. 13C) or communicatively coupled sensors (e.g., sensors of a wrist-wearable device 1000, a head-wearable device, an HIPD 1200, and/or other computing device).

Non-limiting examples of the feedback determined by the smart textile-based garment 1300 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1300 can include respective feedback devices (e.g., a haptic device or assembly 1362 or other feedback devices or assemblies) to provide the feedback responses to the user. Similarly, the smart textile-based garment 1300 can communicatively couple with another device (and/or the other device's feedback devices) to coordinate the feedback provided to the user. For example, a VR device 1110 can present an AR environment to a user and as the user interacts with objects within the AR environment, such as a virtual cup, the smart textile-based garment 1300 provides respective response to the user. In particular, the smart textile-based garment 1300 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally, or alternatively, in some embodiments, the smart textile-based garment 1300 is configured to operate as a controller configured to perform one or more functions or operations associated with interacting with user interfaces and applications of communicatively coupled devices, interacting with an AR environment, interacting with VR environment, and/or operating as a human-machine interface controller.

FIG. 13A shows one or more haptic assemblies 1362 (e.g., first through fourth haptic assemblies 1362-1 through 1362-4) on a portion of the smart textile-based garment 1300 adjacent to a palmar side of the user's hand and FIG. 13B shows additional haptic assemblies (e.g., a fifth haptic assembly 1362-5) on a portion of the smart textile-based garment 1300 adjacent to a dorsal side of the user's hand. In some embodiments, the haptic assemblies 1362 include a mechanism that, at a minimum, provide resistance when a respective haptic assembly 1362 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1362 described can transition between a first pressurized state and a second pressurized state to provide haptic feedback to the user. Structures of haptic assemblies 1362 can be integrated into various devices configured to be in contact or proximity to a user's skin, including, but not limited to devices such as glove worn devices, body worn clothing device, headset devices. Each of the haptic assemblies 1362 can be included in or physically coupled to a garment component 1304 of the smart textile-based garment 1300. For example, each of the haptic assemblies 1362-1, 1362-2, 1362-3, . . . 1362-N are physically coupled to the garment 1304 are configured to contact respective phalanges of a user's thumb and fingers.

Due to the ever-changing nature of artificial-reality, the haptic assemblies 1362 may be required to transition between the multiple states hundreds, or perhaps thousands of times, during a single use. Thus, the haptic assemblies 1362 described herein are durable and designed to quickly transition from state to state. To provide some context, in a first pressurized state, the haptic assemblies 1362 do not impede free movement of a portion of the wearer's body. For example, one or more haptic assemblies 1362 incorporated into a glove are made from flexible materials that do not impede free movement of the wearer's hand and fingers (e.g., an electrostatic-zipping actuator). The haptic assemblies 1362 are configured to conform to a shape of the portion of the wearer's body when in the first pressurized state. However, once in a second pressurized state, the haptic assemblies 1362 can be configured to restrict and/or impede free movement of the portion of the wearer's body (e.g., appendages of the user's hand). For example, the respective haptic assembly 1362 (or multiple respective haptic assemblies) can restrict movement of a wearer's finger (e.g., prevent the finger from curling or extending) when the haptic assembly 1362 is in the second pressurized state. Moreover, once in the second pressurized state, the haptic assemblies 1362 may take different shapes, with some haptic assemblies 1362 configured to take a planar, rigid shape (e.g., flat and rigid), while some other haptic assemblies 1362 are configured to curve or bend, at least partially.

The smart textile-based garment 1300 can be one of a plurality of devices in an AR system (e.g., AR systems of FIGS. 9A-9D-2). For example, a user can wear a pair of gloves (e.g., a first type of smart textile-based garment 1300), wear a haptics component of a wrist-wearable device 1000 (FIGS. 10A-10B), wear a headband (e.g., a second type of smart textile-based garment 1300), hold an HIPD 1200, etc. As explained above, the haptic assemblies 1362 are configured to provide haptic simulations to a wearer of the smart textile-based garments 1300. The garment 1304 of each smart textile-based garment 1300 can be one of various articles of clothing (e.g., gloves, socks, shirts, pants, etc.). Thus, a user may wear multiple smart textile-based garments 1300 that are each configured to provide haptic stimulations to respective parts of the body where the smart textile-based garments 1300 are being worn. Although the smart textile-based garment 1300 are described as an individual device, in some embodiments, the smart textile-based garment 1300 can be combined with other wearable devices described herein. For example, the smart textile-based garment 1300 can form part of a VR device 1110 (e.g., a headband portion).

FIG. 13C shows block diagrams of a computing system 1340 of the haptic assemblies 1362, in accordance with some embodiments. The computing system 1340 can include one or more peripheral interfaces 1350, one or more power systems 1395 (including charger input 1396, PMIC 1397, and battery 1398), one or more controllers 1375 (including one or more haptic controllers 1376), one or more processors 1377 (as defined above, including any of the examples provided), and memory 1378, which can all be in electronic communication with each other. For example, the one or more processors 1377 can be configured to execute instructions stored in the memory 1378, which can cause a controller of the one or more controllers 1375 to cause operations to be performed at one or more peripheral devices of the peripherals interface 1350. In some embodiments, each operation described can occur based on electrical power provided by the power system 1395.

In some embodiments, the peripherals interface 1350 can include one or more devices configured to be part of the computing system 1340, many of which have been defined above and/or described with respect to wrist-wearable devices shown in FIGS. 10A-12B. For example, the peripherals interface 1350 can include one or more sensors 1351, such as one or more pressure sensors 1352, one or more EMG sensors 1356, one or more IMUs 1358, one or more position sensors 1359, one or more capacitive sensors 1360, one or more force sensors 1361; and/or any other types of sensors defined above or described with respect to any other embodiments discussed herein. In some embodiments, the peripherals interface can include one or more additional peripheral devices, including one or more Wi-Fi and/or Bluetooth devices 1368, an LTE component 1369, a GPS component 1370, a microphone 1371, one or more haptic assemblies 1362, one or more support structures 1363 which can include one or more bladders 1364, one or more manifolds 1365, one or more pressure-changing devices 1367, one or more displays 1372, one or more buttons 1373, one or more speakers 1374, and/or any other types of peripheral devices defined above or described with respect to any other embodiments discussed herein. In some embodiments, computing system 1340 includes more or fewer components than those shown in FIG. 13C.

In some embodiments, each haptic assembly 1362 includes a support structure 1363 and at least one bladder 1364. The bladder 1364 (e.g., a membrane) is a sealed, inflatable pocket made from a durable and puncture-resistant material, such as thermoplastic polyurethane (TPU), a flexible polymer, or the like. The bladder 1364 contains a medium (e.g., a fluid such as air, inert gas, or even a liquid) that can be added to or removed from the bladder 1364 to change pressure (e.g., fluid pressure) inside the bladder 1364. The support structure 1363 is made from a material that is stronger and stiffer than the material of the bladder 1364. A respective support structure 1363 coupled to a respective bladder 1364 is configured to reinforce the respective bladder 1364 as the respective bladder changes shape and size due to changes in pressure (e.g., fluid pressure) inside the bladder. The above example haptic assembly 1362 is non-limiting. The haptic assembly 1362 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1300 also includes a haptic controller 1376 and a pressure-changing device 1367. Alternatively, in some embodiments, the computing system 1340 is communicatively coupled with a haptic controller 1376 and/or pressure-changing device 1367 (e.g., in electronic communication with one or more processors 1377 of the computing system 1340). The haptic controller 1376 is configured to control operation of the pressure-changing device 1367, and in turn operation of the smart textile-based garments 1300. For example, the haptic controller 1376 sends one or more signals to the pressure-changing device 1367 to activate the pressure-changing device 1367 (e.g., turn it on and off). The one or more signals can specify a desired pressure (e.g., pounds per square inch) to be output by the pressure-changing device 1367. Generation of the one or more signals, and in turn the pressure output by the pressure-changing device 1367, can be based on information collected by sensors 1351 of the smart textile-based garment 1300 and/or other communicatively coupled device. For example, the haptic controller 1376 can provide one or more signals, based on collected sensor data, to cause the pressure-changing device 1367 to increase the pressure (e.g., fluid pressure) inside a first haptic assembly 1362 at a first time, and provide one or more additional signals, based on additional sensor data, to the pressure-changing device 1367, to cause the pressure-changing device 1367 to further increase the pressure inside a second haptic assembly 1362 at a second time after the first time. Further, the haptic controller 1376 can provide one or more signals to cause the pressure-changing device 1367 to inflate one or more bladders 1364 in a first portion of a smart textile-based garment 1300 (e.g., a first finger), while one or more bladders 1364 in a second portion of the smart textile-based garment 1300 (e.g., a second finger) remain unchanged. Additionally, the haptic controller 1376 can provide one or more signals to cause the pressure-changing device 1367 to inflate one or more bladders 1364 in a first smart textile-based garment 1300 to a first pressure and inflate one or more other bladders 1364 in the first smart textile-based garment 1300 to a second pressure different from the first pressure. Depending on the number of smart textile-based garments 1300 serviced by the pressure-changing device 1367, and the number of bladders therein, many different inflation configurations can be achieved through the one or more signals, and the examples above are not meant to be limiting.

The smart textile-based garment 1300 may include an optional manifold 1365 between the pressure-changing device 1367, the haptic assemblies 1362, and/or other portions of the smart textile-based garment 1300. The manifold 1365 may include one or more valves (not shown) that pneumatically couple each of the haptic assemblies 1362 with the pressure-changing device 1367 via tubing. In some embodiments, the manifold 1365 is in communication with the controller 1375, and the controller 1375 controls the one or more valves of the manifold 1365 (e.g., the controller generates one or more control signals). The manifold 1365 is configured to switchably couple the pressure-changing device 1367 with one or more haptic assemblies 1362 of the smart textile-based garment 1300. In some embodiments, one or more smart textile-based garments 1300 or other haptic devices can be coupled in a network of haptic devices, and the manifold 1365 can distribute the fluid between the coupled smart textile-based garments 1300.

In some embodiments, instead of using the manifold 1365 to pneumatically couple the pressure-changing device 1367 with the haptic assemblies 1362, the smart textile-based garment 1300 may include multiple pressure-changing devices 1367, where each pressure-changing device 1367 is pneumatically coupled directly with a single (or multiple) haptic assembly 1362. In some embodiments, the pressure-changing device 1367 and the optional manifold 1365 can be configured as part of one or more of the smart textile-based garments 1300 (not illustrated) while, in other embodiments, the pressure-changing device 1367 and the optional manifold 1365 can be configured as external to the smart textile-based garments 1300. In some embodiments, a single pressure-changing device 1367 can be shared by multiple smart textile-based garments 1300 or other haptic devices. In some embodiments, the pressure-changing device 1367 is a pneumatic device, hydraulic device, a pneudraulic device, or some other device capable of adding and removing a medium (e.g., fluid, liquid, or gas) from the one or more haptic assemblies 1362.

The memory 1378 includes instructions and data, some or all of which may be stored as non-transitory computer-readable storage media within the memory 1378. For example, the memory 1378 can include one or more operating systems 1379, one or more communication interface applications 1381, one or more interoperability modules 1384, one or more AR processing applications 1385, one or more data-management modules 1386, and/or any other types of data defined above or described with respect to FIGS. 10A-12B.

The memory 1378 also includes data 1388, which can be used in conjunction with one or more of the applications discussed above. The data 1388 can include device data 1390, sensor data 1391; and/or any other types of data defined above or described with respect to FIGS. 10A-12B.

The different components of the computing system 1340 (and the smart textile-based garment 1300) shown in FIGS. 13A-13C can be coupled via a wired connection (e.g., via busing). Alternatively, one or more of the devices shown in FIGS. 13A-13C may be wirelessly connected (e.g., via short-range communication signals).

Figure 14:
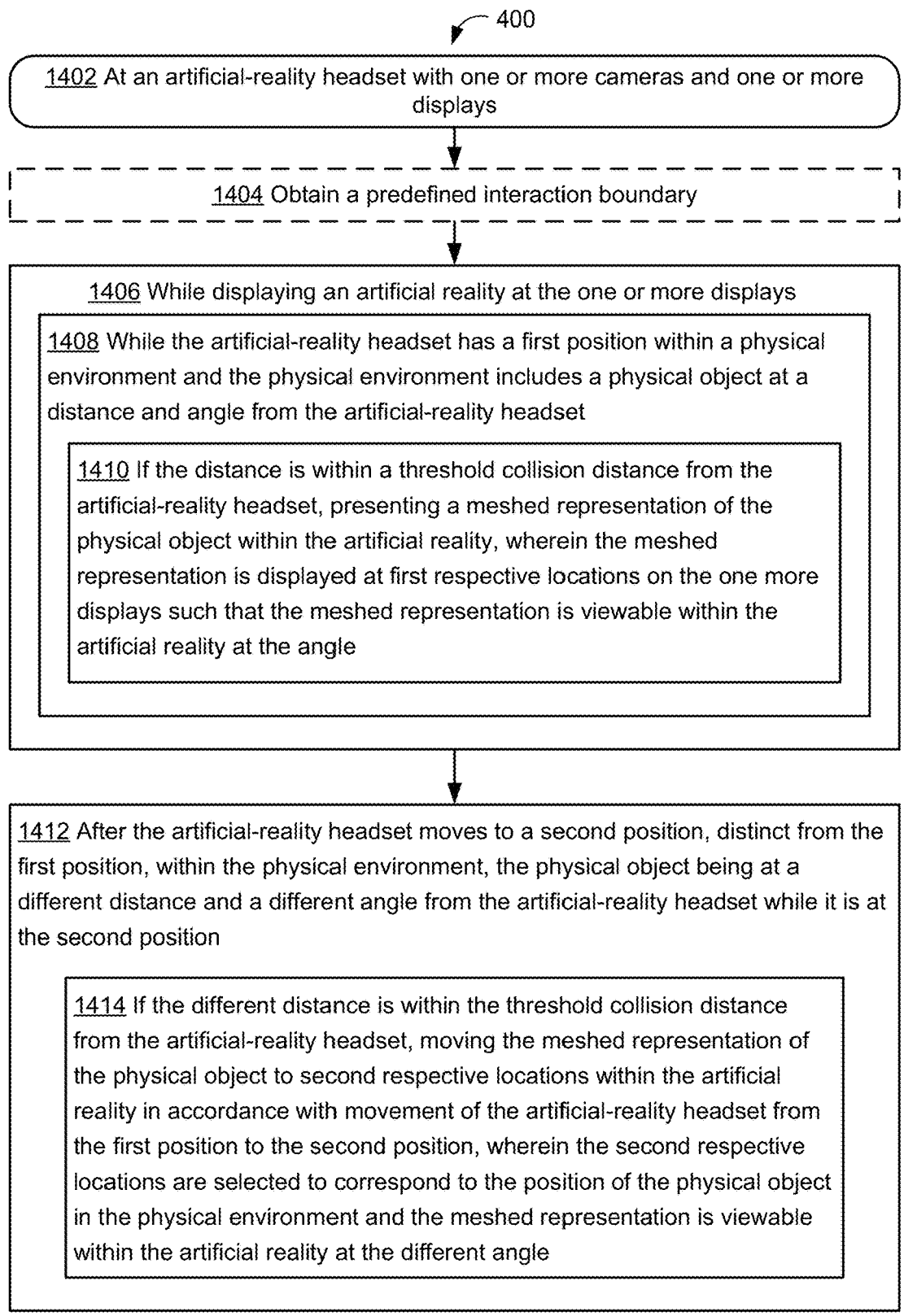
FIG. 14 shows a flow chart illustrating an example method of creating a meshed representation of a physical object for display at an artificial reality headset, where meshed representations are displayed based on whether a wearer of the headset is likely to collide with the physical object, in accordance with some embodiments.

Example Embodiments (A1) FIG. 14 shows a flow chart of a method 1400 of determining whether to render a meshed representation of a particular real-world object based on whether a wearer of the headset is likely to collide with the physical object, in accordance with some embodiments. The operations of the method 400 can be performed at an AR headset and/or another electronic device that is in communication with the AR headset. The operations of the method 1400 occur at an AR system (e.g., either of the AR systems 100 or 200) that includes an AR headset with one or more cameras and one or more displays (e.g., pancakes lenses of the AR device 1100) (1402).

In some embodiments, the method 1400 includes obtaining (1404) a predefined interaction boundary (e.g., a guardian contour). In some embodiments, a user can generate a guardian contour using a hand-held controller. In some embodiments, a guardian contour can be predefined by a user for a particular play area. In some embodiments, the predefined interaction boundary is automatically determined using a form of object detection. In some embodiments, a guardian contour is defined based on the particular interaction that the user is having with the AR content being presented by the AR headset (e.g., performing an exercising involving a particular sequence of motions, interacting with AR content having a particular set of interaction types (e.g., a golfing game requiring users to swing a virtual golf club as part of the AR interaction)).

One or more of the operations of the method 1400 are performed while displaying artificial-reality content at the one or more displays (e.g., a set of virtual objects, which may include representations of other users (e.g., avatars, digital representations, etc.), and/or indications of a guardian contour within the user's physical surroundings (1406).

The one or more operations of the method 1400 are performed while the AR headset is located at a first position within a physical environment where the user is using the AR headset, and the physical environment includes a physical object at a distance and angle from the AR headset (1408).

The method 1400 further includes, if the distance is within a threshold collision distance from the AR headset, presenting (1410) a meshed representation of the physical object within the artificial reality. In some embodiments, the meshed representation is viewable within the artificial reality at the angle. The meshed representation can be a full-color meshed representation that is presented with all of the same colors that would be perceivable in the physical world for the physical object (e.g., rather than using an outline of the physical object that might be presented using just one color, such as purple).

In some embodiments, the method 400 further includes that after the AR headset moves to a second position, distinct from the first position (e.g., due to rotational movement of the user's head while wearing the headset), within the physical environment, the physical object being at a different distance and a different angle from the AR headset while it is at the second position (1412), in accordance with a determination that the different distance is within the threshold collision distance from the AR headset, moving (1414) the meshed representation of the physical object to second respective locations within the artificial reality in accordance with movement of the AR headset from the first position to the second position.

(A2) In some embodiments of A2, the determination that the distance is within a threshold collision distance from the AR headset is determined by processing image data from the one more external cameras to produce a voxel field (e.g., an occupancy field generated using computer vision), and the voxel field is a three-dimensional representation of the supplied image data.

(A3) In some embodiments of any one of A1-A2, a two-dimensional mesh is created based on the voxel field, wherein the two-dimensional mesh is displayed in lieu of the voxel field.

(A4) In some embodiments of any one of A1-A3, the two-dimensional mesh is composed of equally sized rectangular areas of space, and in accordance with a determination that a rectangular areas in the two-dimensional mesh are determined to be occupied, segmenting the rectangular areas into triangles to provide better resolution of the meshed representation (e.g., by improving the resolution the edges of the physical object can be discerned from the objects background (e.g., a wall)).

(A5) In some embodiments of any one of A1-A4, the two-dimensional mesh remains fixed with respect to the physical object when small movements (e.g., less than 5 degrees of rotation of the AR headset) of the AR headset are detected, which reduces flickering (e.g., visible back and forth movement (e.g., jittering) of the artificial reality is 95% eliminated for the user) of the meshed representation when the AR headset moves from the first position to the second position.

(A6) In some embodiments any one of A1-A5, after the AR headset moves to a third position, distinct from the first position and second position, and the one or more programs include instructions for, ceasing to display the meshed representation of the physical object in accordance with the physical object no longer being within a field of view of the one or more displays (and/or one or more external cameras facing away from the user's head).

(A7) In some embodiments of any one of A1-A6, at a third position of the AR headset, different from the first and second position, and the one or more programs include instructions for: ceasing to mesh (e.g., display) the meshed representation of the physical object in accordance with a determination that the physical object is beyond the threshold collision distance from the AR headset.

(A8) In some embodiments of any one of A1-A7, the meshed representation of the physical object is faded out when the threshold collision distance from the AR headset is approached.

(A9) In some embodiments of any one of A1-A8, coloring of the meshed representation denotes distance of the physical object to the AR headset.

(A10) In some embodiments of any one of A1-A9, coloring of meshed representation of the physical object corresponds to a real-life coloring (i.e., not a gray scale or a gradation of a color and is instead a full gamut of color) of the physical object.

(A11) In some embodiments of any one of A1-A10, the AR headset includes a center camera configured to capture color images. In some embodiments, the color information from the center camera can be fused with information provided by additional grayscale cameras located elsewhere on the AR headset. In some embodiments, the camera can include an infrared cut filter which can be used to appropriately render locations of the physical object (e.g., IR light is not used create the representation). In some embodiments, an eye buffer (e.g., rendering resolution) can be utilized or adjusted to further enhance the representation's smooth movement.

(A12) In some embodiments of any one of A1-A11, the meshed representation is an outline that corresponds to the physical object. In some embodiments, the outline lines are colored to match the color of the physical object.

(A13) In some embodiments of any one of A1-A12, the meshed representation is transparent allowing the artificial reality to still be viewed. For example, a background of the meshed representation may be a virtual reality (e.g., the physical object is separated from its physical background).

(A14) In some embodiments of any one of A1-A13, a user can define a sensitivity as to when the meshed representation of the physical object is displayed.

(A15) In some embodiments of any one of A1-A14, the one or more cameras include two stereoscopic cameras that are configured to supply depth perception information for determining distance.

(A16) In some embodiments of any one of A1-A15, moving the meshed representation of the physical object displayed at the first respective locations to the second respective locations is further based an estimate of a mean intruder distance from the AR headset to predict how many pixels the meshed representation is shifted.

(A17) In some embodiments of any one of A1-A16, the one or more cameras are physically coupled to a housing of a virtual reality headset, such that each of the one or more cameras have a field of view of a surrounding physical environment.

(A18) In some embodiments of any one of A1-A17, the threshold collision distance is at least six-feet from the AR headset.

(A19) In some embodiments of any one of A1-A18, the threshold collision distance is user definable.

(A20) In some embodiments of any one of A1-A19, when the AR headset moves, multiple objects present within the predefined interaction boundary and threshold collision distance are re-rendered as respective meshed representations that are positioned in accordance with the movement of the headset between the first position and the second position and correspond to respective locations of corresponding physical objects in the physical environment.

(A21) In some embodiments of any one of A1-A20, obtaining the predefined interaction boundary includes a set of plane detection operations for identifying physical planes within the physical surroundings of the user, and identifying an appropriate location for the predefined interaction boundary based on one or more identified physical planes within the physical surroundings.

(A22) In some embodiments of any one of A1-A21, the one or more programs further include instructions for training an intruder detection system for identifying the physical objects within the predefined interaction boundary, wherein the training of the intruder detection system is performed using recordings of imaging data obtained by the AR headset, the obtained recordings comprising one or more of: (i) synthetically generated recordings comprising artificially-generated representations of real-world objects within physical surroundings of the AR headset, (ii) real-dynamic recordings comprising imaging data obtained during real-world interactions of human users interacting within the physical surroundings of the AR headset, and (iii) real-static recordings comprising imaging data of static real-world scenes obtained at particular times while the user is interacting with AR content within the physical surroundings.

(B1) In accordance with some embodiments, a system that includes one or more wrist wearable devices and an AR headset, and the system is configured to perform operations corresponding to any of A1-A20.

(C1) In accordance with some embodiments, a non-transitory computer readable storage medium including instructions that, when executed by a computing device in communication with an AR headset, cause the computer device to perform operations corresponding to any of A1-A20.

(D1) In accordance with some embodiments, a method of operating an artificial reality headset, including operations that correspond to any of A1-A20.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An artificial-reality (AR) headset, comprising:
one or more cameras;
one or more displays;
one or more programs, wherein the one or more programs are stored in memory and configured to be executed by one or more processors, the one or more programs including instructions for:
obtaining a predefined interaction boundary;
while displaying an artificial reality at the one or more displays:
while the AR headset has a first position within a physical environment and the physical environment includes a physical object at a distance and angle from the AR headset:
in accordance with a determination that the distance is within a threshold collision distance from the AR headset, presenting a meshed representation of the physical object within the artificial reality, wherein the meshed representation is displayed at first respective locations on the one more displays, such that the meshed representation is viewable within the artificial reality at the angle;
after the AR headset moves to a second position, distinct from the first position, within the physical environment, the physical object being at a different distance and a different angle from the AR headset while it is at the second position:
in accordance with a determination that the different distance is within the threshold collision distance from the AR headset, moving the meshed representation of the physical object to second respective locations within the artificial reality in accordance with movement of the AR headset from the first position to the second position, wherein the second respective locations are selected to correspond to a physical position of the physical object in the physical environment and the meshed representation is viewable within the artificial reality at the different angle.

2. The AR headset of claim 1, wherein:
the one or more cameras are one or more external cameras on a front-facing surface of the AR headset, and
the determination that the distance is within the threshold collision distance from the AR headset is determined by processing image data from the one more external cameras to produce a voxel field, wherein the voxel field is a three-dimensional representation of the processed image data.

3. The AR headset of claim 2, wherein a two-dimensional mesh is created based on the voxel field, wherein the two-dimensional mesh is displayed in lieu of the voxel field.

4. The AR headset of claim 3, wherein the two-dimensional mesh is composed of equally sized rectangular areas of space, and in accordance with a determination that a rectangular areas in the two-dimensional mesh are determined to be occupied, segmenting the rectangular areas into triangles to provide better resolution of the meshed representation.

5. The AR headset of claim 3, wherein the two-dimensional mesh remains fixed with respect to the physical object when small movements of the AR headset are detected, which reduces flickering of the meshed representation when the AR headset moves from the first position to the second position.

6. The AR headset of claim 1, wherein after the AR headset moves to a third position, distinct from the first position and the second position, and the one or more programs include instructions for:

ceasing to display the meshed representation of the physical object in accordance with the physical object no longer being within a field of view of the one or more displays.

7. The AR headset of claim 1, wherein at a third position of the AR headset, different from the first and second position, and the one or more programs include instructions for:
ceasing to mesh the meshed representation of the physical object in accordance with a determination that the physical object is beyond the threshold collision distance from the AR headset.

8. The AR headset of claim 7, wherein the meshed representation of the physical object is faded out when the threshold collision distance from the AR headset is approached.

9. The AR headset of claim 1, wherein coloring of the meshed representation denotes a distance between the physical object and the AR headset.

10. The AR headset of claim 1, wherein coloring of meshed representation of the physical object corresponds to a real-life coloring of the physical object.

11. The AR headset of claim 1, wherein the AR headset includes a center camera configured to capture color images.

12. The AR headset of claim 1, wherein the meshed representation is an outline that corresponds to the physical object.

13. The AR headset of claim 1, wherein the meshed representation is transparent allowing the artificial reality to still be viewed.

14. The AR headset of claim 1, wherein a user can define a sensitivity as to when the meshed representation of the physical object is displayed.

15. The AR headset of claim 1, wherein the one or more cameras include two stereoscopic cameras that are configured to supply depth perception information for determining respective distances of physical objects within physical surroundings of a user.

16. The AR headset of claim 1, wherein moving the meshed representation of the physical object displayed at the first location to the second location is further based an estimate of a mean intruder distance from the AR headset to predict how many pixels the meshed representation is shifted.

17. The AR headset of claim 1, wherein the one or more cameras are physically coupled to a housing of a virtual reality headset, such that each of the one or more cameras have a field of view of a surrounding physical environment.

18. The AR headset of claim 1, wherein the threshold collision distance is user definable.

19. A non-transitory computer readable storage medium including instructions that, when executed by a computing device in communication with an AR headset having one or more cameras and one or more displays, cause the computing device to perform operations, comprising:
obtaining a predefined interaction boundary;
while displaying an artificial reality at the one or more displays:
while the AR headset has a first position within a physical environment and the physical environment includes a physical object at a distance and angle from the AR headset:
in accordance with a determination that the distance is within a threshold collision distance from the AR headset, presenting a meshed representation of the physical object within the artificial reality, wherein the meshed representation is displayed at first respective locations on the one more displays such that the meshed representation is viewable within the artificial reality at the angle;
after the AR headset moves to a second position, distinct from the first position, within the physical environment, the physical object being at a different distance and a different angle from the AR headset while it is at the second position:
in accordance with a determination that the different distance is within the threshold collision distance from the AR headset, moving the meshed representation of the physical object to second respective locations within the artificial reality in accordance with movement of the AR headset from the first position to the second position, wherein the second respective locations are selected to correspond to the position of the physical object in the physical environment and the meshed representation is viewable within the artificial reality at the different angle.

20. A method of operating an artificial reality headset having one or more cameras and one or more displays, comprising:
obtaining a predefined interaction boundary;
while displaying an artificial reality at the one or more displays:
while the AR headset has a first position within a physical environment and the physical environment includes a physical object at a distance and angle from the AR headset:
in accordance with a determination that the distance is within a threshold collision distance from the AR headset, presenting a meshed representation of the physical object within the artificial reality, wherein the meshed representation is displayed at first respective locations on the one more displays such that the meshed representation is viewable within the artificial reality at the angle;
after the AR headset moves to a second position, distinct from the first position, within the physical environment, the physical object being at a different distance and a different angle from the AR headset while it is at the second position:
in accordance with a determination that the different distance is within the threshold collision distance from the AR headset, moving the meshed representation of the physical object to second respective locations within the artificial reality in accordance with movement of the AR headset from the first position to the second position, wherein the second respective locations are selected to correspond to the position of the physical object in the physical environment and the meshed representation is viewable within the artificial reality at the different angle.

* * * * *